(12) United States Patent
Oba

(10) Patent No.: US 12,528,518 B2
(45) Date of Patent: Jan. 20, 2026

(54) INFORMATION PROCESSING WITH DRIVER EYE MOVEMENT MONITORING

(71) Applicant: Sony Semiconductor Solutions Corporation, Kanagawa (JP)

(72) Inventor: Eiji Oba, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 289 days.

(21) Appl. No.: 18/260,191

(22) PCT Filed: Jan. 21, 2022

(86) PCT No.: PCT/JP2022/002127
§ 371 (c)(1),
(2) Date: Jun. 30, 2023

(87) PCT Pub. No.: WO2022/172724
PCT Pub. Date: Aug. 18, 2022

(65) Prior Publication Data
US 2024/0051585 A1 Feb. 15, 2024

(30) Foreign Application Priority Data
Feb. 12, 2021 (JP) ................................. 2021-020377

(51) Int. Cl.
*B60W 60/00* (2020.01)
*A61B 5/16* (2006.01)
(Continued)

(52) U.S. Cl.
CPC ......... *B60W 60/0053* (2020.02); *A61B 5/163* (2017.08); *A61B 5/18* (2013.01); *B60W 50/08* (2013.01)

(58) Field of Classification Search
CPC ... B60W 60/0053; B60W 50/08; A61B 5/163; A61B 5/18
See application file for complete search history.

(56) References Cited

U.S. PATENT DOCUMENTS

2019/0143989 A1* 5/2019 Oba ...................... B60K 35/23
701/70
2020/0183383 A1* 6/2020 Stent ..................... G05D 1/0061
(Continued)

FOREIGN PATENT DOCUMENTS

DE      102016013806 A1 *  5/2017
JP      2019103744 A       6/2019
(Continued)

OTHER PUBLICATIONS

Machine translation of DE-102016013806-A1 (Year: 2017).*
International Search Report (PCT/ISA/210), International Application No. PCT/JP2022/002127, dated Apr. 12, 2022.

*Primary Examiner* — Kenneth M Dunne
(74) *Attorney, Agent, or Firm* — Michael Best & Friedrich LLP

(57) ABSTRACT

There is provided an information processing apparatus including an event vision sensor (400) that images an inside of a mobile body and a sensor control unit (330) that controls the event vision sensor. The event vision sensor includes a pixel array unit (500) including a plurality of pixels arrayed in a matrix and an event detection unit (508) that detects that a luminance change amount due to incident light has exceeded a predetermined threshold in the pixels. The sensor control unit changes a value of the predetermined threshold when grasping, with the event vision sensor, an eyeball behavior of a driver seated on a driver's seat of the mobile body.

16 Claims, 19 Drawing Sheets

(51) Int. Cl.
*A61B 5/18* (2006.01)
*B60W 50/08* (2020.01)

(56) References Cited

U.S. PATENT DOCUMENTS

| | | | |
|---|---|---|---|
| 2021/0035298 A1 | 2/2021 | Yildiz | |
| 2021/0181837 A1* | 6/2021 | Jiang | ........................ G06F 3/011 |
| 2021/0188291 A1* | 6/2021 | el Kaliouby | ........... G16H 20/70 |

FOREIGN PATENT DOCUMENTS

| | | | |
|---|---|---|---|
| JP | 2020112501 A | 7/2020 | |
| JP | 2020536309 A | 12/2020 | |
| WO | 2017195405 A1 | 11/2017 | |
| WO | WO-2021087573 A1 * | 5/2021 | ............. A61B 5/163 |

* cited by examiner

FIG.1

| AUTOMATIC DRIVING LEVEL | NAME | | EXECUTION SUBJECT OF DRIVING TASK | MONITORING SUBJECT RELATING TO SAFE DRIVING |
|---|---|---|---|---|
| 0 | MANUAL DRIVING (DIRECT DRIVING STEERING) | NO DRIVING ASSISTANCE | DRIVER | DRIVER |
| 1 | MANUAL DRIVING (DIRECT DRIVING STEERING) | WITH DRIVING ASSISTANCE (AUTOMATIC BRAKE, ACC, LKAS, AND THE LIKE) | DRIVER | DRIVER |
| 2 | AUTOMATIC DRIVING FUNCTION UNDER SPECIFIC CONDITION (PARTIAL DRIVING AUTOMATION) | | DRIVER (PARTIALLY SYSTEM) | DRIVER |
| 3 | CONDITIONAL AUTOMATIC DRIVING | | SYSTEM | SYSTEM (PARTIALLY DRIVER) |
| 4 | FULLY AUTOMATIC DRIVING UNDER SPECIFIC CONDITIONS (ADVANCED DRIVING AUTOMATION) | | SYSTEM | SYSTEM |

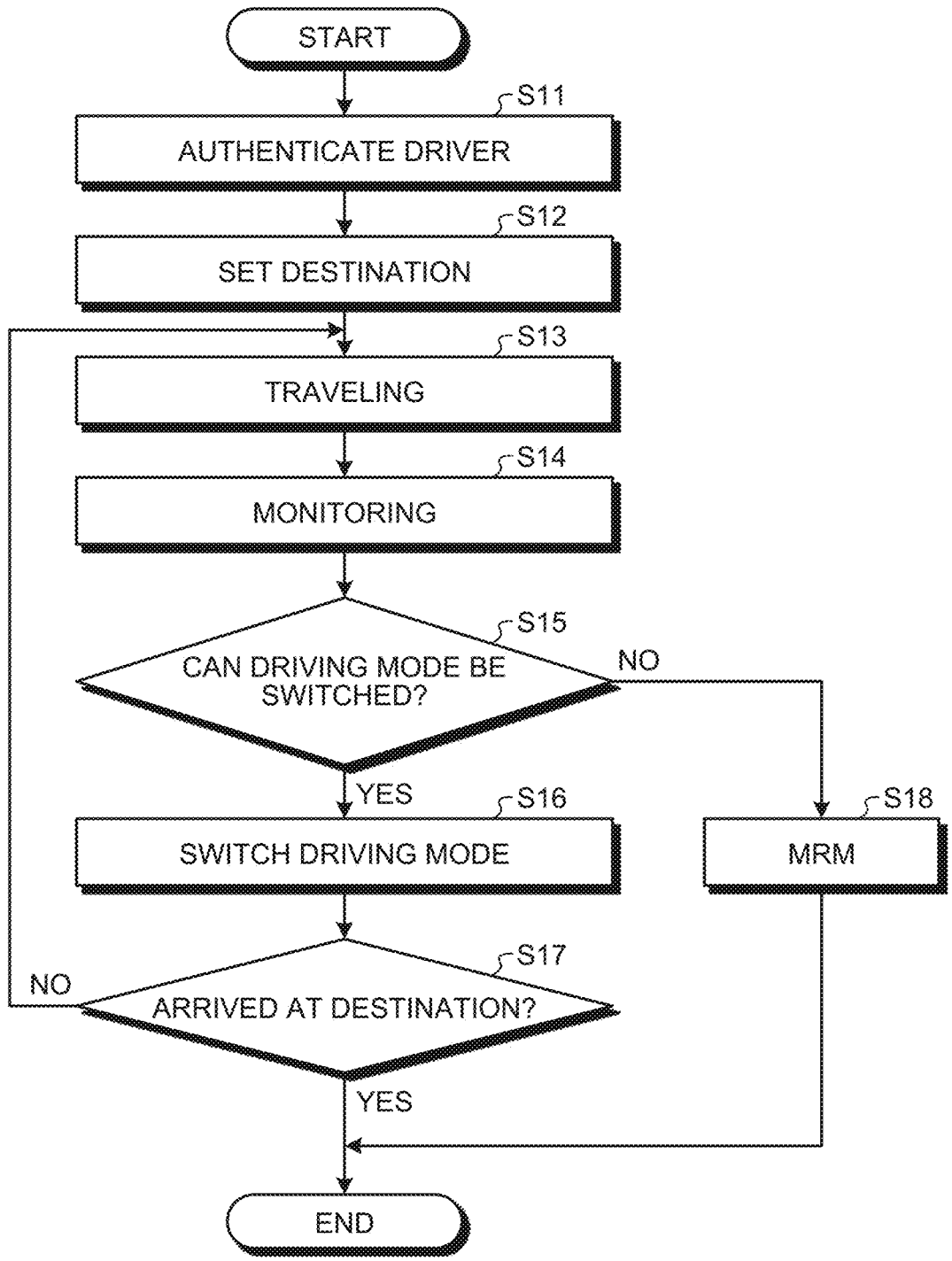

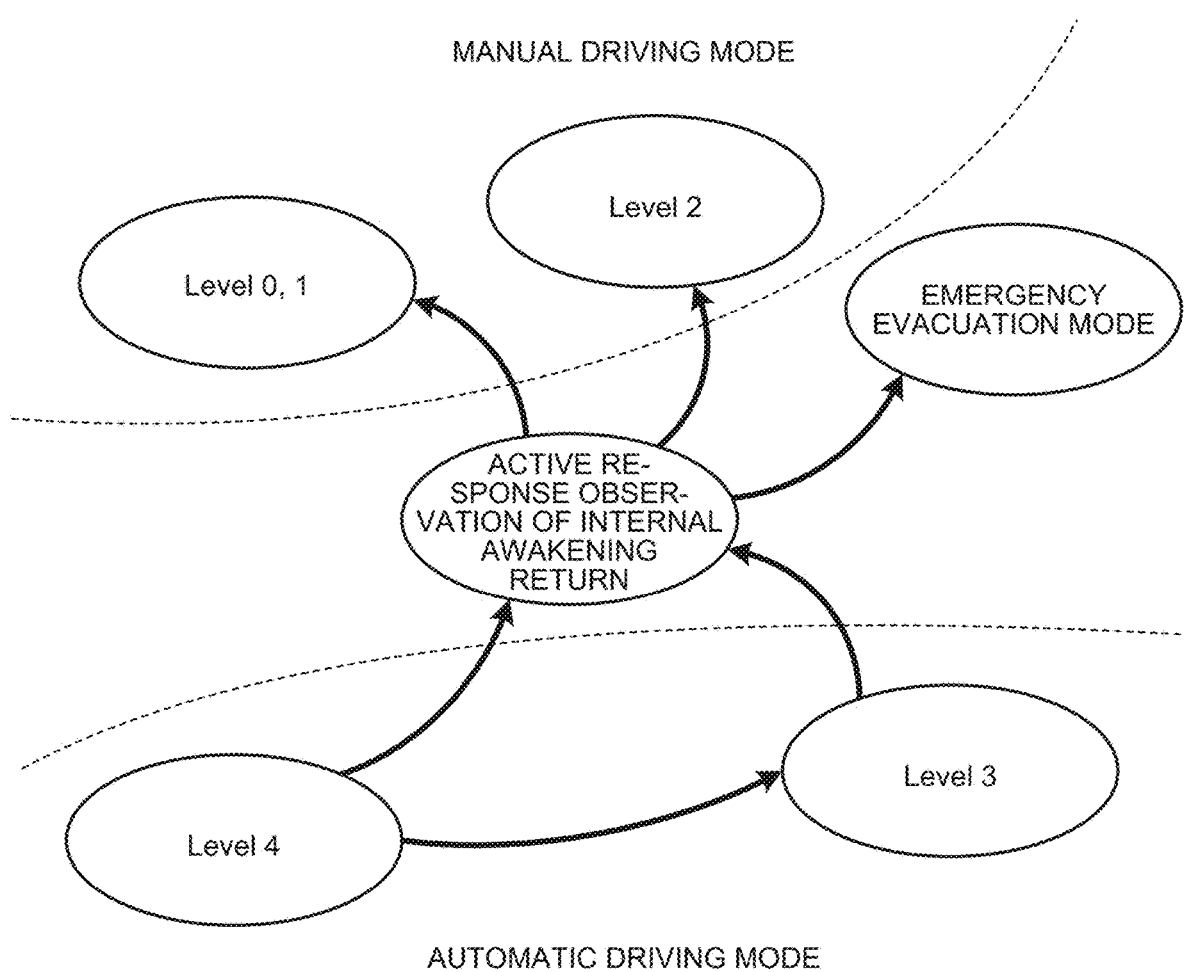

FIG.20
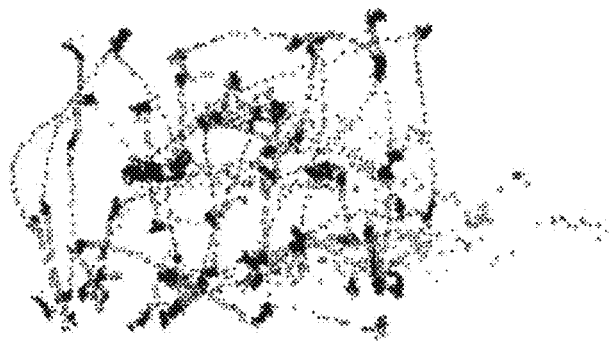
(a) Q. COUNT SMALL ANIMALS
Ans. A:0, B:1, C:2, D:3 OR MORE
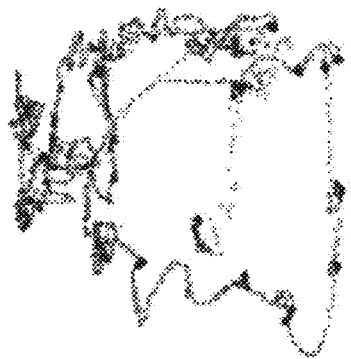
(b)
(c)

INFORMATION PROCESSING WITH DRIVER EYE MOVEMENT MONITORING

FIELD

The present disclosure relates to an information processing apparatus, an information processing method, and an information processing program.

BACKGROUND

Recently, development of an automatic driving technology in which a vehicle control system (an information processing system) controls a vehicle has been actively performed. Even when the automatic driving technology is widespread, it is expected that a situation in which an automatic drivable section, which is a road section in which the system can autonomously perform automatic driving control, and a manual driving section, which is a road section in which the automatic driving is not allowed, are mixed depending on an actual road infrastructure maintenance situation or the like will occur. That is, not only a situation in which automatic driving traveling is continuously performed by the system completely autonomously but also a situation in which an automatic driving mode explained above has to be switched to a manual driving mode in which a driver performs steering can occur.

When the automatic driving mode is switched to the manual driving mode in this way, in order to avoid induction of an accident or the like, it is desirable that the system side determines a return response level of the driver to the manual driving mode and the switching is executed only when it has been determined that return to the manual driving is possible. Therefore, for example, in the system explained above, it is conceivable to use, as one of determination means for the return response level, means for detecting an awakening level of the driver by analyzing an eyeball behavior considered to reflect an activity result such as recognition of a human brain and determining the return response level to the manual driving mode.

CITATION LIST

Patent Literature

Patent Literature 1: WO 2017/195405 A

SUMMARY

Technical Problem

Incidentally, since eyeball behaviors such as microsaccade and tremor are high-speed motions, it is difficult to highly accurately observe such eyeball behaviors. Therefore, it is conceivable to observe the eyeball behaviors using an event vision sensor (EVS) not having the concept of a frame rate. However, it is difficult to avoid an increase in a data amount simply by applying the EVS to observation of the eyeball behaviors. Further, there is a limit in accurately observing the eyeball behaviors.

Therefore, the present disclosure proposes an information processing apparatus, an information processing method, and an information processing program capable of accurately observing an eyeball behavior while suppressing an increase in data amount.

Solution to Problem

According to the present disclosure, there is provided an information processing apparatus including: an event vision sensor that images an inside of a mobile body; and a sensor control unit that controls the event vision sensor. In the information processing apparatus, the event vision sensor includes: a pixel array unit including a plurality of pixels arrayed in a matrix; and an event detection unit that detects that a luminance change amount due to incident light has exceeded a predetermined threshold in the pixels, and the sensor control unit changes a value of the predetermined threshold when grasping, with the event vision sensor, an eyeball behavior of a driver seated on a driver's seat of the mobile body.

Furthermore, according to the present disclosure, there is provided an information processing method executed in an information processing apparatus. The information processing apparatus includes: an event vision sensor that images an inside of a mobile body; and a sensor control unit that controls the event vision sensor. The event vision sensor includes: a pixel array unit including a plurality of pixels arrayed in a matrix; and an event detection unit that detects that a luminance change amount due to incident light has exceeded a predetermined threshold in the pixels. The information processing method includes changing a value of the predetermined threshold when grasping, with the event vision sensor, an eyeball behavior of a driver seated on a driver's seat of the mobile body.

Furthermore, according to the present disclosure, there is provided an information processing program for causing a computer to execute a control function of an event vision sensor that images an inside of a mobile body. The event vision sensor includes: a pixel array unit including a plurality of pixels arrayed in a matrix; and an event detection unit that detects that a luminance change amount due to incident light has exceeded a predetermined threshold in the pixels. The information processing program causes the computer to execute a function of changing a value of the predetermined threshold when grasping, with the event vision sensor, an eyeball behavior of a driver seated on a driver's seat of the mobile body.

BRIEF DESCRIPTION OF DRAWINGS

FIG. 1 is an explanatory diagram for explaining an example of automatic driving levels.

FIG. 2 is a flowchart for explaining an example of traveling according to an embodiment of the present disclosure.

FIG. 3 is an explanatory diagram for explaining an example of transition of automatic driving levels according to the embodiment of the present disclosure.

FIG. 20 is an explanatory diagram for explaining an example of a trajectory of an eyeball behavior of the driver at the time when a visual problem of viewing information is presented.

DESCRIPTION OF EMBODIMENTS

Figure 4:
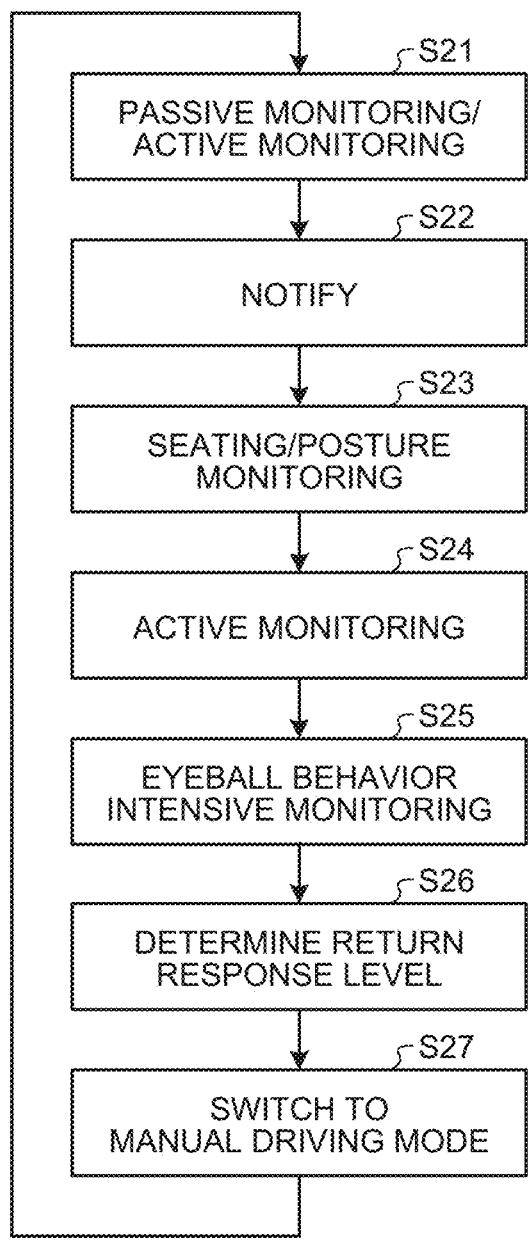
FIG. 4 is a flowchart illustrating an example of a monitoring operation according to the embodiment of the present disclosure.

Preferred embodiments of the present disclosure are explained in detail below with reference to the accompanying drawings. Note that, in the present specification and the drawings, components having substantially the same functional configurations are denoted by the same reference numerals and signs, whereby redundant explanation of the components is omitted.

Note that, in the embodiment of the present disclosure, a case in which the present disclosure is applied to automatic driving of an automobile is explained as an example. However, the embodiment of the present disclosure is not limited to be applied to the automobile and can be applied to mobile bodies such as a motorcycle, an electric vehicle, a hybrid electric vehicle, a motorcycle, a personal mobility, an airplane, a ship, a construction machine, and an agricultural machine (a tractor). Further, in the embodiment of the present disclosure, it is assumed that a steering mode of the mobile bodies is switchable between an automatic driving mode and an automatic driving mode for automatically executing one or more driving tasks. In addition, the embodiment of the present invention is not limited to be applied to the mobile bodies and may be widely applied to an automatic control device in which a monitoring operator needs to intervene as appropriate.

Note that the explanation is made in the following order.
1. Example of automatic driving levels
2. Example of traveling
3. Example of transition of the automatic driving levels
4. Examples of monitoring
5. Detailed configuration of a vehicle control system
6. Schematic configuration of a sensor unit 113
7. Schematic configuration of a unit that executes determination of an awakening level of a driver
8. Operation example of an eyeball behavior analysis unit 300
9. Background leading to creation of an embodiment of the present disclosure
9.1 Using EVS
9.2 EVS
9.3 Background leading to creation of the embodiment of the present disclosure
10. Embodiment
10.1 Installation position
10.2 Configuration of a unit
10.3 Information processing method
10.4 Example
11. Summary
12. Hardware configuration
13. Supplement 1. Example of an Automatic Driving Level First, before details of an embodiment of the present disclosure are explained, automatic driving levels of an automatic driving technology is with reference to FIG. 1. FIG. 1 is an explanatory diagram for explaining an example of the automatic driving levels. FIG. 1 illustrates automatic driving levels defined by the SAE (Society of Automotive Engineers). Note that, in the following explanation, the automatic driving levels defined by the SAE are basically referred to. However, in study of the automatic driving levels illustrated in FIG. 1, problems and validity in the case in which the automatic driving technology is widely spread are not thoroughly examined. Therefore, in the following explanation, based on these problems and the like, there are some portions that are not necessarily explained by interpretation as defined in the SAE.

In the present specification, vehicle traveling is not roughly divided into the two types of the manual driving and the automatic driving explained above but is classified in stages according to contents of tasks automatically performed by a system side. For example, as illustrated in FIG. 1, it is assumed that the automatic driving levels are classified into, for example, five stages from a level 0 to a level 4 (note that, when a level at which unmanned automatic driving is possible is included, classified into six stages.). First, the automatic driving level 0 is manual driving without driving assistance by a vehicle control system (direct driving steering of a driver). The driver executes all driving tasks and also executes monitoring relating to safe driving (for example, an action of avoiding danger).

Next, the automatic driving level 1 is manual driving (direct driving steering) in which driving assistance (automatic brake, ACC (Adaptive Cruise Control), LKAS (Lane Keeping Assistant System), and the like) by the vehicle control system can be executed. In the automatic driving level 1, the driver executes all driving tasks other than an assisted single function and also executes monitoring relating to safe driving.

Next, the automatic driving level 2 is also referred to as "partial driving automation". In the automatic driving level 2, the vehicle control system executes a sub-task of a driving task relating to vehicle control in both the front-rear direction and the left-right direction of the vehicle under a specific condition. For example, in the automatic driving level 2, the vehicle control system controls both steering operation and acceleration and deceleration in cooperation (for example, cooperation between the ACC and the LKAS). However, even in the automatic driving level 2, an execution subject of the driving task is basically the driver and a subject of monitoring relating to safe driving is also the driver.

The automatic driving level 3 is also referred to as "conditional automatic driving". In the automatic driving level 3, the vehicle control system can execute all the driving tasks in a limited region in which conditions for enabling the vehicle control system to take measures with functions mounted on the vehicle are satisfied. In the automatic driving level 3, an execution subject of the driving tasks is the vehicle control system and a subject of monitoring relating to safe driving is also basically the vehicle control system. However, in this level, the vehicle control system is not required to take measures under all situations. A user (the driver) at a preliminary measure time is expected to appropriately respond to an intervention request or the like of the vehicle control system. In some case, the user is required to take measures against a system failure called silent failure that the vehicle control system cannot autonomously find.

Incidentally, in the automatic driving level 3 defined by the SAE, it is not clearly defined what kinds of secondary tasks (here, the "secondary tasks" mean operations other than operations relating to driving performed by the driver during traveling) the driver is capable of actually executing. Specifically, it is considered that the driver can perform, during the traveling in the automatic driving level 3, the secondary tasks such as work and actions other than steering, for example, operation of a mobile terminal, a telephone conference, video viewing, reading, a game, thinking, and conversation with other passengers. On the other hand, in the range of the definition of the automatic driving level 3 of the SAE, it is expected that the driver appropriately takes measures for, for example, performing driving operation in response to a request or the like from the vehicle control system side due to a system failure, deterioration in a traveling environment, or the like. Therefore, in the automatic driving level 3, in order to ensure safe traveling, even in a situation in which the secondary tasks explained above are executed, the driver is expected to always maintain a preparation state in which the driver is capable of immediately returning to the manual driving.

Further, the automatic driving level 4 is also referred to as "advanced driving automation". In the automatic driving level 4, the vehicle control system executes all driving tasks within a limited region. In the automatic driving level 4, an execution subject of the driving tasks is the vehicle control system and a subject of monitoring relating to safe driving is also the vehicle control system. However, in the automatic driving level 4, unlike the automatic driving level 3 explained above, it is not expected that the driver takes measures for, for example, performing driving operation (manual driving) in response to a request or the like from the vehicle control system side due to a system failure or the like. Therefore, in the automatic driving level 4, the driver is capable of performing the secondary tasks explained above and, depending on a situation, for example, the driver is capable of taking a nap in a section where conditions are satisfied.

As explained above, in the automatic driving level 0 to the automatic driving level 2, the driver travels in the manual driving mode in which the driver independently executes all or a part of the driving tasks. Therefore, in these three automatic driving levels, the driver is not allowed to engage in the secondary tasks that are actions other than the manual driving and actions relating thereto that, for example, deteriorates attention or impairs forward attention during traveling.

On the other hand, in the automatic driving level 3, the driver travels in the automatic driving mode in which the vehicle control system independently executes all the driving tasks. However, as explained above, in the automatic driving level 3, a situation can occur in which the driver performs the driving operation. Therefore, in the automatic driving level 3, when the secondary task is allowed for the driver, the driver is required to be in a preparation state in which the driver can return from the secondary task to the manual driving.

Further, when it is assumed that a situation in which the vehicle traveling in the automatic driving level 4 is allowed is satisfied, the driver travels in the automatic driving mode in which the vehicle control system executes all the driving tasks. However, since the situation dynamically changes depending on a maintenance situation or the like in an actual road infrastructure, a section in which the automatic driving level 4 cannot be applied to a part of a traveling route is sometimes found halfway in a traveling itinerary. In such a case, before approaching and entering the relevant section, for example, the driver is required to set and transition the section to the automatic driving level 2 or the lower level recognized depending on conditions. Then, in the section set to the automatic driving level 2 or the lower level in this way, the driver is required to independently execute the driving tasks. That is, even in the automatic driving level 4, since the situation changes from moment to moment halfway in the itinerary as explained above, even halfway in an itinerary planned in advance as the automatic driving level 4, the transition to the automatic driving level 2 or the lower level can actually occur. Therefore, the driver is required to shift to the preparation state in which the driver can return from the secondary task to the manual driving at appropriate advance notice timing after the transition of the automatic driving levels is notified to the driver.

2. Example of Traveling

Next, an example of traveling according to the embodiment of the present disclosure is explained with reference to FIG. 2 based on the automatic driving levels explained above. FIG. 2 is a flowchart for explaining the example of the traveling according to the embodiment of the present disclosure. As illustrated in FIG. 2, in the traveling according to the embodiment of the present disclosure, the vehicle control system executes, for example, steps from Step S11 to Step S18. Details of these steps are explained below.

First, the vehicle control system executes driver authentication (Step S11). The driver authentication can be performed by possession authentication by a driver's license, a vehicle key (including a portable wireless device), or the like, knowledge authentication by a password, a personal identification number, or the like, or biometric authentication by a face, a fingerprint, an iris of a pupil, a voiceprint, or the like. Furthermore, in the present embodiment, the driver authentication may be performed by using all or two or more of the possession authentication, the knowledge authentication, and the biometric authentication. In the present embodiment, by executing such driver authentication before starting traveling, even when a plurality of drivers drive the same vehicle, information specific to the drivers such as histories of eyeball behaviors of the drivers can be acquired in association with the drivers. Note that, in the present embodiment, when a plurality of passengers (occupants) are on board the vehicle and the plurality of passengers can be drivers, it is preferable to perform authentication for all the drivers.

Subsequently, for example, an input unit 101 (see FIG. 3) explained below is operated by a driver or the like, whereby a destination is set (Step S12). Note that, here, an example is explained in which the driver gets on a vehicle and sets a destination. However, the embodiment of the present disclosure is not limited to this. For example, the vehicle control system may preset a destination based on destination information or calendar information manually input to a smartphone or the like (assumed to be communicable with the vehicle control system) before the driver gets on the vehicle. Alternatively, the vehicle control system may automatically preset a destination by acquiring, via the conjugate service, schedule information or the like stored in advance in a smartphone or the like or a cloud server or the like (assumed to be communicable with the vehicle control system).

Then, the vehicle control system performs preplanning setting for a traveling route or the like based on the set destination. Further, the vehicle control system acquires and updates, for example, information concerning a road environment of the set traveling route, that is, local dynamic map (LDM) information and the like in which traveling map information of roads on which the vehicle travels is always updated at high density. At this time, the vehicle control system repeats, along the traveling during the itinerary, for each of fixed sections, the acquisition of the LDM and the like corresponding to a section in which the vehicle is about to travel. In addition, the vehicle control system updates and resets an appropriate automatic driving level as appropriate for the section on the traveling route based on the acquired latest LDM information and the like. Therefore, even if section entry is started in the automatic driving level 4, when a takeover point to new manual driving, which has not been found at the time of starting the itinerary, is detected from the information updated at every moment, the driver is required to recognize notification for requesting takeover and to take takeover measures according to a changed part.

Subsequently, the vehicle control system starts displaying a traveling section on the traveling route. Then, the vehicle control system starts traveling according to the set automatic driving level (Step S13). When the traveling is started, the display of the traveling section is updated based on position information of the vehicle (an own car) and acquired LDM update information. Note that, in the present specification, "traveling" also includes a safety measure automatically performed when the driver cannot return from automatic driving to manual driving and more specifically includes, for example, a vehicle stop involved in an MRM or the like determined by the vehicle control system.

Subsequently, the vehicle control system executes monitoring (observation) of a state of the driver as appropriate (Step S14). In the embodiment of the present disclosure, the monitoring is executed to, for example, acquire teacher data for determining a return response level of the driver. In the present embodiment, the monitoring is executed in a situation in which a check is necessary according to a change over time of a traveling environment, for example, a prior state check of the driver necessary for switching the driving mode according to the automatic driving level set in sections on a traveling route and a check about whether return notification has been performed at appropriate timing and the driver has appropriately performed a return action to the notification or warning, including a return request to the manual driving from an unexpected automatic driving that occurred after the start of the itinerary.

Subsequently, when the vehicle reaches a switching point from the automatic driving mode to the manual driving mode based on the automatic driving levels set for the sections on the traveling route, the vehicle control system determines whether the driving mode can be switched (Step S15). Then, when determining that the driving mode can be switched (Step S15: Yes), the vehicle control system proceeds to processing of Step S16 and, when determining that the driving mode cannot be switched (Step S15: No), the vehicle control system proceeds to, for example, processing in Step S18.

Subsequently, the vehicle control system switches the driving mode (Step S16). Further, the vehicle control system determines whether the vehicle (the own car) has arrived at the destination (Step S17). The vehicle control system ends the processing when the vehicle has arrived at the destination (Step S17: Yes) and returns to the processing in Step S13 when the own car has not arrived at the destination (Step S17: No). Thereafter, the vehicle control system repeats the processing in Step S13 to Step S17 as appropriate until the vehicle arrives at the destination. When the driving mode cannot be switched from the automatic driving to the manual driving, the vehicle control system may execute emergency stop by the MRM or the like (Step S18).

Note that the flowchart of FIG. 2 is a diagram for schematic explanation illustrates a flow as a simple model while omitting explanation about a detailed procedure involved in takeover and detailed procedures of a state check at the time of takeover, handling processing and determination in automatic control and description of detailed steps. That is, assuming that the processing in Step S13 includes a series of handling processing automatically performed when the driver cannot return, explanation of the processing is omitted.

Note that, in the embodiment of the present disclosure, even in the same road section, an allowable automatic driving level can change from moment to moment according to vehicle performance, road conditions, weather, and the like. Even in the same vehicle, allowable Operational Design Domain (ODD) sometimes also changes depending on a case in which detection performance is deteriorated because of primary contamination of equipment loaded on an own vehicle, contamination of sensors, or the like. Therefore, an allowable automatic driving level sometimes also changes while the vehicle travels from a departure place to a destination. Further, in the case of transition of the automatic driving level in which switching measures from the automatic driving to the manual driving is requested, a handover section for the measures may is sometimes also set. Therefore, in the embodiment of the present disclosure, an ODD is set and updated based on various kinds of information that change from moment to moment. Note that, in the present specification, an actual use range for each of the automatic driving levels allowed according to an infrastructure, a traveling environment, and the like is referred to as "operation design domain" (ODD).

Further, when the ODD set for the traveling vehicle changes, contents of the secondary tasks allowed for the driver also change. In other words, since the contents of the unacceptable secondary tasks change according to the ODD, a range of the contents of the driver's actions considered to be traffic rule violations also change. For example, in the case of the automatic driving level 4, even the driver is allowed to perform a secondary task such as reading, when the automatic driving level 4 transitions to the automatic driving level 2, the secondary task such as reading is a violation act. In addition, since there is also sudden transition of the automatic driving levels in the automatic driving, the driver is required to be in a preparation state in which the driver can immediately return to the manual driving from the secondary task depending on a situation.

3. Example of Transition of the Automatic Driving Levels

Subsequently, an example of transition of the automatic driving levels according to the embodiment of the present disclosure is explained more in detail with reference to FIG. 3. FIG. 3 is an explanatory diagram for explaining the example of the transition of the automatic driving levels according to the embodiment of the present disclosure.

As illustrated in FIG. 3, it is assumed that the switching from the automatic driving mode (a range on the lower side in FIG. 3) to the manual driving mode (a region on the upper side in FIG. 3) is executed, for example, when sections of the automatic driving level 3 and the automatic driving level 4 on a traveling route are transitioned to sections of the automatic driving levels 0 and 1 and the automatic driving level 2.

Incidentally, it is difficult for the driver to consciously maintain the preparation state in which the driver can return to the manual driving while traveling in the automatic driving mode. For example, while traveling in the automatic driving mode, it is conceivable that the driver is indulged in a secondary task such as sleep (nap), viewing of a television or a video, or a game. For example, the driver only releases his/her hands from a steering wheel and is sometimes gazing forward or around the vehicle, is sometimes reading a book, or is sometimes dozing off as at the time of the manual driving. An awakening level (an awareness level) of the driver is different depending on the differences of the secondary tasks.

Further, when the driver falls into sleep while traveling in the automatic driving mode, the driver's consciousness level or determination level falls, that is, the awakening level falls. Since the driver cannot perform normal manual driving in a state in which the awakening level falls, when the driver switches the automatic driving mode to the manual driving mode in that state, it is likely that the driver causes an accident in the worst case. Therefore, even in the state in which the awakening level falls, the driver is required to return to a high awakening state in which the driver can drive the vehicle under normal consciousness (an internal awakening restored state) immediately before switching to the automatic driving mode to the manual driving mode. That is, in order to ensure safe traveling, switching from the automatic driving mode to the manual driving mode is required to be executed only when it can be observed that an internal awakening state of the driver has restored.

Therefore, in the embodiment of the present disclosure, in order to avoid induction of an accident or the like, such switching of the driving mode can be executed only when the driver is at a return response level to the manual driving mode, that is, when an active response indicating internal awakening restoration (a state in which the internal awakening state of the driver is restored) can be observed (illustrated in the center of FIG. 3). In the present embodiment, as illustrated in FIG. 3, when the active response indicating the internal awakening restoration cannot be observed, the driving mode is switched to an emergency evacuation mode such as MRM (Minimal Risk Maneuver). Note that, in the emergency evacuation mode, processing such as deceleration, stop, parking on a road, or parking in a side strip or an evacuation space is performed. In FIG. 3, since the transition from the automatic driving level 4 to the automatic driving level 3 does not involve the switching of the driving mode, the observation itself of the active response indicating the internal awakening restoration explained above is not performed. However, the present embodiment is not limited to the example illustrated in FIG. 3. The transition based on the observation or the observation result explained above may be performed also in the transition from the automatic driving level 4 to the automatic driving level 3. Note that, even if there is the active response, the driver is not always in a state in which the driver grasps all related situations. Therefore, safety can be considered a necessary condition in performing handover of steering.

Specifically, when the active response indicating the internal awakening restoration is not observed when the transition from the automatic driving level 4 to the automatic driving level 3 is performed, even if the driver should be obliged to return to the manual driving according to the legal system, the driver is not always in a state in which the driver can appropriately cope with a return request RTI (Request to Intervene) serving as the automatic driving level 3 from the vehicle control system. More specifically, in response to the return request RTI serving as the automatic driving level 3, the driver cannot always return to a state in which a brain awakening state is restored and a physical state in which the driver can manually drive without numbness or the like in the body. If the transition from the automatic driving level 4 to the automatic driving level 3 is performed in such a case, it is likely that a situation beyond a design concept assumed beforehand in the vehicle control system is caused and an accident or the like is induced. Therefore, in the embodiment of the present disclosure, in order to reduce the possibility explained above, even in a stage in which the vehicle control system side does not need to issue the return request RTI to the driver, in order to check a return response level (for example, an awakening level) of the driver, a preventive dummy return request RTI may be performed as appropriate to observe an active response indicating the internal awakening restoration of the driver.

Note that arrows indicating the transition of the automatic driving levels illustrated in FIG. 3 indicate directions of transition allowed to automatically perform switching. Further, transition in the opposite directions of arrows is not recommended because the transition causes misrecognition of the driver about a state of the vehicle control system. That is, in the vehicle control system according to the embodiment of the present disclosure, it is desirable that the vehicle control system is designed such that, when transition of the automatic driving levels is once performed to switch the automatic driving mode to the manual driving mode in which the driver intervenes, the vehicle control system does not automatically return to the automatic driving mode again without an active instruction from the driver. As explained above, providing directivity (irreversibility) in the switching of the driving mode means that the automatic driving mode is designed to be prevented from being set without a clear intention of the driver. Therefore, with the vehicle control system, since the automatic driving mode cannot be enabled only when the driver has a clear intention, for example, it is possible to, when the driving mode is not the automatic driving mode, prevent the driver from misunderstanding that the driving mode is the automatic driving mode and easily starting the secondary tasks.

As explained above, in the embodiment of the present disclosure, in order to ensure safe traveling, the switching from the automatic driving mode to the manual driving mode is executed only when it can be observed that the driver is in an internal restoration state.

4. Example of Monitoring

Therefore, an example of monitoring (observation) at the time of the switching from the automatic driving mode to the manual driving mode is explained with reference to FIG. 4. FIG. 4 is a flowchart for explaining an example of a monitoring operation according to the embodiment of the present disclosure. As illustrated in FIG. 4, in the embodiment of the present disclosure, for example, in the switching from the automatic driving mode to the manual driving mode, the vehicle control system executes the steps of Step S21 to Step S27. Details of these steps are explained below.

First, since the driver is traveling in the automatic driving mode, it is assumed that the driver is in a state in which the driver has completely left driving steering. Further, it is assumed that the driver is executing a secondary task such as a nap, video appreciation, indulging in a game, or work using a visual tool such as a tablet or a smartphone. However, it is assumed that the work using a visual tool such as a tablet or a smartphone is performed, for example, in a state in which a driver's seat is shifted or in a seat different from the driver's seat.

First, the vehicle control system intermittently executes passive monitoring and/or active monitoring on the driver as appropriate (Step S21). Here, the active monitoring and the passive monitoring are explained.

First, the active monitoring is an observation method in which the vehicle control system inputs active information to the driver and observes a conscious response of the driver to the active information in order to mainly perform intelligent perception, cognition, judgment, and behavior ability determination of the driver. Examples of the active information input to the driver include visual, auditory, tactile, olfactory, and (taste) information. These kinds of active information induce perception and cognitive actions of the driver. If the information is information affecting a risk, the driver executes determination/actions (responds) according to the risk. Therefore, it is possible to determine perception, cognition, determination, and action states in the brain of the driver by observing the response of the driver. Specifically, in the active monitoring, for example, when the vehicle control system executes steering control with a degree of a slight steering amount not affecting safe traveling of the vehicle as pseudo active information in order to urge feedback of the driver, an action of the driver for returning the steering to an appropriate steering amount is expected as a conscious response (if the driver is normally awakened). Specifically, since the driver performs a series of operations for perceiving and recognizing an unnecessary steering amount, determining to reset the unnecessary steering amount, and taking an action, an action corresponding to the above response (an action of returning the steering to an appropriate steering amount) is brought out. Therefore, by observing the response, it is possible to determine perception, cognition, judgment, and action states in the brain of the driver. Note that, during the traveling in the manual driving mode, the driver always performs a series of operations of perception, cognition, judgment, and actions for a road environment and the like in order to execute steering. Therefore, it is possible to observe the driver's conscious response without the vehicle control system side directly inputting the active information to the driver (that is, it can be considered that there is a response of driving steering.). Further, when the active information input explained above is repeatedly performed, these kinds of information are intelligently filtered in the brain of the driver and are treated as unnecessary (that is, "habituation"). Therefore, in the embodiment of the present disclosure, the frequency of the active information input is preferably set to an appropriate frequency in order to avoid the "habituation" explained above.

Next, the passive monitoring is executed, for example, when the conscious response of the driver to the direct active information input cannot be observed (actively monitored). There are various observation methods for the passive monitoring of the state of the driver. Examples of the observation methods include observation of biological information of the driver. More specifically, for example, in the passive monitoring, it is expected to perform detailed observation evaluation of a PERCLOS (eye opening ratio) related index, a head posture behavior, an eyeball behavior (saccade (rapid eye movement), fixation, microsaccade, and the like), blinking, a facial expression, a face direction, and the like when the user is seated on the driver seat and is in a drivable posture. Further, in a posture other than the seating, by using a wearable device or the like, it is possible to perform extended observation for observing, for example, a heart rate, a pulse rate, a blood flow, respiration, electroencephalogram, a sweating state, and the depth of sleepiness estimated from the heart rate and the respiration. Further, in the passive monitoring, seating or leaving in or from the driver's seat, movement, a destination, a posture, and the like of the driver may be observed. Further, a steering amount correlated with a cautious driving state of the driver (a state in which the driver is performing manual driving while maintaining appropriate attention to driving) may be directly observed. The information observed by the passive monitoring can be used to estimate a time required for the driver to return to the manual driving when the driving control system side emits a driving mode switching notification, an alarm, or the like during the traveling in the automatic driving mode. Further, the information observed by the passive monitoring can be used to determine presence or absence of switching to the emergency evacuation mode when it is not expected that the driver returns to the manual driving within a predetermined time.

Subsequently, the explanation is continued with reference to FIG. 4. The vehicle control system notifies the driver of the return request RTI to the manual driving (Step S22). At this time, for example, the driver is notified of the return request RTI to the manual driving through dynamic haptics such as vibration or visually or audibly. Then, in response to such notification of the return request RTI, the driver returns to the driver's seat if the driver is in a normal awakening state and returns to a high awakening state in which the driver can drive the vehicle under normal consciousness. Note that the return request RTI may be performed a plurality of times in stages. In this case, the return request RTI may be performed by different means in the stages or may be dynamically changed according to, for example, a state of the driver.

Subsequently, the vehicle control system monitors a seating state, a seating posture, and the like of the driver (Step S23). Further, the vehicle control system intensively executes active monitoring on the driver who is properly seated (Step S24). Examples of the active monitoring include, in order to urge the driver to return to a high awakening state in which the driver can drive the vehicle under normal consciousness, performing active information input to give warning or the like to the driver or input pseudo noise steering to manual steering control of the vehicle in a pseudo manner.

Subsequently, the vehicle control system intensively monitors the driver's face and eyeball behavior such as saccade (eyeball behavior intensive monitoring) (Step S25).

Here, monitoring of the eyeball behavior is described. Although information concerning a state of the driver can be observed by various means, it is difficult to directly observe a cognitive/determination action in the brain of the driver. For example, when an fMRI (functional Magnetic Resonance Imaging), an electroencephalogram (EEG), or the like is used, it is required to restrain a subject (the driver). Therefore, in the embodiment of the present disclosure, this is not suitable as means for observing a state of the driver. Therefore, in the present embodiment, means for observing an eyeball behavior of the driver is used as one of various biological information observation means. For example, when the driver is seated on the driver's seat, the eyeball behavior observation can be executed without particularly restraining the driver. That is, the eyeball behavior observation is considered to be non-invasive and non-wearable observation means.

The eyeball behavior partially includes a behavior that appears bioreflexibly, in which a response to an event change appears as an adaptive response to a loop not including a thinking element. Examples of the eyeball behavior include behaviors such as a smooth shoot (a sliding tracking eye motion) for tracking a visual relative moving object, a slow congestion caused by advanced background approach of the vehicle and a returning fast divergence movement, and a sliding tracking eye motion for cancelling a rotation of the own body and head and tracking a target direction. Further, the eyeball behavior includes not a reflective response but a behavior of grasping a feature of a visual target and tracking the feature in order to advance understanding. That is, since many phenomena that appear reflecting nerve transmission and processing in the brain are also simultaneously observed in the eyeball behavior, it is considered that an activity result such as recognition of a fixation target referred to is reflected in the memory of the brain. Therefore, by utilizing the fact that the cognitive function activity in the brain is reflected in the eyeball behavior, it is possible to highly accurately estimate an awakening level of the driver based on the analysis of the eyeball behavior. That is, by executing the eyeball behavior observation, at the time of the switching from the automatic driving mode to the manual driving mode (specifically, immediately before the switching), it is possible to indirectly observe whether the driver has returned to a high awakening level at which the driver can drive the vehicle under normal consciousness (a return response level). In particular, when the driver once leaves driving steering work and returns to the driving steering after a lapse of time, it is considered that the driver does not have sufficient memories of surroundings and a vehicle state necessary for returning to the manual driving. Therefore, the driver tries to quickly proceed with an action for grasping information that the driver would have grasped if the driver performed continuous manual driving, for example, visually checks a situation forward on a road or visually check a cause of the return request RTI to the manual driving from the vehicle control system. Such an information grasping action is reflected in the eyeball behavior of the driver.

Further, as explained above, since the eyeball behavior indicates a specific behavior for each of persons and further for each of states of the person, when it is attempted to accurately determine the awakening level of the driver by analyzing the eyeball behavior, it is required to always grasp and learn individual eyeball behaviors specific to the driver and determine the awakening level of the driver based on such learning. Furthermore, what the driver intensively checks and in what kind of priority order the driver performs the check at the time of returning to manual driving are greatly affected by memories based on the driver's past risk experiences and the like and, therefore, change because of various factors such as a road situation and traveling speed during traveling. Therefore, the eyeball behavior not only indicates a specific behavior for each of persons but also is affected by memories based on various experiences of the driver and changes. In the present embodiment, it is preferable that the awakening level determination is not performed using the uniform determination for a plurality of drivers but return ability determination for the drivers is performed based on learning obtained by intermittent learning in an active observation section. This makes it possible to more suitably perform the determination for each of the drivers.

Then, the vehicle control system determines the return response level of the driver by determining the awakening level of the driver based on the monitoring in Step S25 explained above (Step S26). Then, the vehicle control system determines whether the driver is at a return reaction level in which the driver adaptive to returning to the manual driving. Since the vehicle control system according to the present embodiment observes a return process of the driver in stages and observes responses of the driver in the stages halfway in the return process, it is possible to perform complex determination. Then, the vehicle control system executes the switching from the automatic driving mode to the manual driving mode when determining, based on the internal awakening return of the driver and the ability check of the manual driving behavior, that the return to the manual driving is possible with predetermined accuracy (Step S27). Characteristics of observed temporal changes of various types of eyeball behaviors of the driver are recognized, final takeover is performed while involving such characteristics, and the characteristics are labeled by takeover quality about success/failure for each takeover. Details of the above are explained below.

Note that the steps in FIG. 4 do not always have to be processed in the described order and may be processed with the order changed as appropriate or may be partially processed in parallel. For example, the active monitoring in Step S24 and the eyeball behavior intensive monitoring in Step S25 may be carried out in parallel or may be processed by changing the order illustrated in FIG. 4.

5. Detailed Configuration of the Vehicle Control System

Figure 5:
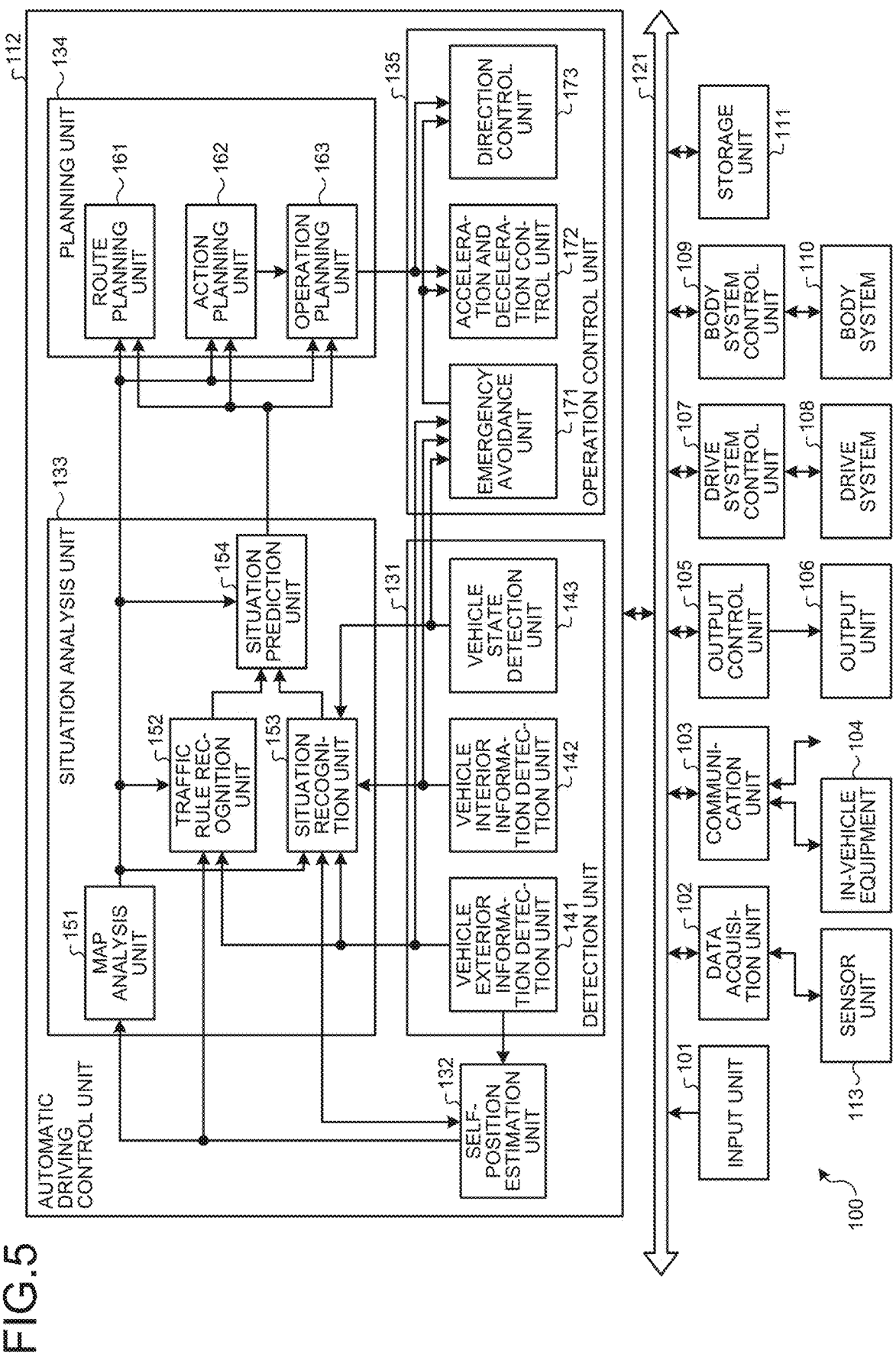
FIG. 5 is an explanatory diagram for explaining an example of a detailed configuration of a vehicle control system 100 according to the embodiment of the present disclosure.

Next, a detailed configuration of the vehicle control system 100 according to the embodiment of the present disclosure is explained with reference to FIG. 5. FIG. 5 is an explanatory diagram for explaining an example of a detailed configuration of the vehicle control system 100 according to the present embodiment. Note that, in the following explanation, when a vehicle provided with the vehicle control system 100 is distinguished from other vehicles, the vehicle is referred to as own car or own vehicle.

As illustrated in FIG. 5, the vehicle control system 100 mainly includes an input unit 101, a data acquisition unit 102, a communication unit 103, in-vehicle equipment 104, an output control unit 105, an output unit 106, a drive system control unit 107, a drive system 108, a body system control unit 109, a body system 110, a storage unit 111, an automatic driving control unit 112, and a sensor unit 113. The input unit 101, the data acquisition unit 102, the communication unit 103, the output control unit 105, the drive system control unit 107, the body system control unit 109, the storage unit 111, and the automatic driving control unit 112 are connected to one another via a communication network 121. The communication network 121 includes a vehicle-mounted communication network, a bus, or the like conforming to any standard such as a CAN (Controller Area Network), a LIN (Local Interconnect Network), a LAN (Local Area Network), or FlexRay (registered trademark). Each unit of the vehicle control system 100 may be directly connected without the communication network 121.

Note that, in the following description, description of the communication network 121 is omitted when the units of the vehicle control system 100 performs communication via the communication network 121. For example, when the input unit 101 and the automatic driving control unit 112 communicate with each other via the communication network 121, this is simply described as the input unit 101 and the automatic driving control unit 112 communicating with each other.

In the following explanation, details of the functional units included in the vehicle control system 100 according to the present embodiment is sequentially explained.

The input unit 101 is configured from a device used by a passenger such as the driver in inputting various data, instructions, and the like. For example, the input unit 101 includes operation devices such as a touch panel, a button, a microphone, a switch, and a lever and an operation device capable of performing input with a method other than manual operation by voice, gesture, or the like. For example, the input unit 101 may be a remote control device using infrared rays or other radio waves or externally connected equipment such as mobile equipment or wearable equipment adapted to the operation of the vehicle control system 100. The input unit 101 can generate an input signal based on data, an instruction, or the like input by the passenger and supply the input signal to the functional units of the vehicle control system 100.

The data acquisition unit 102 can acquire data used for processing of the vehicle control system 100 from the sensor unit 113 including various sensors and supply the data to the functional units of the vehicle control system 100.

For example, the sensor unit 113 includes various sensors for detecting, for example, a situation of the vehicle (the own car). Specifically, for example, the sensor unit 113 includes a gyro sensor, an acceleration sensor, an inertial measurement unit (IMU), and a sensor for detecting an operation amount of an accelerator pedal, an operation amount of a brake pedal, a steering angle of a steering wheel, engine speed, motor speed, rotation speed of wheels, or the like.

For example, the sensor unit 113 may include various sensors for detecting information concerning the outside the vehicle (the own car). Specifically, for example, the sensor unit 113 may include an imaging device such as a ToF (Time of Flight) camera, a stereo camera, a monocular camera, an infrared camera, or another camera. For example, the sensor unit 113 may include an environment sensor for detecting climate, weather, or the like and a surrounding information detection sensor for detecting an object around the own car. Examples of the environmental sensor include a raindrop sensor, a fog sensor, a sunshine sensor, and a snow sensor. Examples of the surrounding information detection sensor include an ultrasonic sensor, a radar, LiDAR (Light Detection and Ranging, Laser Imaging Detection and Ranging), and a sonar.

Further, for example, the sensor unit 113 may include various sensors for detecting a present position of the vehicle (the own car). Specifically, for example, the sensor unit 113 may include a GNSS (Global Navigation Satellite System) receiver or the like that receives a GNSS signal from a GNSS satellite. Further, a current position detected by the sensor unit 113 may be complemented by correcting a reference point based on position information by SLAM (Simultaneous Localization and Mapping) that can simultaneously perform self-position estimation and environmental map creation and position information detected by information from LiDAR (Light Detection and Ranging), a millimeter wave radar, or the like.

For example, the sensor unit 113 may include various sensors for detecting information inside the car. Specifically, for example, the sensor unit 113 can include an imaging device (a ToF camera, a stereo camera, a monocular camera, an infrared camera, or the like) that images the driver, a biological information sensor that detects biological information of the driver, and a microphone that collects sound in the vehicle interior. The biological information sensor is provided, for example, on a seat surface of a seat, a steering wheel, or the like and can detect biological information of a passenger sitting on the seat or the driver gripping the steering wheel. Examples of the biological information of the driver include a heart rate, a pulse rate, a blood flow, respiration, brain waves, a skin temperature, a skin resistance, a sweating state, a head posture behavior, and an eyeball behavior (gaze, blink, saccade, microsaccade, fixation, drift, gaze, pupil response of iris, and the like). These pieces of biological information can be detected by using a potential between predetermined positions on a body surface of the driver or the like, a contact-type observable signal of a blood flow system or the like using infrared light, a noncontact-type observable signal using a non-contact microwave or millimeter wave, or an FM (Frequency Modulation) wave, detection of an eyeball behavior using a captured image of the eyeball by an imaging device (a monitoring unit) using an infrared wavelength, overload torque measurement information of steering or pedal steering equipment for observing steering responsiveness, or the like alone or in combination.

The communication unit 103 can communicate with the in-vehicle equipment 104 and various kinds of equipment outside the vehicle, a server, a base station, and the like, transmit data supplied from the functional units of the vehicle control system 100 and supply received data to the functional units of the vehicle control system 100. Note that, in the embodiment of the present disclosure, a communication protocol supported by the communication unit 103 is not particularly limited. The communication unit 103 can also support a plurality of types of communication protocols.

For example, the communication unit 103 can perform wireless communication with the in-vehicle equipment 104 through wireless LAN, Bluetooth (registered trademark), NFC (Near Field Communication), WUSB (Wireless Universal Serial Bus), or the like. For example, the communication unit 103 can perform wired communication with the in-vehicle equipment 104 using a USB, an HDMI (High-Definition Multimedia Interface) (registered trademark), an MHL (Mobile High-definition Link), or the like via a not-illustrated connection terminal (and, if necessary, a cable).

Furthermore, for example, the communication unit 103 can communicate with equipment (for example, an application server or a control server) present on an external network (for example, the Internet, a Cloud network, or a company-specific network) via a base station or an access point. For example, the communication unit 103 can communicate with a terminal present near the own car (for example, a terminal of a pedestrian or a store, a terminal carried by an inspector, or an MTC (Machine Type Communication) terminal) using a P2P (Peer To Peer) technology. Furthermore, for example, the communication unit 103 may perform V2X communication such as vehicle to vehicle communication, vehicle to infrastructure communication, vehicle to home communication, and vehicle to pedestrian communication. For example, the communication unit 103 may include a beacon receiving unit, receive radio waves or electromagnetic waves transmitted from a wireless station or the like installed on a road, and acquire information such as a current position, congestion, traffic regulations, a required time, or the like. Note that pairing with a forward traveling vehicle traveling in a section that can be a leading vehicle may be performed through the communication unit 103 to acquire information acquired from a data acquisition unit mounted on the forward vehicle as prior traveling interval information and perform complementary use for complementing data acquired by the data acquisition unit 102 of the own car. In particular, the communication unit 103 can be means for securing safety of the following platoon in platoon traveling by the leading vehicle or the like.

The in-vehicle equipment 104 can include, for example, mobile equipment or wearable equipment possessed by a passenger, information equipment carried in or attached to the own car, and a navigation device that searches for a route to any destination. Note that, considering that the passenger is not always fixed at a seating fixed position because of the spread of the automatic driving, the in-vehicle equipment 104 can be expanded to a video player, a game device, or other equipment that can be detachably used from the vehicle installation.

The output control unit 105 can control output of various kinds of information to the passenger of the own car or the outside of the car. For example, the output control unit 105 generates an output signal including at least one of visual information (for example, image data) and auditory information (for example, audio data) and supplies the output signal to the output unit 106 to thereby control output of the visual information and the auditory information from the output unit 106. Specifically, for example, the output control unit 105 combines image data captured by different imaging devices included in the sensor unit 113 to generate a bird's-eye view image, a panoramic image, or the like and supplies an output signal including the generated image to the output unit 106. Note that, when the bird's-eye view image, the panoramic image, or the like is generated, it is possible to reproduce a denser event by recording and storing an image before combination processing by a compound eye in an allowable use form. The recording and the storage of the image before the combination processing depends on storage of availability information of the recording and the storage and a transmission load. For example, the output control unit 105 generates sound data including warning sound and a warning message for danger such as collision, contact, or entry into a danger zone and supplies an output signal including the generated sound data to the output unit 106.

The output unit 106 can include a device capable of outputting visual information or auditory information to the passenger of the own car or the outside of the car. For example, the output unit 106 includes a display device, an instrument panel, an audio speaker, a headphone, a wearable device such as a glasses-type display worn by the passenger, a projector, and a lamp. The display device included in the output unit 106 may be a device that displays visual information in the field of view of the driver such as a head-up display, a transmissive display, or a device having an AR (Augmented Reality) display function besides a device including a normal display. Note that the output unit 106 can include various devices that give an olfactory stimulus (giving a predetermined odor) or a tactile stimulus (for example, giving cold air, giving vibration, or giving electrical stimulation) to the driver in order to urge awakening of the driver when deeper leaving from the driving steering work of the driver occurs because of sleep or the like. Further, the output unit 106 may include a device or the like that gives bodily discomfort stimulation for, for example, moving a backrest of the driver's seat to force the driver to a posture that gives discomfort to the driver.

Examples of particularly important information output means in lifestyle in recent years include a cellular phone, a smartphone, and tablet equipment that the driver himself or herself brings into the vehicle. Such equipment can be used as an HMI (Human Machine Interface) with which the driver can check a series of information relating to traveling provided by an application used by the driver even if the driver does not move the line of sight to vehicle-mounted equipment. Therefore, in the present embodiment, input and output functions of these kinds of equipment can also be regarded and treated equivalently to the vehicle-mounted equipment.

The drive system control unit 107 can control the drive system 108 by generating various control signals and supplying the control signals to the drive system 108. The drive system control unit 107 may supply control signals to the functional units other than the drive system 108 according to necessity to perform, for example, notification of a control situation of the drive system 108.

The drive system 108 can include various devices relating to the drive system of the own car. For example, the drive system 108 includes a driving force generation device for generating a driving force such as an internal combustion engine or a driving motor, a driving force transmission mechanism for transmitting the driving force to the wheels, a steering mechanism for adjusting a steering angle, a braking device for generating a braking force, an ABS (Antilock Brake System), an ESC (Electronic Stability Control), and an electric power steering device.

The body system control unit 109 can control the body system 110 by generating various control signals and supplying the control signals to the body system 110. The body system control unit 109 may supply control signals to the functional units other than the body system 110 according to necessity and perform, for example, notification of a control situation of the body system 110.

The body system 110 can include various devices of a body system mounted on the vehicle body. For example, the body system 110 includes a keyless entry system, a smart key system, a power window device, a power seat, a steering wheel, an air conditioner, and various lamps (for example, head lamps, back lamps, brake lamps, blinkers, and fog lamps).

The storage unit 111 can include a magnetic storage device such as a ROM (Read Only Memory) or a RAM (Random Access Memory), or an HDD (Hard Disc Drive), a semiconductor storage device, an optical storage device, or a magneto-optical storage device. The storage unit 111 can store various programs, data, and the like used by the functional units of the vehicle control system 100. For example, the storage unit 111 stores map data such as a three-dimensional high-precision map such as a dynamic map, a global map that has lower accuracy than the high-precision map and covers a wide area, and a local map including information around the own car.

The automatic driving control unit 112 can perform control concerning automatic driving such as autonomous traveling or driving support. Specifically, for example, the automatic driving control unit 112 performs cooperative control for the purpose of implementing a function of an ADAS (Advanced Driver Assistance System) including collision avoidance or impact mitigation of the own car, follow-up traveling based on an inter-vehicle distance, vehicle speed maintenance traveling, collision warning of the own car, lane deviation warning of the own car, or the like. For example, the automatic driving control unit 112 can perform cooperative control for the purpose of automatic driving or the like for autonomously traveling without depending on operation of the driver. Specifically, the automatic driving control unit 112 includes a detection unit 131, a self-position estimation unit 132, a situation analysis unit 133, a planning unit 134, and an operation control unit 135.

The detection unit 131 can detect various kinds of information necessary for controlling the automatic driving. The detection unit 131 includes a vehicle exterior information detection unit 141, a vehicle interior information detection unit 142, and a vehicle state detection unit 143.

The vehicle exterior information detection unit 141 can perform detection processing for information concerning the outside of the own car based on data or signals from the units of the vehicle control system 100. For example, the vehicle exterior information detection unit 141 performs detection processing, recognition processing, and tracking processing for an object around the own car and detection processing for a distance to an object. Examples of the object to be detected include a vehicle, a person, an obstacle, a structure, a road, a traffic light, a traffic sign, and a road sign.

For example, the vehicle exterior information detection unit 141 performs detection processing for an environment around the own car. Examples of the environment around the own car to be detected include weather, temperature, humidity, brightness, road surface conditions, and the like. For example, the vehicle exterior information detection unit 141 supplies data indicating a result of the detection processing to the self-position estimation unit 132, a map analysis unit 151, a traffic rule recognition unit 152, and a situation recognition unit 153 of the situation analysis unit 133, and an emergency avoidance unit 171 of the operation control unit 135.

Note that the information acquired by the vehicle exterior information detection unit 141 can be received mainly by information supply by an infrastructure if a traveling section is a section to which a constantly updated LDM is supplied from the infrastructure as a section in which the automatic driving travel can be intensively performed. Alternatively, the information can be received in advance from a vehicle or a group of vehicles traveling ahead in the relevant section before the own car enters the section. In the present embodiment, for example, when the latest LDM is not always updated by the infrastructure, in particular, for the purpose of obtaining road information immediately before the relevant section in order to execute safe section entry in platooning or the like, the vehicle exterior information detection unit 141 may receive the road environment information via the leading vehicle that has entered the relevant section earlier. Whether the section is the section in which the automatic driving is possible is often determined according to presence or absence of prior information provided from the infrastructure corresponding to the relevant section. A fresh LDM, which can be always updated, configuring the automatic driving traveling propriety information on a route provided by the infrastructure is so-called "information" but behaves as if the LDM provided an "invisible trajectory". Note that, in the present specification, for convenience, the vehicle exterior information detection unit 141 is illustrated and explained on the premise that the vehicle exterior information detection unit 141 is mounted on the own vehicle and directly receives information from the infrastructure. However, the vehicle exterior information detection unit 141 is not limited this. For example, by receiving and using information that the preceding vehicle has regarded as "information", in the present embodiment, the vehicle exterior information detection unit 141 can further improve prior predictability of danger or the like that is likely to occur during traveling.

The vehicle interior information detection unit 142 can perform detection processing for vehicle interior information based on data or signals from the functional units of the vehicle control system 100. For example, the vehicle interior information detection unit 142 performs driver authentication processing and recognition processing, driver state detection processing, passenger detection processing, vehicle interior environment detection processing, and the like. Examples of a state of the driver to be detected include a physical condition, a degree of awakening, a degree of concentration, a degree of fatigue, a line-of-sight direction, a degree of influence of alcohol, a medicine, or the like, and an eyeball detailed behavior. Examples of a vehicle interior environment to be detected include temperature, humidity, brightness, and odor. The vehicle interior information detection unit 142 supplies data indicating a result of the detection processing to the situation recognition unit 153 of the situation analysis unit 133, the emergency avoidance unit 171 of the operation control unit 135, and the like. Note that, for example, when it has been estimated or found that the driver cannot achieve the manual driving within a predetermined expiration time after the driver is notified of the return request RTI to the manual driving and it has been determined that return to the manual driving cannot be made in time even if deceleration control is performed to delay time, the vehicle interior information detection unit 142 may issue an instruction to the emergency avoidance unit 171 and the like and start deceleration, evacuation, and stop procedures to evacuate the vehicle.

Furthermore, as explained above, since a use is also assumed in which the driver completely leaves the driving steering work, it is likely that the driver temporarily dozes off or starts other work (a secondary task). Therefore, it is required to grasp to which degree awakening return of consciousness necessary for driving return has progressed.

Therefore, the vehicle interior information detection unit 142 explained above mainly has two major roles. A first role is passive monitoring of a state of the driver during driving and a second role is active monitoring for detecting and determining, according to a conscious response of the driver, whether the driver is in a return reaction level in which the manual driving is possible after the return request RTI to the manual driving is notified.

The vehicle state detection unit 143 can perform detection processing for a state of the vehicle (the own car) based on data or signals from the units of the vehicle control system 100. Examples of a state of the host vehicle to be detected include statuses and contents of self-diagnoses of speed, acceleration, a steering angle, and presence or absence of an abnormality, a state of driving operation, a position and a tilt of a power seat, a state of a door lock, and a state of other vehicle-mounted equipment. The vehicle state detection unit 143 supplies data indicating a result of the detection process to the situation recognition unit 153 of the situation analysis unit 133, the emergency avoidance unit 171 of the operation control unit 135, and the like.

Note that examples of a state of the vehicle (the own car) to be recognized can include a cargo loading amount that determines a position, a posture, and movement (for example, speed, acceleration, and a moving direction) of the vehicle (the own car) and motion characteristics of the vehicle (the own car), movement of the center of gravity of the vehicle body involved in the cargo loading, tire pressure, braking distance movement involved in a brake braking pad wear situation, allowable maximum deceleration braking for preventing cargo movement caused by cargo braking, and centrifugal relaxation limit speed during curve traveling involved in the liquid loaded object. Note that, in the present embodiment, return start timing required for the control of the vehicle is different even in the completely same road environment because of vehicle-specific conditions, loaded cargo specific conditions, and the like and, in addition, a friction coefficient of a road surface, a road curve, a gradient, and the like. Therefore, in the present embodiment, it is required to collect and learn these various conditions and always reflect a learning result on estimation of optimal timing for performing control. Since influence or the like in the case in which these conditions for determining actual vehicle control actually leads to an accident also vary depending on the type of a haulage loaded on the vehicle, it is desirable to foresee safety by the user and operate the conditions by applying a desired bias to control as a safety coefficient. It is unnecessary to directly use a result uniformly obtained by learning.

The self-position estimation unit 132 can perform estimation processing for a position, a posture, and the like of the vehicle (the own car) based on data or signals from the functional units of the vehicle control system 100 such as the vehicle exterior information detection unit 141 and the situation recognition unit 153 of the situation analysis unit 133. The self-position estimation unit 132 can generate, according to necessity, a local map (hereinafter referred to as self-position estimation map) used for estimating a self-position.

The self-position estimation map is, for example, a highly accurate map using a technique such as SLAM. The self-position estimation unit 132 supplies data indicating a result of the estimation processing to the map analysis unit 151, the traffic rule recognition unit 152, the situation recognition unit 153, and the like of the situation analysis unit 133. The self-position estimation unit 132 can also cause the storage unit 111 to store the self-position estimation map.

The situation analysis unit 133 can perform analysis processing for a situation of the vehicle (the own car) and the surroundings. The situation analysis unit 133 includes a map analysis unit 151, a traffic rule recognition unit 152, a situation recognition unit 153, and a situation prediction unit 154.

The map analysis unit 151 can perform analysis processing for various maps stored in the storage unit 111 while using data or signals from the functional units of the vehicle control system 100 such as the self-position estimation unit 132 and the vehicle exterior information detection unit 141 according to necessity and construct a map including information necessary for the automatic driving processing. The map analysis unit 151 supplies the constructed map to the traffic rule recognition unit 152, the situation recognition unit 153, and the situation prediction unit 154 and a route planning unit 161, an action planning unit 162, an operation planning unit 163, and the like of the planning unit 134.

The traffic rule recognition unit 152 can perform recognition processing for traffic rules around the vehicle (the own car) based on data or signals from the units of the vehicle control system 100 such as the self-position estimation unit 132, the vehicle exterior information detection unit 141, and the map analysis unit 151. With this recognition processing, for example, a position and a situation of a traffic light around the vehicle (the own car), content of a traffic regulation around the own car, a lane on which the own car can travel, and the like are recognized. The traffic rule recognition unit 152 supplies data indicating a result of the recognition processing to the situation prediction unit 154 and the like.

The situation recognition unit 153 can perform recognition processing for a situation concerning the vehicle (the own car) based on data or signals from the functional units of the vehicle control system 100 such as the self-position estimation unit 132, the vehicle exterior information detection unit 141, the vehicle interior information detection unit 142, the vehicle state detection unit 143, and the map analysis unit 151. For example, the situation recognition unit 153 performs recognition processing for a situation of the vehicle (the own car), a situation around the vehicle (the own car), a situation of the driver of the vehicle (the own car), and the like. The situation recognition unit 153 generates, according to necessity, a local map (hereinafter referred to as situation recognition map) used to recognize a situation around the vehicle (the own car). The situation recognition map can be, for example, an occupancy grid map. The situation recognition unit 153 supplies data (including a situation recognition map according to necessity) indicating a result of the recognition processing to the self-position estimation unit 132, the situation prediction unit 154, and the like. The situation recognition unit 153 causes the storage unit 111 to store the situation recognition map.

The situation prediction unit 154 can perform prediction processing for a situation concerning the vehicle (the own car) based on data or signals from the units of the vehicle control system 100 such as the map analysis unit 151, the traffic rule recognition unit 152, and the situation recognition unit 153. For example, the situation prediction unit 154 performs prediction processing for a situation of the vehicle (the own car), a situation around the vehicle (the own car), a situation of the driver, and the like. Note that examples of a situation of the vehicle (the own car) to be predicted include a behavior of the vehicle (the own car), occurrence of an abnormality, and a travelable distance. Examples of a situation around the vehicle (the own car) to be predicted include a behavior of a moving body around the vehicle (the own car), a change in a traffic light state, and a change in an environment such as weather. Examples of a situation of the driver to be predicted include a behavior and physical condition of the driver. Then, the situation prediction unit 154 supplies data indicating a result of the prediction processing to the route planning unit 161, the action planning unit 162, the operation planning unit 163, and the like of the planning unit 134 together with the data from the traffic rule recognition unit 152 and the situation recognition unit 153.

The route planning unit 161 can plan a route to a destination based on data or signals from the functional units of the vehicle control system 100 such as the map analysis unit 151 and the situation prediction unit 154. For example, the route planning unit 161 sets a route from a current position to a designated destination based on the global map. The route planning unit 161 sets automatic driving levels for sections on a traveling route based on an LDM or the like. For example, the route planning unit 161 may change the route based on a situation such as a traffic jam, an accident, a traffic restriction, or a construction, a physical condition of the driver, and the like. The route planning unit 161 supplies data indicating the planned route to the action planning unit 162 and the like.

The action planning unit 162 can plan, based on data or signals from the functional units of the vehicle control system 100 such as the map analysis unit 151 and the situation prediction unit 154, an action of the vehicle (the own car) for safely traveling on the route planned by the route planning unit 161 within a planned time. For example, the action planning unit 162 performs planning of start, stop, a traveling direction (for example, forward movement, backward movement, left turn, right turn, or direction change), a traveling lane, traveling speed, overtaking, and the like. The action planning unit 162 supplies data indicating the planned action of the vehicle (the own car) to the operation planning unit 163 and the like. Note that, for the purpose of avoiding an accident caused by another party, in parallel to traveling space information of a road necessary for control in normal times, information such as an open flat space (a vacant land or the like) in which the vehicle can physically travel and an entrance avoidance dangerous space (a pedestrian dense area such as a cliff or a station exit) may be further supplementarily managed for the purpose of avoiding an increase in severity of an accident and may be reflected on control as an evacuation space at the time of emergency control.

The operation planning unit 163 can plan, based on data or signals from the functional units of the vehicle control system 100 such as the map analysis unit 151 and the situation prediction unit 154, an operation of the vehicle (the own car) for realizing the action planned by the action planning unit 162. For example, the operation planning unit 163 plans acceleration, deceleration, a traveling trajectory, and the like. The operation planning unit 163 can plan setting of a driving mode, timing for executing switching, and the like. The operation planning unit 163 supplies data indicating the planned operation of the vehicle (the own car) to an acceleration and deceleration control unit 172, a direction control unit 173, and the like of the operation control unit 135.

The operation control unit 135 can control an operation of the vehicle (the own car). The operation control unit 135 includes the emergency avoidance unit 171, the acceleration and deceleration control unit 172, and the direction control unit 173.

The emergency avoidance unit 171 can perform detection processing for an emergency such as collision, contact, entry into a danger zone, an abnormality of the driver, an abnormality of the vehicle, or the like based on detection results of the vehicle exterior information detection unit 141, the vehicle interior information detection unit 142, and the vehicle state detection unit 143. When detecting occurrence of an emergency, the emergency avoidance unit 171 plans an operation of the vehicle for avoiding an emergency such as a sudden stop or a sudden turn. The emergency avoidance unit 171 supplies data indicating the planned operation of the vehicle to the acceleration and deceleration control unit 172, the direction control unit 173, and the like.

The acceleration and deceleration control unit 172 can perform acceleration and deceleration control for realizing the operation of the vehicle (the own car) planned by the operation planning unit 163 or the emergency avoidance unit 171. For example, the acceleration and deceleration control unit 172 calculates a control target value of a driving force generation device or a braking device for realizing planned acceleration, deceleration, or sudden stop and supplies a control command indicating the calculated control target value to the drive system control unit 107. Note that, for example, there are mainly two cases in which an emergency can occur. One is a case in which an unexpected accident or an accident inducing factor occurs because of sudden reason during automatic driving on a road that is originally considered safe by an LDM or the like acquired from an infrastructure in a traveling route in the automatic driving mode and the driver cannot make an emergency return in time. The other is a case in which it is difficult to switch from the automatic driving mode to the manual driving mode because of some factor.

The direction control unit 173 can perform direction control for realizing the operation of the vehicle (the own car) planned by the operation planning unit 163 or the emergency avoidance unit 171. For example, the direction control unit 173 calculates a control target value of the steering mechanism for realizing the traveling trajectory or the sudden turn planned by the operation planning unit 163 or the emergency avoidance unit 171 and supplies a control command indicating the calculated control target value to the drive system control unit 107.

Figure 6:
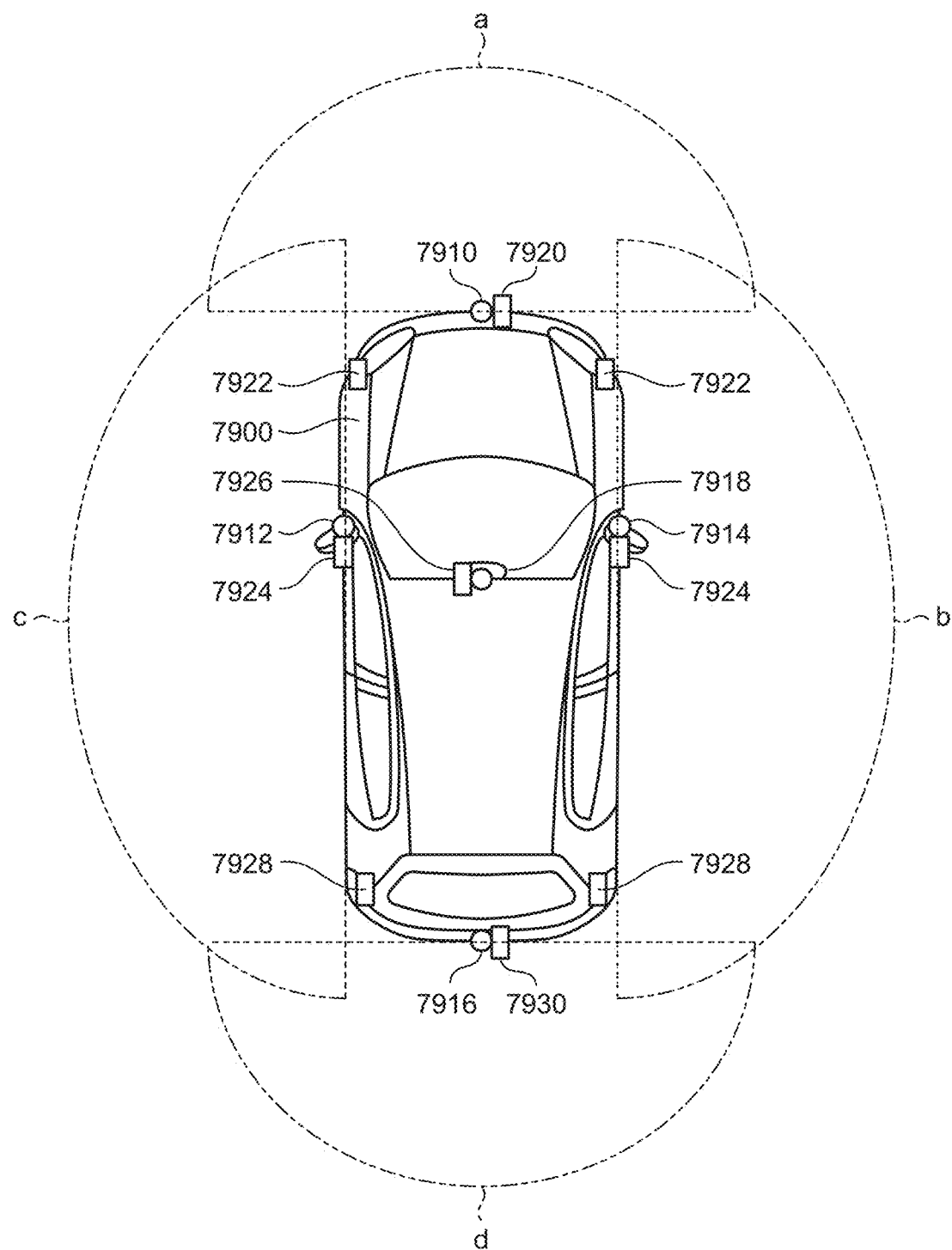
FIG. 6 is a diagram illustrating an example of an installation position of an imaging device included in a sensor unit 113.

Further, an example of an installation position of the imaging device included in the sensor unit 113 is explained with reference to FIG. 6. FIG. 6 is a diagram illustrating the example of the installation position of the imaging device included in the sensor unit 113. Imaging units 7910, 7912, 7914, 7916, and 7918 to which the imaging device can be applied illustrated in FIG. 6 are provided, for example, in at least one of a front nose, side mirrors, a rear bumper, a back door, or an upper part of a windshield in a vehicle interior of a vehicle 7900.

The imaging unit 7910 installed in the front nose and the imaging unit 7918 installed in the upper portion of the windshield in the vehicle interior mainly acquire images in the front of the vehicle 7900. The imaging units 7912 and 7914 installed in the side mirrors mainly acquire images of sides of the vehicle 7900. The imaging unit 7916 installed in the rear bumper or the back door mainly acquires an image behind the vehicle 7900. The imaging unit 7918 installed in the upper part of the windshield in the vehicle interior is mainly used to detect a preceding vehicle, a pedestrian, an obstacle, a traffic light, a traffic sign, a lane, or the like. In addition, in future automatic driving, when a vehicle turns to the right or the left, a pedestrian crossing a right or left turning destination road in a wider area or a range of an approaching object on a crossing road may be expanded and used.

Note that FIG. 6 illustrates an example of imaging ranges of the respective imaging units 7910, 7912, 7914, and 7916. An imaging range "a" indicates an imaging range of the imaging unit 7910 provided in the front nose, imaging ranges "b" and "c" respectively indicate imaging ranges of the imaging units 7912 and 7914 provided in the side mirrors, and an imaging range "d" indicates an imaging range of the imaging unit 7916 provided in the rear bumper or the back door. For example, image data captured by the imaging units 7910, 7912, 7914, and 7916 are superimposed, whereby a bird's-eye view image of the vehicle 7900 viewed from above is obtained. For example, the image data captured by the imaging units 7910, 7912, 7914, and 7916 are superimposed, whereby a bird's-eye view image of the vehicle 7900 viewed from above, an all-around stereoscopic display image surrounding the periphery of the vehicle with a curved plane, and the like can be obtained.

Vehicle exterior information detection units 7920, 7922, 7924, 7926, 7928, and 7930 provided in the front, the rear, the sides, the corners, and an upper portion of the windshield in the vehicle interior of the vehicle 7900 may be, for example, ultrasonic sensors or radar devices. The vehicle exterior information detection units 7920, 7926, and 7930 provided in the front nose, the rear bumper, the back door, and the upper portion of the windshield in the vehicle interior of the vehicle 7900 may be, for example, LiDAR devices. These vehicle exterior information detection units 7920 to 7930 are mainly used for detecting a preceding vehicle, a pedestrian, an obstacle, or the like. Results of the detection may be further applied to three-dimensional object display improvement of the bird's-eye view display and the all-around stereoscopic display.

6. Schematic Configuration of the Sensor Unit 113

Figure 7:
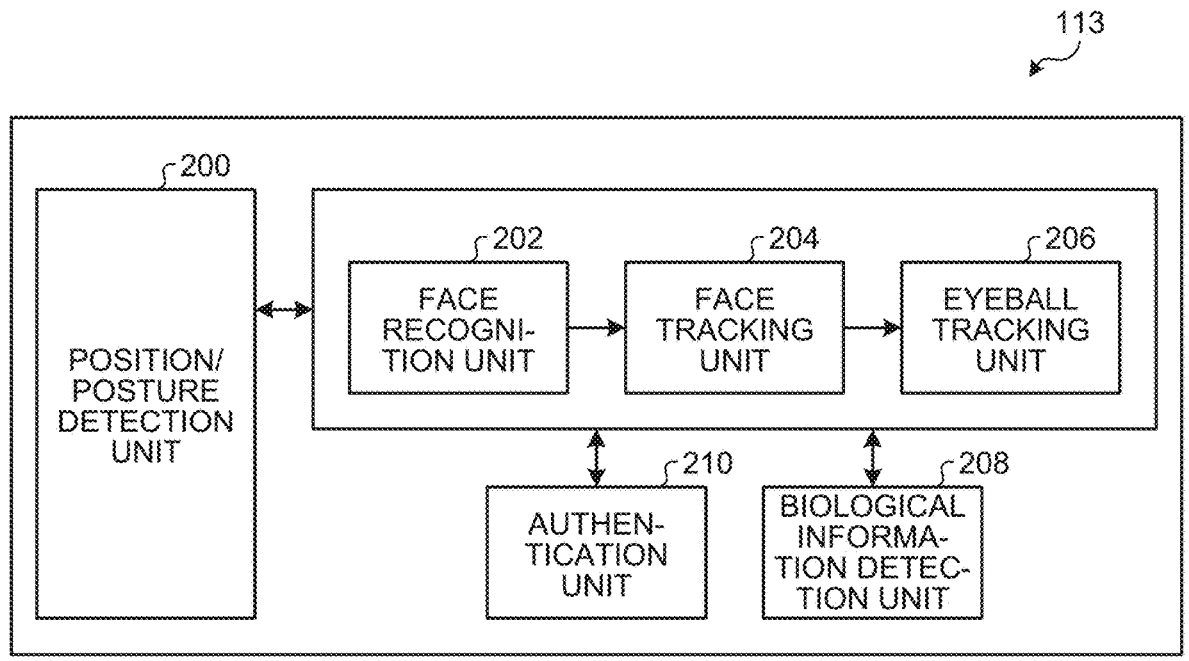
FIG. 7 is an explanatory diagram for explaining an example of various sensors included in the sensor unit 113.

Next, an example of various sensors for obtaining information concerning the driver in the vehicle included in the sensor unit 113 explained above are explained with reference to FIG. 7. FIG. 7 is an explanatory diagram for explaining the example of the various sensors included in the sensor unit 113 according to the present embodiment. FIG. 7 is a diagram illustrating the example of the various sensors included in the sensor unit 113 for obtaining information concerning the driver in the vehicle. As illustrated in FIG. 7, the sensor unit 113 includes, as a detector for detecting the position and the posture of the driver, a position and posture detection unit 200 including, for example, a ToF camera, a stereo camera, or a seat strain gauge. The sensor unit 113 includes a face recognition unit 202, a face tracking unit 204, and an eyeball tracking unit (a monitoring unit) 206 as detectors for obtaining biological information of the driver. In the following explanation, details of the various sensors included in the sensor unit 113 according to the present embodiment are sequentially explained.

The face recognition unit 202, the face tracking unit 204, and the eyeball tracking unit (the monitoring unit) 206 can be configured from various sensors such as an imaging device. For example, the face recognition unit 202 recognizes and detects the face of the driver or the like from a captured image and outputs detected information to the face tracking unit 204. The face tracking unit 204 detects movement of the face or the head of the driver based on the information detected by the face recognition unit 202. Further, the eyeball tracking unit 206 detects an eyeball behavior of the driver. Note that details of the eyeball tracking unit 206 according to the embodiment of the present disclosure are explained below.

Further, the sensor unit 113 may include a biological information detection unit 208 as another detector for obtaining biological information of the driver. The sensor unit 113 may include an authentication unit 210 that authenticates the driver. Note that an authentication scheme of the authentication unit 210 may be biometric authentication using a face, a fingerprint, an iris of a pupil, a voiceprint, or the like besides knowledge authentication by a password, a personal identification number, or the like and is not particularly limited. In the above explanation, the main sensors included in the sensor unit 113 are explained. However, the sensor unit 113 may include other various sensors.

Figure 8:
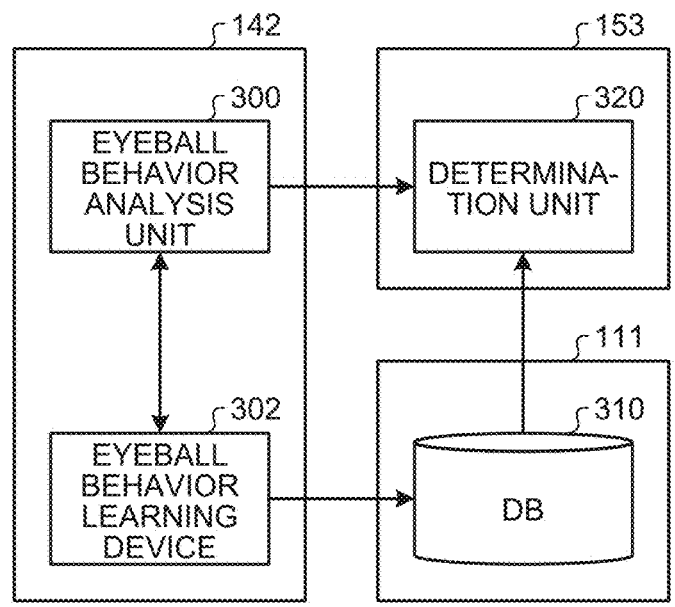
FIG. 8 is an explanatory diagram for explaining an example of a unit that executes determination of an awakening level of a driver according to the embodiment of the present disclosure.

7. Schematic Configuration of a Unit that Executes Determination of an Awakening Level of the Driver Next, a configuration example of a unit that executes determination of an awakening level (a return reaction level) of the driver according to the embodiment of the present disclosure is explained with reference to FIG. 8. FIG. 8 is an explanatory diagram for explaining an example of the unit that executes the determination of the awakening level of the driver according to the present embodiment. Specifically, the unit that executes the determination of the awakening level of the driver includes a part of the vehicle interior information detection unit 142 of the detection unit 131 illustrated in FIG. 5, the situation recognition unit 153 of the situation analysis unit 133, and the storage unit 111. More specifically, FIG. 8 illustrates an eyeball behavior analysis unit 300 and an eyeball behavior learning device 302 included in the vehicle interior information detection unit 142, a determination unit 320 included in the situation recognition unit 153, and a database (DB) 310 stored in the storage unit 111. These units cooperate to thereby determine the awakening level of the driver. In the following explanation, the functional blocks illustrated in FIG. 8 are sequentially explained.

(Eyeball Behavior Analysis Unit 300)

The eyeball behavior analysis unit 300 acquires, via the data acquisition unit 102, an eyeball behavior of the driver detected by the eyeball tracking unit 206 of the sensor unit 113 and analyzes the eyeball behavior. For example, the eyeball behavior analysis unit 300 detects and analyzes an eyeball behavior such as saccade (eyeball rotation), fixation, or microsaccade (eyeball minute rotation) of the driver's eyeball. Eyeball behavior information analyzed by the eyeball behavior analysis unit 300 is output to an eyeball behavior learning device 302 and a determination unit 320 explained below.

Further, in the present embodiment, the eyeball behavior analysis unit 300 can dynamically switch an analysis mode according to a driving mode or the like. For example, the eyeball behavior analysis unit 300 can switch between at least two analysis modes (a first analysis mode and a second analysis mode). Specifically, the eyeball behavior analysis unit 300 can perform an analysis at a high frame rate (a first frame rate) of, for example, 250 fps or more in one analysis mode (the first analysis mode), and can perform an analysis at a low frame rate (a second frame rate) of, for example, 60 fps in the other analysis mode (the second analysis mode).

More specifically, when an event occurs in which the driving mode is switched from the automatic driving mode to the manual driving mode, the eyeball behavior analysis unit 300 intensively samples and analyzes an eyeball behavior at a high frame rate in a period of a preparation mode for the switching (a period of a driving mode change preparation mode) (the first analysis mode). In this eyeball behavior analysis, the eyeball behavior analysis unit 300 executes observation (sampling) and an analysis of microsaccade or involuntary eye movement during fixation of the driver. Then, the determination unit 320 explained below determines an awakening level (a return reaction level) of the driver based on a result of the analysis. Further, a time length of a period of the eyeball behavior analysis in the period of the preparation mode explained above is preferably determined such that a sufficient time is secured to highly accurately determine an awakening level of the driver (that is, a return response level of the driver to the manual driving) before the vehicle reaches a switching point of the driving mode by the automatic driving levels set on a route based on an LDM or the like. Therefore, in the present embodiment, a start point (a monitoring point) of the period of the eyeball behavior analysis in the period of the preparation mode is determined based on a schedule (an itinerary), an LDM, a road state, traveling speed, a vehicle type (a trailer or a general passenger car), a seating state of the driver (state information acquired by steady cycle monitoring), and the like, that is, the time length of the period dynamically changes.

When the driving mode is the automatic driving mode, the eyeball behavior analysis unit 300 samples and analyzes an eyeball behavior at a low frame rate (the second analysis mode). This eyeball behavior analysis is executed as the passive monitoring explained above. For example, PERCLOS, saccade, and fixation are also observed and analyzed to determine drowsiness and a fatigue degree of the driver. When the driving mode is the automatic driving mode, the eyeball behavior analysis unit 300 may dynamically switch an analysis frequency according to the automatic driving level (the automatic driving level 3 or the automatic driving level 4). For example, in the automatic driving level 3, the eyeball behavior analysis unit 300 may execute the eyeball behavior analysis at a higher frequency than in the automatic driving level 4. As explained above, in the automatic driving level 3, in order to ensure safe traveling, the driver is expected to always in the preparations state in which the driver can immediately return to the manual driving. Therefore, in the automatic driving level 3, it is preferable that the eyeball behavior analysis is executed at a high frequency in order to detect drowsiness and a fatigue degree and determine whether the driver can immediately return to the manual driving.

However, in the above explanation, the specific automatic driving levels such as the automatic driving level 3 and the automatic driving level 4 are distinguished and described. However, this is for convenience and, in actual operation, the automatic driving levels are not always limited to be clearly distinguished and controlled. That is, since the automatic driving levels and the driving modes change according to a situation that changes from moment to moment, in the observation of kinds of equipment that observe the driver's state such as the eyeball behavior analysis unit 300, an observation corresponding to a situation is performed as appropriate in order to determine whether the driver has perception, cognition, judgment, and action ability necessary for returning to the manual driving.

Further, even when the driving mode is the automatic driving mode, the eyeball behavior analysis unit 300 may execute the eyeball behavior analysis at a high frame rate or a low frame rate, for example, in a period having a time length shorter compared with the time length of the period of the eyeball behavior analysis in the period of the preparation mode explained above in order to acquire teacher data for the eyeball behavior learning device 302 to learn explained below. For example, when a fall in an awakening level of the driver is detected by passive monitoring when the driving mode is the automatic driving mode, the eyeball behavior analysis unit 300 may execute an eyeball behavior analysis at a high frame rate (the first analysis mode). An analysis result in this case is teacher data (teacher data labeled as an eyeball behavior at the time of the awakening level fall) for the eyeball behavior learning device 302 to learn explained below.

On the other hand, when the driving mode is the manual driving mode, the eyeball behavior analysis unit 300 the eyeball behavior analysis unit 300 analyzes the eyeball behavior at a low frame rate (the second analysis mode). This eyeball behavior analysis is executed as the passive monitoring explained above. For example, PERCLOS, saccade, and fixation are also observed and analyzed to determine drowsiness and a fatigue degree of the driver. Even when the driving mode is the manual driving mode, the eyeball behavior analysis unit 300 may execute the eyeball behavior analysis in order to acquire teacher data (teacher data labeled as an eyeball behavior at the time when the awakening level is normal) for the eyeball behavior learning device 302 to learn explained below in a situation in which the driver is recognized as performing the manual driving at the normal time based on the driving operation of the driver. In order to acquire the teacher data, for example, the eyeball behavior analysis unit 300 executes the eyeball behavior analysis at a high frame rate or a low frame rate in a period having a shorter time length compared with the time length of the period of the eyeball behavior analysis in the period of the preparation mode explained above. Even when the driving mode is the manual driving mode, when a fall in the awakening level of the driver is detected by the passive monitoring, the eyeball behavior analysis unit 300 may execute eyeball behavior analysis at a high frame rate (the first analysis mode). An analysis result in this case is also teacher data (teacher data labeled as an eyeball behavior at the time of an awakening level fall) for the eyeball behavior learning device 302 to learn explained below.

That is, in the present embodiment, since the eyeball behavior analysis unit 300 does not always execute the eyeball behavior analysis at a high frame rate, it is possible to reduce a drive load that causes a temperature rise involved in a circuit operation such as imaging processing or analysis processing and a noise due to strong heat generation. Further, in the present embodiment, since the eyeball behavior analysis unit 300 executes the eyeball behavior analysis at a high event detection rate when necessary, it is possible to accurately determine an awakening level (a return reaction level) of the driver. Continuous high-speed driving of the imaging unit at unnecessary timing is wasted and heat generation of the imaging element and signal transmission is a factor of noise. There is an adverse effect that sensitivity of imaging performance is deteriorated at timing when originally necessary high-speed imaging observation is required.

(Eyeball Behavior Learning Device 302)

The eyeball behavior learning device 302 learns, as teacher data, an analysis result of eyeball behaviors of the driver labeled with awakening levels acquired in the past, generates the database 310 for determination by the determination unit 320 explained below, and outputs the database 310 to the storage unit 111 (see FIG. 5). In the present embodiment, for example, the eyeball behavior learning device 302 can be a supervised learning device such as a support vector regression or a deep neural network. In this case, an analysis result (an eyeball behavior) and an awakening level (at the normal time or at the fall time) labeled to the analysis result are respectively input to the eyeball behavior learning device 302 as an input signal and a teacher signal. The eyeball behavior learning device 302 performs machine learning about a relation between these kinds of input information according to a predetermined rule. A plurality of pairs of the input signals and the teacher signals explained above are input to the eyeball behavior learning device 302. The eyeball behavior learning device 302 performs machine learning on the input to generate the database (DB) 310 storing relation information indicating a relation between the analysis results (the eyeball behaviors) and the awakening levels. Note that the generated DB 310 is not limited to be stored in the storage unit 111 and may be stored in a server (not illustrated) on the Cloud in association with identification information for identifying the driver. The stored DB 310 can also be used in different vehicles when the driver changes a service vehicle or uses a share car, a rental car, or the like. Further, it is preferable that the information in the DB 310 is always updated regardless of where the information is stored. When a return requirement obtained according to a motion characteristic or the like varies depending on a type of a vehicle, normalization of an evaluation determination standard corresponding to the vehicle may be further performed. Note that, in the above explanation, learning and generation of the database (DB) are explained according to whether the awakening level is normal or falls. However, the learning may be performed by being further subdivided, segmented into return quality, and further associated with other driver state transition information to improve the accuracy of observable information acquired by observation means other than the eyeball behavior and prediction of awakening and return quality of the driver.

(Determination Unit 320)

The determination unit 320 determines an awakening level (a return reaction level) of the driver based on the analysis result of the eyeball behavior analyzed by the eyeball behavior analysis unit 300. For example, when it is confirmed that the driver is executing an eyeball behavior such as eyeball saccade, fixation, and microsaccade for solving a problem, the determination unit 320 can determine that the awakening level of the driver is high. On the other hand, when these eyeball behaviors are not observed or are small, the determination unit 320 can determine that the awakening level of the driver is low.

Specifically, the eyeball behavior indicates different behaviors when a person is in a normal awakening state and when the person is in a consciousness and awakening fall state. Further, the eyeball behavior indicates characteristic behaviors respectively depending on persons. Therefore, in the present embodiment, the determination unit 320 performs determination referring to the database (DB) 310 generated by the eyeball behavior learning device 302 in association with individual drivers. More specifically, in the present embodiment, the determination unit 320 determines an awakening level (a return response level) by comparing an analysis result of an eyeball behavior of the driver in a period of the preparation mode with the database (DB) 310 based on an analysis result of an eyeball behavior of the driver acquired in the past. Therefore, in the present embodiment, since the determination unit 320 determines the awakening level (the return response level) referring to eyeball behaviors specific to the individual drivers obtained based on the learning, the accuracy of the determination can be improved. Note that, since there are factors due to visual characteristics of persons and a visual check works in visual memories of risk factors in the past, appearance and the like of a difference in characteristics of each of persons is various.

Further, the determination unit 320 can output a determination result to the situation prediction unit 154 (see FIG. 5) or the planning unit (a mobile body driving control unit) 134 (see FIG. 5). For example, the planning unit 134 may make a plan for switching the driving mode based on the determination result by the determination unit 320.

8. Operation Example of the Eyeball Behavior Analysis Unit 300

Figure 9:
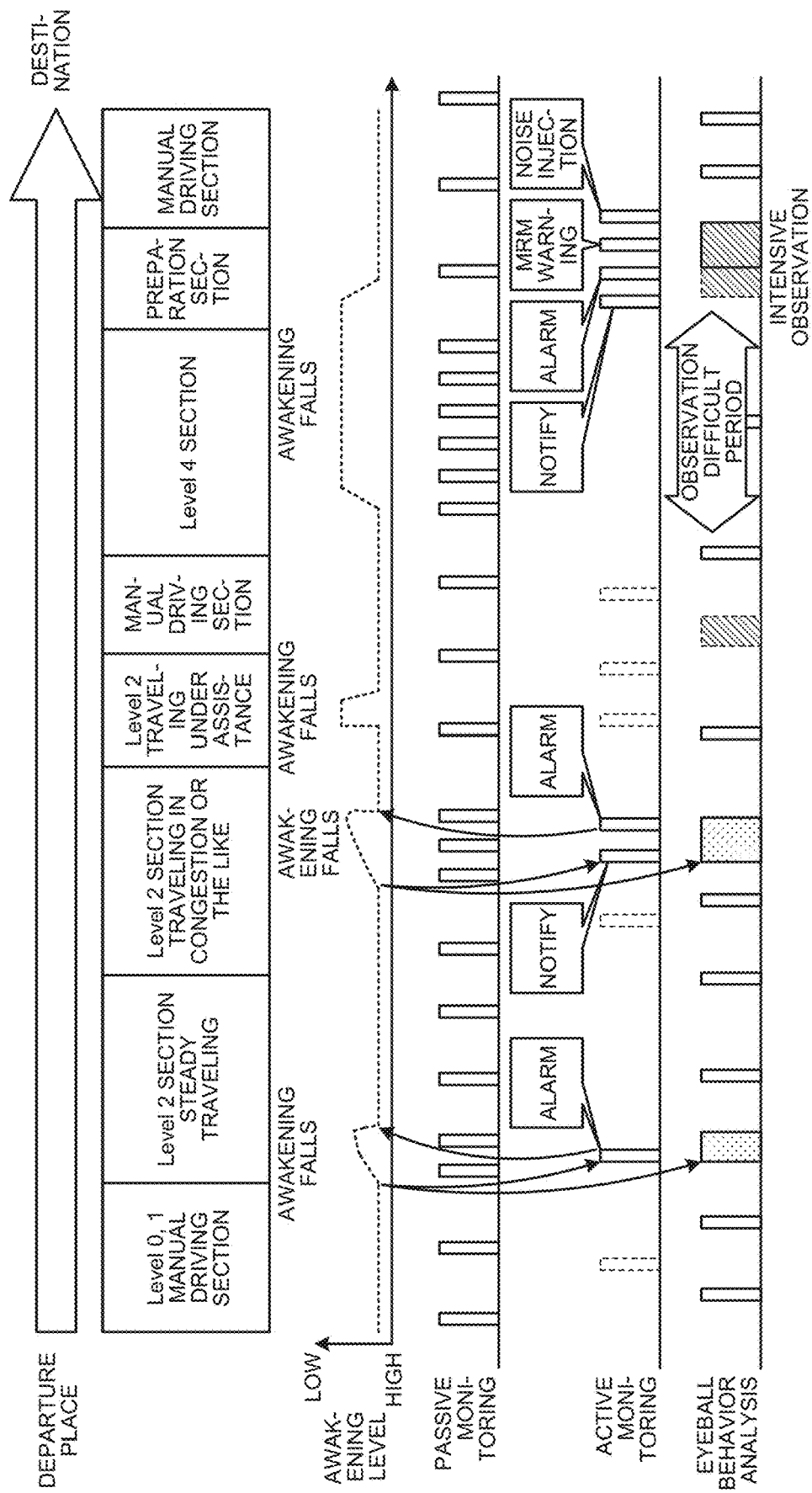
FIG. 9 is an explanatory diagram for explaining details of an operation example of an eyeball behavior analysis unit 300 according to the embodiment of the present disclosure.

Next, details of an operation example of the eyeball behavior analysis unit 300 according to the embodiment of the present disclosure is further explained with reference to FIG. 9. FIG. 9 is an explanatory diagram for explaining the details of the operation example of the eyeball behavior analysis unit 300 according to the embodiment of the present disclosure. Note that, in FIG. 9, it is assumed that the left end is a departure point (a departure place) and the right end is a destination point (a destination). In the following explanation, explanation is made from the departure point to the destination point.

First, in the present embodiment, as illustrated in FIG. 9, the passive monitoring is intermittently executed at a predetermined frequency irrespective of the driving mode. For example, the passive monitoring includes a behavior analysis of an eye at a low frame rate. The eyeball behavior analysis is executed, for example, for performing PERCLOS evaluation by observation of the entire eye, observing and analyzing saccade, fixation, and the like as detailed eyeball behaviors, and determining drowsiness and a fatigue degree of the driver.

In the present embodiment, in a traveling section in the manual driving mode at the automatic driving levels 0 and 1 illustrated on the left side of FIG. 9, not only the passive monitoring explained above but also an eyeball behavior analysis (for example, microsaccade) may be executed in order to acquire teacher data (teacher data labeled as an eyeball behavior at the time when an awakening level is normal) for the eyeball behavior learning device 302 to learn in a situation in which it is recognized that the driver is performing normal time manual driving based on a driving operation of the driver. In order to acquire the teacher data, for example, the eyeball behavior analysis unit 300 executes the eyeball behavior analysis at a high frame rate.

Further, for example, it is assumed that a fall in an awakening level of the driver is detected by the passive monitoring in a traveling section in a steady state, a traffic jam, or the like in the manual driving mode of the automatic driving level 2 illustrated on the left side of FIG. 9. In this case, the passive monitoring may be performed at a higher frequently and the eyeball behavior analysis (for example, a microsaccade) may be executed at a higher frame rate. An analysis result of the eyeball behavior in this case is teacher data (teacher data labeled as an eyeball behavior at the time of an awakening level fall) for the eyeball behavior learning device 302 to learn. Further, according to the detection of the fall in the awakening level of the driver, as the active monitoring, warning or notification may be given to the driver. The active monitoring can be executed by the driver consciously responding to the warnings or the notification. For example, as explained above, the notification is performed by the vehicle control system 100 executing steering control with a steering amount unnecessary as active information. In this case, an action of the driver to return steering to an appropriate steering amount is the conscious response. Further, as indicated by a broken line in FIG. 9, the active monitoring is not limited to being executed when the awakening level of the driver falls and may be periodically performed at a predetermined frequency. However, in the manual driving mode, since the driver is always performing road environment recognition determination for the manual driving, the execution of the active monitoring explained above is not essential except in a situation in which the awakening level of the driver has fallen.

In a section of the manual driving mode, the eyeball behavior analysis may be periodically executed.

In a traveling section in the automatic driving mode of the automatic driving level 4, it is likely that the driver has left the driver's seat. In the period, it is difficult to execute a periodic eyeball behavior analysis (an observation difficult period). Therefore, in the period, the passive monitoring may be performed at a higher frequency.

Subsequently, in a section of the preparation mode for the driving mode switching from the automatic driving mode to the manual driving mode, the eyeball behavior analysis is intensively executed at a high frame rate. Further, a time length of a period of the eyeball behavior analysis is preferably determined such that a sufficient time for highly accurately determining an awakening level of the driver is secured before the vehicle reaches a switching point of the driving mode according to the automatic driving level set on a route based on an LDM or the like. Therefore, in the present embodiment, a start point (a monitoring point) of the period of the eyeball behavior analysis is determined based on a schedule (an itinerary), an LDM, a road state, traveling speed, a vehicle type (a trailer or a general passenger car), a seating state (state information) of the driver, and the like, that is, the time length of the period dynamically changes. At this time, when a fall in the awakening level of the driver is detected, an operation for calling back internal awakening of the driver is performed on the driver in the order of notification, warning, MRM warning, noise injection (question in a quiz form), and the like and, at the same time, the active monitoring for detecting a conscious response of the driver is intensively executed.

That is, in the present embodiment, since the eyeball behavior analysis is not always executed at a high frame rate, loads of imaging processing, analysis processing, and the like can be reduced. Further, in the present embodiment, since the eyeball behavior analysis is executed at a high frame rate when necessary, it is possible to accurately determine the awakening level (the return reaction level) of the driver.

In the present embodiment, various kinds of observation for the driver are continuously performed, a tendency of the observation is learned, and the return reaction level such as the awakening level is determined considering a change in the tendency at every moment. This is because, even in the same driver, experiences and histories in the past of the driver affect perception, cognition, judgment, behavior, and the like of the driver. Specifically, for example, an observed eyeball behavior greatly changes according to how the driver feels the need to return (switch) from the automatic driving to the manual driving. For example, when information required to reduce a risk with an intuitive action is poor, searches for information that can be visually acquired increase and, if information necessary for determination is sufficiently prepared, it is possible to shift a search to an action without performing many information searches.

Therefore, when the information is insufficient, the driver repeats fixation or the like characterized by saccade, microsaccade, drift, tremor, and the like for searching for lacking information through recognition of individual visual information with the visual line directed to a target.

In particular, the driver visually searches for information remaining in the memory, having a high risk, and is insufficient for determination at a stage of performing risk determination in performing a return action from the automatic driving to the manual driving. For example, a driver who has been watching a video or operating a mobile terminal or the like without viewing forward for a while checks the front of the vehicle to grasp a situation, and looks at a lane and movements of an obstacle, a parallel driver, and an oncoming vehicle that affect a traveling direction of the vehicle, and performs a procedure such as a check of appearance of fixation for understanding the situation and message information of a return request RTI (notification). For example, in an urban area where a pedestrian partially protrudes onto a road or a school zone in which children jump out is mixed, a line-of-sight behavior for checking presence or absence of entry of a person into a road from a road peripheral portion is dominant.

A system for a human to temporarily accumulate and process information during the performance of a cognitive problem is called working memory (working storage). Information necessary for human action determination is accumulated and processed in the human working memory. However, it is considered that there are restrictions on a volume of the information that can be accumulated and a period in which the information can be accumulated. Specifically, the information accumulated in the working memory attenuates with the lapse of time and, for example, the working memory operates like a dynamic cache memory because memory of the information is faced in order from information with lowest importance. According to the spread of the automatic driving and the expansion of an operation design region usable in improving performance, it is considered that the need for a user to always check surrounding environment information necessary for safe manual driving gradually decreases. Accordingly, the number of times of a forward check necessary for traveling decreases or the forward check is not performed. When deviation work gradually increases from driving steering work, prior visual information of a traveling road required for determination decreases. In the first place, the driver at the manual driving time constantly performs the road forward check because there is a weight stimulus of a risk importance that can be a risk factor. The driver continuously executes a prior visual search without fail and refrains from inattentive driving. However, when the deviation work increases from the driving steering work, if a risk factor is poor in fading memory of the working memory, as a result, since the necessary to observe a periodic situation change also decreases, observation of a behavior of directing the line of sight and rechecking a situation also decreases. In the present embodiment, considering such characteristics of the working memory of the human in which stored information fades in order from information having the lowest risk importance as time elapses, information for appropriate manual driving is provided and notified to the driver at appropriate timing to perform, for example, observation of a state or a response of the driver.

For the driver to be able to normally start actual manual driving in response to a return request RTI (notification) for returning (switching) from the automatic driving to the manual driving, a period for acquiring information necessary for action determination is required. The visual information acquisition includes an act of acquiring information for performing feedback for behavior control besides a visual check which is an act of acquiring the latest information. Note that, in the present embodiment, for example, a human-machine interface such as means disclosed in Patent Literature 5 described above filed by the present applicant can be used for the information necessary for the action determination. For example, Patent Literature 5 described above discloses that a traveling route is segmented into various sections (a manual driving section, a driver intervention required section, and the like) and the traveling route is displayed to the driver in a different color and a different width for each of the sections. By devising a display time axis of approach information, according to the lapse of time (=traveling of the own car), the driver can visually learn when the driver approaches a section requiring measures. That is, since the driver constantly updates and provides approach information in a course involved in traveling along an itinerary of the vehicle as in Patent Literature 5, imminent takeover approach information is visually taken into the working memory of thought as a risk that time elapses and a takeover point approaches. Therefore, the driver can grasp the takeover approach information as an imminent risk. Providing visual approach information including semantic information in this way is a stimulus for checking a situation before handover given to the working memory. A way of giving the update information also affects a visual behavior of the driver. Therefore, in the present embodiment, when a state of the driver is estimated from the eyeball behavior analysis and an observation evaluation value thereof, an observation behavior may be evaluated by taking into account information provided to the driver as an influence factor. Information is updated and presented from moment to moment by the human-machine interface, whereby the driver recognizes, while involving a sense of temporal approach, the importance of the necessity of returning from the automatic driving to the manual driving. Therefore, visual information necessary for returning is accumulated in the working memory of the driver. In the action determination for returning of the driver, an action of acquiring lacking information before shifting to the action is executed based on the presented information and urgency due to the driver's sense of risk. Therefore, since prediction information required in traveling is planted (stored) in the working memory of the driver by the presented information of the human-machine interface and information that makes the driver feel the necessity of halfway recheck is provided as appropriate, it is possible to keep the driver's unconsciousness shallow. As a result, the determination of the driver is accelerated, leading to a reduction in a driver's return delay time (a manual driving returnable time) disclosed in Patent Literature 3 described above.

In the present disclosure, the main focus is put on the analysis of the eyeball behavior. However, when the awakening state of the driver is insufficient, since the feedback of the acquired information explained above is sometimes incompletely performed, various behaviors and the like appear besides the eyeball behavior, sometimes leading to excessive steering of the driver. Therefore, an eyeball behavior responding to the return request RTI (notification) is different between a driver who uses an automatic driving function while periodically checking prediction information obtained by predicting a situation of, for example, a point where the automatic driving is switched to the manual driving and a driver who completely neglects such a periodic check. Further, when the driver shifts to a steering action while time for the driver to return to manual driving is insufficient and situation grasping for the manual driving is incomplete, feedback in the steering action tends to be incomplete and overshoot steering with an inappropriate steering amount such as excessive steering sometimes appears.

Therefore, in order to cause the estimation of the return reaction level (the awakening level) and the return delay time of the driver by the analysis of the eyeball behavior to appropriately function, the vehicle control system 100 according to the embodiment of the present disclosure is constructed as a system in which approach information presented to the driver according to advance, additional information added to presented risk information, notification to the driver, an actual return action and an actual eyeball behavior induced by the approach information, the additional information, and the notification, steering stability that is a result of the return action and the eyeball behavior, and the like affect one another and determine a return behavior of the driver. Note that, in the description of the observation learning of learning, the eyeball behavior has been mainly described as observation learning. However, by setting various observation information acquired by the sensor unit 113 as learning targets, the estimation of the awakening state of the driver may be extended and used in addition to the eyeball behavior.

9. Background Leading to Creation of the Embodiment of the Present Disclosure <9.1 Use of the EVS>

Further, before details of the embodiment of the present disclosure are explained, a background for the inventor to create the embodiment of the present disclosure is explained.

As explained above, the vehicle control system 100 is required to grasp a state of a brain activity of the driver in order to determine a return reaction level. For example, when the driver temporarily takes a nap before returning to the manual driving and consciousness completely separates from the driving steering, an activity of making determination referring to memory necessary for grasping a situation (necessary for steering determination) in the brain decreases. In order to grasp whether an activity state for grasping a situation in the brain of the driver whose consciousness has once separates from the driving steering has returned to a consciousness level during the driving steering, it is desirable that the activity in the brain can be directly observed. However, in order to observe an actual state in the brain of the driver, a large-scale device such as a functional magnetic resonance imaging (fMRI) device or an electroencephalogram (EEG) device is required. It is not always possible to read an accurate thought content in the brain even if the observation is performed by the device. Further, it is unrealistic to load the device on the vehicle control system 100 explained above.

On the other hand, although the activity in the brain cannot be grasped in detail, an activity of referring to and determining memory necessary for grasping a situation in the brain of the driver (necessary for steering determination) is visually recognized and appears as an action of referring to the memory. Therefore, one aspect of the activity can be estimated by observing an eyeball behavior (saccade, microsaccade, or the like) of the driver. In the structure of the human eye, the central field of view used for detailed visual recognition is narrow and, therefore, when information such as a peripheral field of view and sound is obtained, the human turns the central field of view to a relevant direction. In the human body structure, since the inertia of the head and the eyeball is small as compared with when the entire body is moved, a time required for the head and the eyeball to change the direction is short. Therefore, the eyeball behavior can be a high-speed movement. Therefore, in order to accurately estimate a brain activity, it is effective to accurately observe a high-speed eyeball behavior. For example, in a behavior analysis of saccade of the eyeball, it is necessary to observe a line-of-sight change due to high-speed rotation of the eyeball. To grasp such high-speed rotation, it is required to dynamically detect coordinates of boundaries of the iris and the white of the eyeball with high resolution.

However, since the eyeball behavior is the high-speed movement, in a normal RGB camera (a visible light camera), an infrared camera, or an RGBIR camera used for visible light and infrared light in common (hereinafter, the cameras are uniformly referred to as RGB camera unless it is particularly necessary to distinguish the cameras), there is a limitation in a frame rate that can be constantly used because of a limit of data reading and transmission. Even if the frame rate is temporarily forcibly raised, a high operation frequency of the frame rate has a harmful result and causes a temperature rise of an imaging element. As a result, noise of the imaging element is increased by the temperature rise. It becomes difficult to grasp, without noise and in detail, the high-speed eyeball behavior to be observed.

Therefore, the present inventor has conceived that, in the vehicle control system 100 explained above, the eyeball behavior of the driver is observed using an event vision sensor (EVS) when the return reaction level (the awakening level) of the driver is determined by an analysis of the eyeball behavior.

The EVS is an image sensor that sensitively detects a luminance change. The EVS has a dynamic range wider than a dynamic range of a general RGB sensor or IR sensor because of a logarithmic conversion characteristic of photoelectric conversion. Therefore, it is possible to easily obtain edge information that is a change point of a luminance boundary of a subject in a wide area from a dark time to a bright range, which a frame accumulation type RGB sensor or IR sensor is not good at. The EVS does not have the concept of a frame rate and, if there is a frequent luminance change, can output relevant address information at a high data rate according to the luminance change. Further, when a luminance change occurs exceeding a threshold, the EVS sparsely outputs time stamp information and pixel information (coordinate information) of the luminance change, that is, does not output all pixel information for each fixed frame. Therefore, a data amount is smaller than a data amount of the RGB sensor and the IR sensor and a load of data transmission and arithmetic processing can be reduced.

<9.2 EVS>

Figure 10:
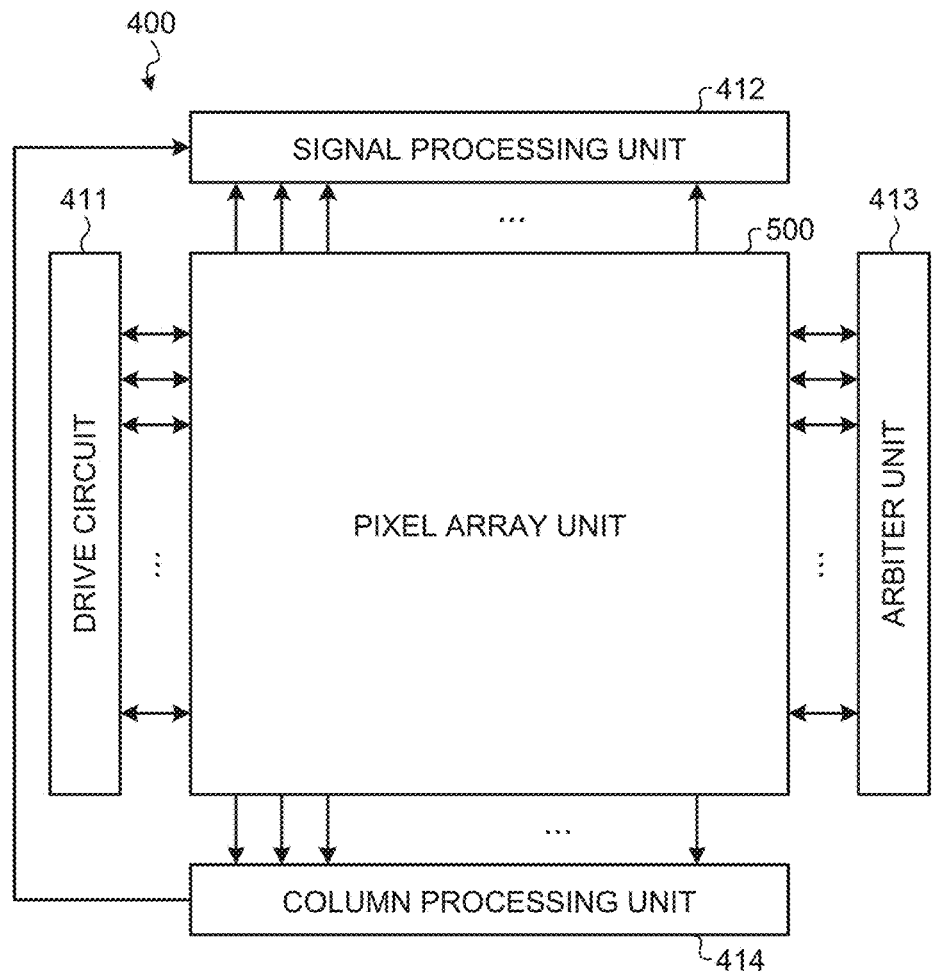
FIG. 10 is a block diagram illustrating an example of a configuration of an EVS 400 used in the embodiment of the present disclosure.
Figure 11:
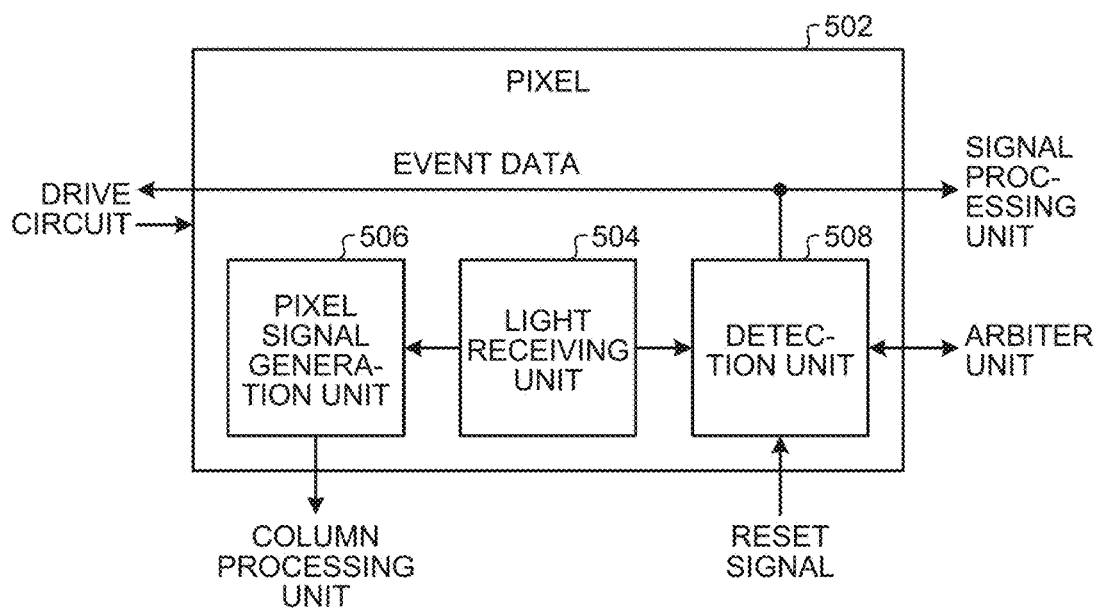
FIG. 11 is a block diagram illustrating an example of a configuration of a pixel 502 located in a pixel array unit 500 in the EVS 400 illustrated in FIG. 10.

Therefore, an event vision sensor (EVS) 400 is explained with reference to FIG. 10 and FIG. 11. FIG. 10 is a block diagram illustrating an example of a configuration of the EVS 400 used in the embodiment of the present disclosure. FIG. 11 is a block diagram illustrating an example of a configuration of a pixel 502 located in a pixel array unit 500 in the EVS 400 illustrated in FIG. 10.

As illustrated in FIG. 10, the EVS 400 includes the pixel array unit 500 configured by arraying a plurality of pixels 502 (see FIG. 11) in a matrix. The pixels 502 can generate, as a pixel signal, a voltage corresponding to a photocurrent generated by photoelectric conversion. The pixels 502 can detect presence or absence of an event by comparing a change in photocurrent corresponding to a change in luminance of incident light with a predetermined threshold. In other words, the pixels 502 can detect an event based on the fact that a brightness change has exceeded the predetermined threshold.

Further, as illustrated in FIG. 10, an EVS 2400 includes a drive circuit 411, an arbiter unit (an arbitration unit) 413, a column processing unit 414, and a signal processing unit 412 as a peripheral circuit unit of the pixel array unit 500.

When detecting an event, the pixels 502 can output, to the arbiter unit 413, a request for requesting output of event data representing occurrence of the event. When receiving a response representing permission for output of the event data from the arbiter unit 413, the pixels 502 output the event data to the drive circuit 411 and the signal processing unit 412. The pixel 502 that has detected the event outputs a pixel signal generated by photoelectric conversion to the column processing unit 414.

The drive circuit 411 can drive the pixels 502 of the pixel array unit 500. For example, the drive circuit 411 detects an event, drives the pixel 502 that has output the event data, and causes the pixel 502 to output a pixel signal of the relevant pixel 502 to the column processing unit 414.

The arbiter unit 413 can arbitrate a request for requesting output of event data supplied from each of the pixels 502 and transmit a response based on a result of the arbitration (permission/non-permission of the output of the event data) and a reset signal for resetting the event detection to the pixel 502.

The column processing unit 414 can perform, for each of columns of the pixel array unit 500, processing of converting analog pixel signals output from the pixels 502 in a relevant column into digital signals. The column processing unit 414 can also perform CDS (Correlated Double Sampling) processing on the digitized pixel signal.

The signal processing unit 412 can perform predetermined signal processing on the digitized pixel signal supplied from the column processing unit 414 and the event data output from the pixel array unit 500 and output the event data (time stamp information and the like) and the pixel signal after the signal processing.

The change in the photocurrent generated in the pixel 502 can be grasped as a light amount change (a luminance change) of light made incident on the pixel 502. Therefore, it can also be said that the event is a luminance change of the pixel 502 exceeding the predetermined threshold). Further, the event data representing the occurrence of the event can include at least position information such as coordinates representing the position of the pixel 502 in which the light amount change as the event has occurred.

Further, the pixel 502 is explained with reference to FIG. 11. In the pixel array unit 500 configured by arraying the plurality of pixels 502 in a matrix, each of the pixels 502 includes a light receiving unit 504, a pixel signal generation unit 506, and a detection unit (an event detection unit) 508.

Specifically, the light receiving unit 504 can photoelectrically convert incident light to generate a photocurrent. Then, the light receiving unit 504 can supply a signal of a voltage corresponding to the photocurrent to one of the pixel signal generation unit 506 and the detection unit 508 according to control of the drive circuit 411.

The pixel signal generation unit 506 can generate, as a pixel signal, the signal supplied from the light receiving unit 504. Then, the pixel signal generation unit 506 can supply the generated analog pixel signal to the column processing unit 414 via a vertical signal line VSL (not illustrated) corresponding to the column of the pixel array unit 500.

The detection unit 508 can detect presence or absence of occurrence of an event based on whether a change amount of the photocurrent from the light receiving unit 504 (that is, a luminance change amount by the incident light on the pixel 502) has exceeded a predetermined threshold. Examples of the event can include an on-event indicating that the change amount of the photocurrent has exceeded an upper limit threshold and an off-event indicating that the change amount falls below a lower limit threshold. Note that the detection unit 508 may detect only the on-event.

When an event occurs, the detection unit 508 can output a request for requesting output of event data representing the occurrence of the event to the arbiter unit 413. Then, when receiving a response to the request from the arbiter unit 413, the detection unit 508 can output event data to the drive circuit 411 and the signal processing unit 412. Note that, in the present embodiment, in particular, when pupil detection of a part, in particular, the eye of the face of the driver is specialized and the part is used in a behavior analysis of a region of the part, an ROI reading function for limiting, as an ROI (Region of Interest), a region to be read and allocated by the arbiter unit 413 may be provided. In particular, in the case of a pupil contour detection, since a target region is an ellipse of a quasi-circular region, it is also possible to further define a target region of a search arbiter with a center point and a radius and refrain from reading data.

9.3 Background Leading to Creation of the Embodiment of the Present Disclosure

However, while independently proceeding with studies about the vehicle control system 100, the present inventor recognized that the following problems could occur when observation data such as an eyeball behavior of a driver is to be acquired using the EVS 400. As explained above, the EVS 400 detects an event based on the fact that the brightness change has exceeded the predetermined threshold. Therefore, for example, when the threshold is reduced, the EVS 400 detects even a small change in luminance as an event. Therefore, events to be detected frequently occur and a data amount of the detected events increases. As a result, the data amount exceeds a transmission band of an interface, and a problem can occur in that the data cannot be transmitted to the other functional blocks and the like. In such a case, all the data detected by the EVS 400 cannot be transmitted. Therefore, as a result, a desired event originally desired to be detected cannot be detected. On the other hand, for example, when the threshold is increased, a problem can occur in that the EVS 400 cannot detect a desired event.

More specifically, when eyeball rotation occurs because of a saccade behavior, a luminance change occurs because of movement of a pupil boundary line, and, when the luminance change exceeds the threshold, the luminance change is detected by the EVS 400 as an event, and coordinate information of the pixel 502 in which the luminance change has occurred is output. In such a case, when the threshold is reduced, a problem can occur in that events to be detected frequently occur and a data amount of detected events exceeds the transmission band of the interface and cannot be transmitted. In addition, since a processing amount increases according to the data amount, a problem such as a rise in an operation temperature of the processing can also occur. On the other hand, when the threshold is increased and events to be detected decrease, the events detected by the EVS 400 become sparse with respect to the rotation of the eyeball. A problem can occur in that a movement key point of the point Cloud including a coordinate group moving according to the lapse of time based on the movement of the pupil boundary line cannot be accurately observed.

Furthermore, when not only the eyeball behavior of the driver but also the direction of the face, the expression, and the like are to be grasped by the EVS 400, it is difficult to achieve both of the observation of the eyeball behavior and the other observation in the EVS 400 because detection characteristics required for the eyeball behavior and the direction of the face, the expression, and the like greatly differ.

Therefore, in view of such a situation, the present inventor has created the embodiment of the present disclosure. In the embodiment of the present disclosure, when the eyeball behavior of the driver is observed using the EVS 400, the observation of the eyeball behavior can be optimized by adjusting a threshold that can define a frequency of event detection of the EVS 400. In the embodiment of the present disclosure, an illumination device that illuminates the driver may be dynamically adjusted as well. Consequently, according to the embodiment of the present disclosure, it is possible to perform event detection at an optimum frequency in order to accurately grasp a change to be observed while suppressing an increase in a data amount for observation of an eyeball behavior such as saccade, microsaccade, and drift, detection of blinks, a change in facial expression, and the like. While the adjustment of the threshold in detecting an event is discrete setting in design of a circuit, in the lighting device, since the threshold can be arbitrarily adjusted by a shutter of a light source device or the like, there is an advantage of high flexibility, for example, optimization adjustment can be performed.

Specifically, in the embodiment of the present disclosure, when a saccade behavior, a microsaccade behavior, and the like are observed using the EVS 400, the threshold of the event detection of the EVS 400 is adjusted at timing when the observation of the eyeball behavior is necessary. In this way, it is possible to efficiently and accurately grasp the saccade behavior and the microsaccade behavior while suppressing an increase in a data amount and reducing a load on arithmetic processing and transmission.

In the embodiment of the present disclosure, when the saccade behavior of the eyeball is observed using the EVS 400, light having a narrow band wavelength is illuminated on the face of the driver using a filter that selectively transmits the light having the narrow band wavelength at timing when the observation of the eyeball behavior is necessary. Consequently, since boundary shade formed by the iris and the pupil of the eyeball can be made conspicuous, the high-speed behavior of the eye such as the saccade and the microsaccade can be selectively and efficiently and accurately observed.

Details of the embodiment of the present disclosure created by the present inventors are explained below.

10. Embodiment

<10.1 Installation Position>

Figure 12:
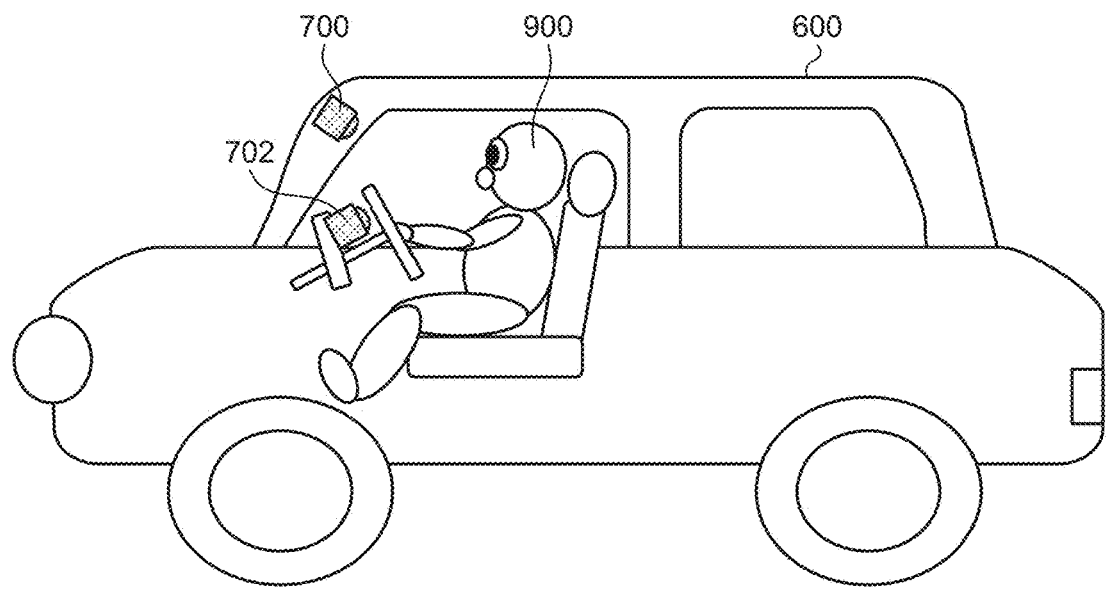
FIG. 12 is an explanatory diagram (part 1) for explaining installation positions of imaging devices 700 and 702 according to the embodiment of the present disclosure.
Figure 13:
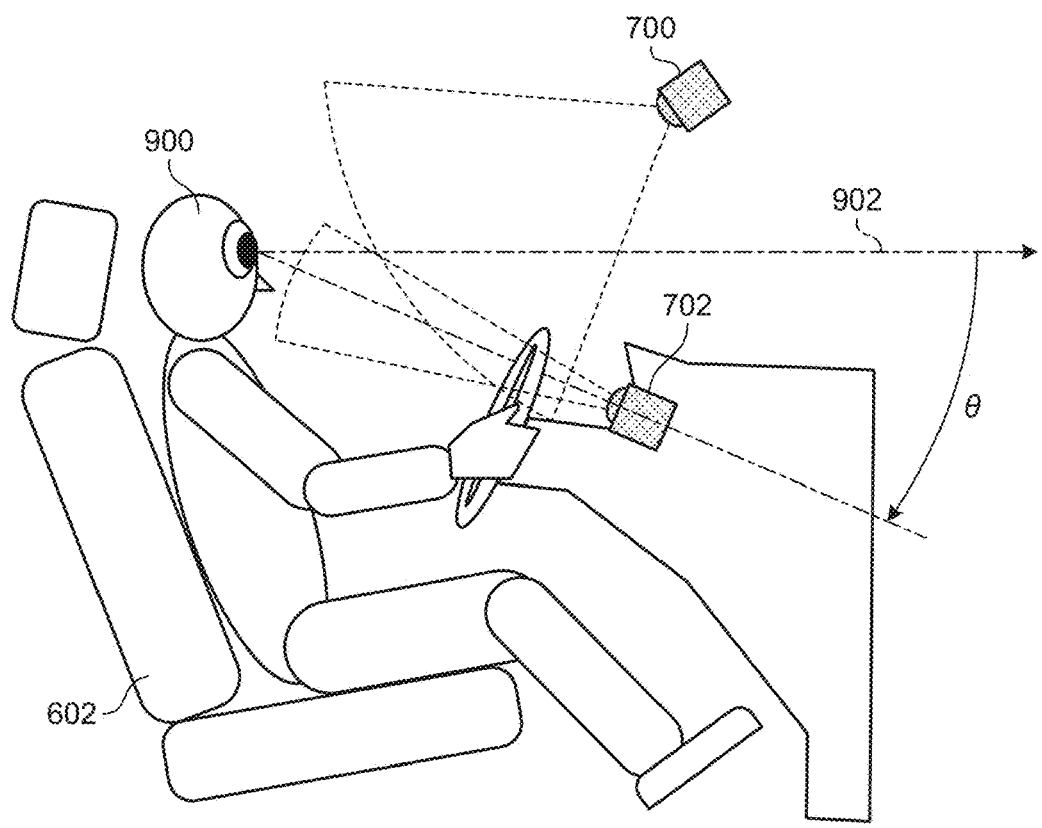
FIG. 13 is an explanatory diagram (part 2) for explaining the installation positions of the imaging devices 700 and 702 according to the embodiment of the present disclosure.
Figure 14:
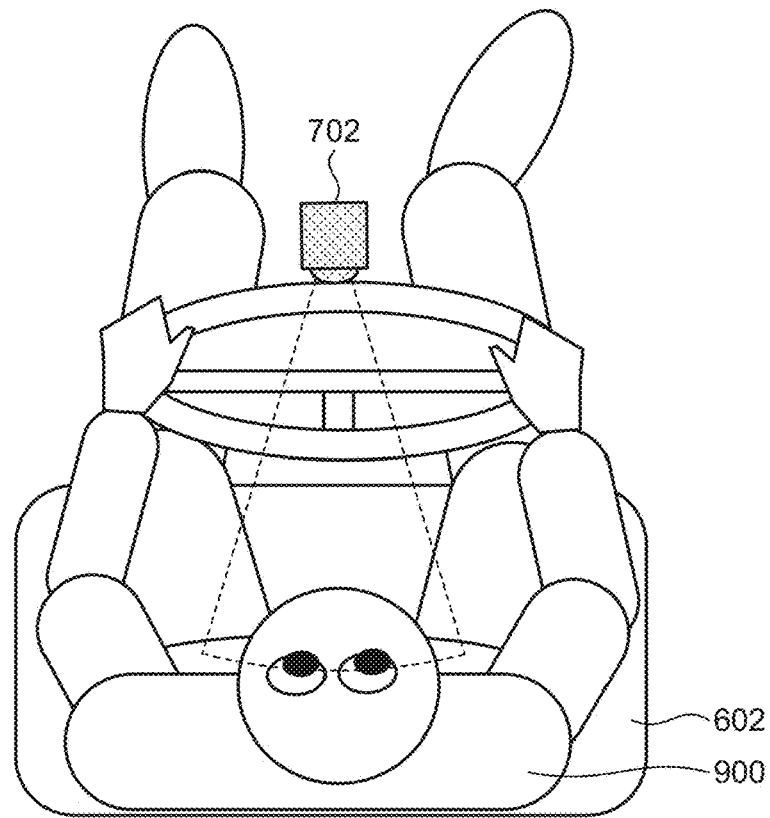
FIG. 14 is an explanatory diagram (part 3) for explaining the imaging devices 700 and 702 and the installation positions according to the embodiment of the present disclosure.

First, an example of an installation position of the EVS 400 in the embodiment of the present disclosure is explained with reference to FIG. 12 to FIG. 14. FIG. 12 to FIG. 14 are explanatory diagrams for explaining installation positions of imaging devices 700 and 702 according to the present embodiment.

First, the imaging device 700 is an imaging device that mainly observes the position of a driver 900 in a vehicle 600 and observes the face and a sitting posture of a driver 900 seated on a driver's seat 602 (see FIG. 13). For example, the imaging device 700 can be an RGB camera (a visible light camera) or can be a ToF camera. The imaging device 700 may be the EVS 400. As illustrated in FIG. 12, the imaging device 700 is preferably provided on the front upper side of the driver's seat 602 in the vehicle 600.

The imaging device 702 is an imaging device that images the inside of the vehicle 600 and, specifically, is an imaging device including the EVS 400 that mainly observes an eyeball behavior (saccade, fixation, microsaccade, and the like of an eyeball) of the driver 900. Note that, in the present embodiment, the imaging device 702 not only observes the eyeball behavior but also may observe a state of the face or the like of the driver 900 and may observe various states inside the vehicle 600. As illustrated in FIG. 12, the imaging device 702 is preferably provided near a lower part of a steering wheel on the front lower side of the driver's seat 602 in the vehicle 600.

More specifically, as illustrated in FIG. 13, when the driver 900 is viewed from a side, the imaging device 700 is provided on the front upper side of the driver's seat 602 in the vehicle 600 and has a wide angle of view to be able to mainly grasp the figure of the driver 900 seated on the driver's seat 602.

The imaging device 702 is provided to be opposed to the driver 900 to be able to mainly grasp the face of the driver 900 seated on the driver's seat 602. Specifically, as illustrated in FIG. 13, the imaging device 702 is preferably located below a line-of-sight direction 902 (a horizontal distant infinite sight line) at the time when the driver 900 views an object located at infinity in the front of the driver 900 not to disturb the field of view of the driver 900. Further, the imaging device 702 is preferably provided such that an angle θ formed by a line segment connecting the eyeball of the driver 900 and the imaging device 702 and the line-of-sight direction 902 is 10 degrees or more and less than 30 degrees such that the pupil of the driver 900 can be observed in the front. Note that the arrangement of the imaging device 702 is not limited to the above if the imaging device 702 can be arranged without disturbing the front direct view of the driver 900 using a half mirror, a wavelength selection mirror, or the like. The angle θ formed by the optical axis of the imaging device 702 does not need to be 10 degrees or more.

As illustrated in FIG. 14, when viewed from the upper side of the vehicle 600, the imaging device 702 preferably has an angle of view for enabling the imaging device 702 to grasp at least the face of the driver 900 seated on the driver's seat 602.

<10.2 Configuration Example of a Unit>

Figure 15:
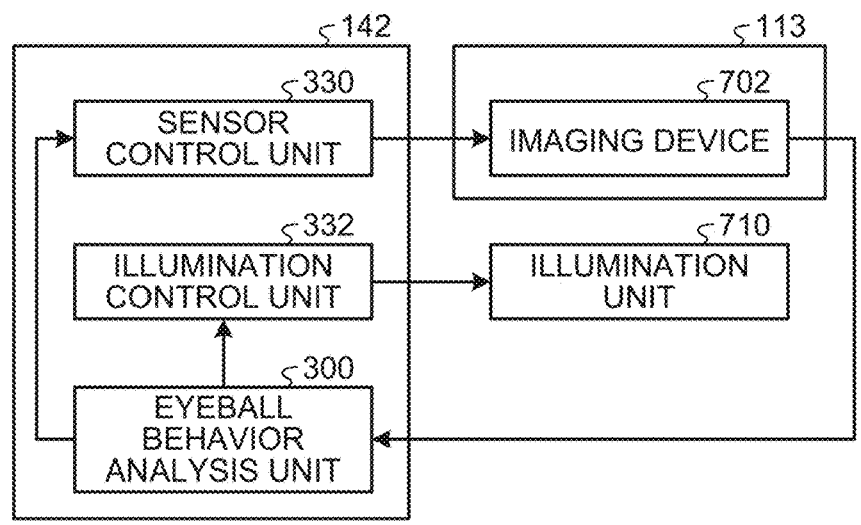
FIG. 15 is an explanatory diagram for explaining an example of a unit that executes observation of an eyeball behavior of the driver according to the embodiment of the present disclosure.

Next, a configuration example of a unit that executes observation of an eyeball behavior of the driver 900 according to the embodiment of the present disclosure is explained with reference to FIG. 15. FIG. 15 is an explanatory diagram for explaining an example of the unit that executes observation of an eyeball behavior of the driver 900 according to the present embodiment.

Specifically, the unit that executes observation of an eyeball behavior of the driver 900 mainly includes a part of the vehicle interior information detection unit 142 illustrated in FIG. 5, the imaging device 702 including the EVS 400 included in the sensor unit 113, and an illumination unit 710 that illuminates at least the face of the driver 900. The part of the vehicle interior information detection unit 142, the imaging device 702, and the illumination unit 710 cooperate, whereby observation of an eyeball behavior of the driver 900 according to the present embodiment is executed. In the following explanation, functional blocks illustrated in FIG. 15 are sequentially explained.

(Imaging Device 702)

As explained above, the imaging device 702 is an imaging device that observes an eyeball behavior of the driver 900 and includes the EVS 400. The imaging device 702 is controlled by a sensor control unit 330 explained below and outputs observed data to the eyeball behavior analysis unit 300.

(Illumination Unit 710)

The illumination unit 710 is provided in the vehicle 600 and can irradiate the face of the driver 900 with light (for example, near infrared light) having a predetermined wavelength when an eyeball behavior of the driver 900 is grasped. For example, a filter that mainly transmits light having a wavelength of 940 nm or more and 960 nm or less is disposed in an imaging device lens, whereby the illumination unit 710 can suppress the influence by external light by illuminating the face of the driver 900 with light having the narrow-band wavelength at timing when observation of an eyeball behavior is necessary. In the present embodiment, since boundary shade formed by the iris and the pupil of the eyeball can be made conspicuous by the near-infrared light with less noise of the external light (sunlight), an eyeball behavior (a saccade behavior) of the driver 900 can be selectively and efficiently accurately observed by the imaging device 702. Further, in the illumination unit 710, intensity, an irradiation time, an irradiation interval, and the like of light to be irradiated may be adjusted by an illumination control unit 332 explained below in order to more easily grasp the eyeball behavior of the driver 900. Note that wavelength sensitivity other than the above setting may be used according to a type of a light source to be used and a wavelength sensitivity distribution of a light receiving unit of an imaging device.

Note that, when the imaging device 702 is used as an imaging device that only observes an eyeball behavior, the filter may be applied to the imaging device 702. Consequently, the imaging device 702 can grasp only reflection of the near-infrared light with less noise of external light.

(Sensor Control Unit 330)

The sensor control unit 330 is provided in the vehicle interior information detection unit 142 and controls the imaging device 702. Specifically, when an eyeball behavior of the driver 900 is grasped, the sensor control unit 330 changes a threshold that can define a frequency of event detection of the imaging device 702 including the EVS 400. Consequently, the imaging device 702 can perform event detection at an optimum frequency in order to accurately grasp a change to be observed while suppressing an increase in a data amount for observation of an eyeball behavior such as saccade, microsaccade, and drift, blink detection, a facial expression change, and the like. Further, when the imaging device 702 has a function of grasping not only an eyeball behavior of the driver 900 but also the position and the posture of the driver 900, it is possible to accurately observe the eyeball behavior by temporarily optimizing a threshold for the observation of the eyeball behavior.

More specifically, for example, the sensor control unit 330 may set a region for grasping the face or the eyeball of the driver 900 in the pixel array unit 500 of the imaging device 702 as a region of interest (ROI), and change a threshold of the pixel 502 to output only data of the pixel 502 in the region. Further, the sensor control unit 330 may analyze observed data with the eyeball behavior analysis unit 300 and change a threshold by receiving feedback of an analysis result.

(Illumination Control Unit 332)

The illumination control unit 332 is provided in the vehicle interior information detection unit 142 and controls the illumination unit 710. Specifically, when an eyeball behavior of the driver 900 is grasped, the illumination control unit 332 controls intensity, an irradiation time, or an irradiation interval of light from the illumination unit 710. Consequently, the imaging device 702 can more easily grasp an eyeball behavior of the driver 900. Further, the illumination control unit 332 may analyze observed data with the eyeball behavior analysis unit 300 and control intensity, an irradiation time, or an irradiation interval of light from the illumination unit 710 by receiving feedback of an analysis result.

(Eyeball Behavior Analysis Unit 300)

The eyeball behavior analysis unit 300 analyzes data observed by the imaging device 702. Specifically, the eyeball behavior analysis unit 300 can distinguish a type of an eyeball behavior (saccade, microsaccade, or the like) based on a shape of a point distribution including position coordinate points of the pixel 502 of the imaging device 702 that has detected an event. More specifically, when appearance of a point distribution having a crescent shape is detected, the eyeball behavior analysis unit 300 analyzes that microsaccade has appeared. Furthermore, in the present exemplary embodiment, an analysis result of the eyeball behavior analysis unit 300 is used for determination in the determination unit 320 (determination of a return response level of the driver) and the driving mode is switched based on a determination result of the determination unit 320.

<10.3 Information Processing Method>

Figure 16:
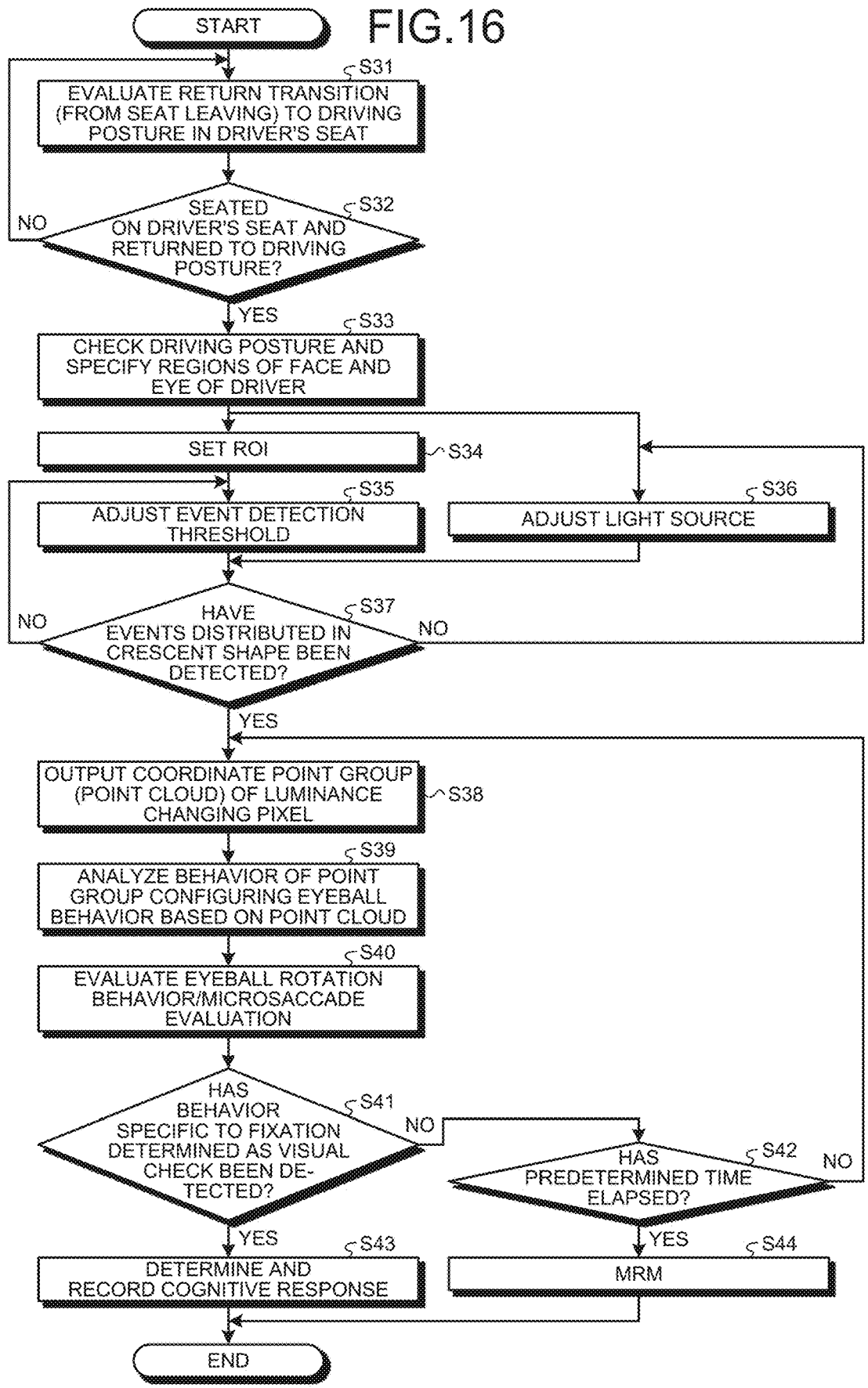
FIG. 16 is a flowchart (part 1) for explaining an example of an information processing method according to the embodiment of the present disclosure.
Figure 17:
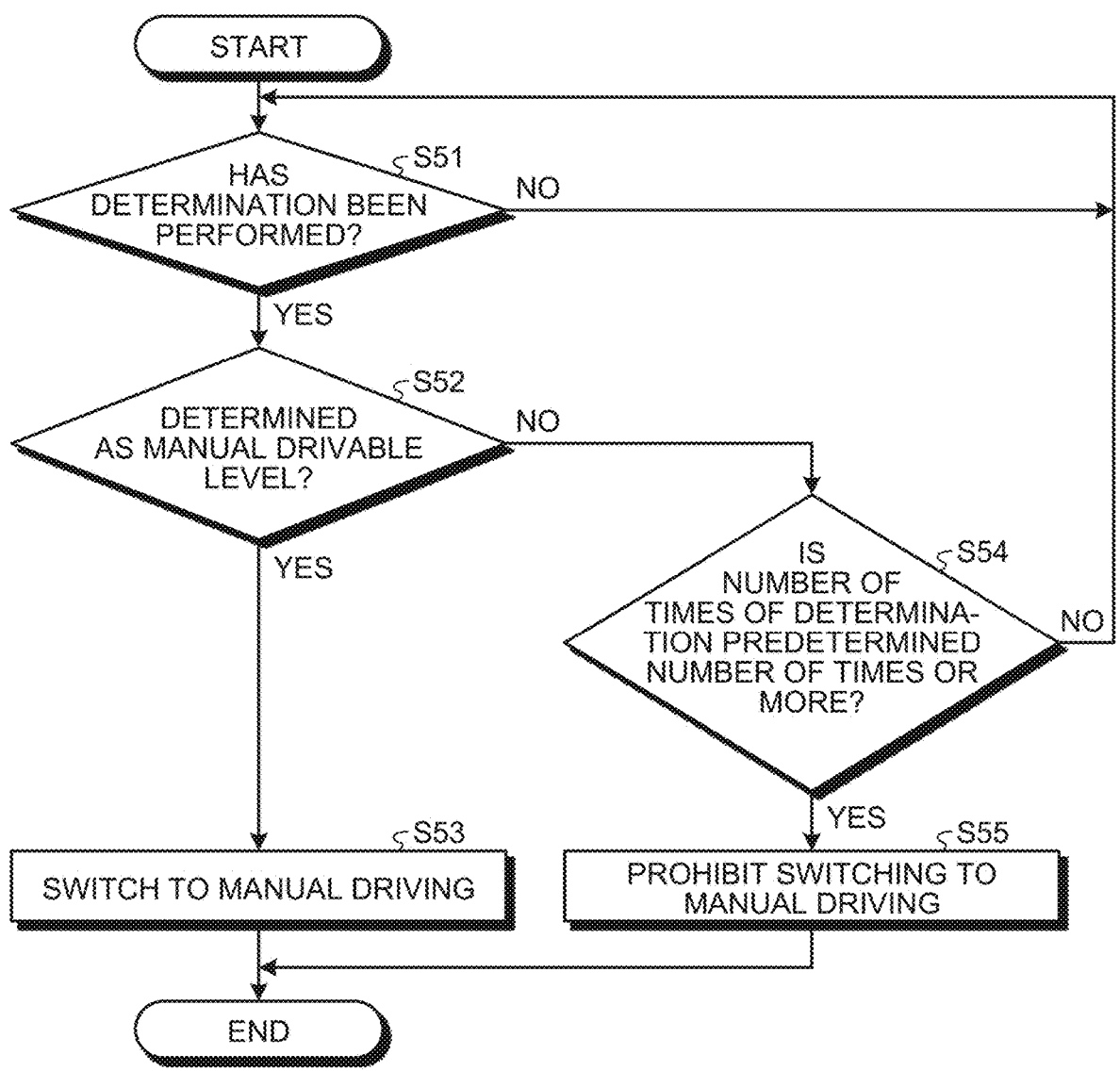
FIG. 17 is a flowchart (part 2) for explaining the example of the information processing method according to the embodiment of the present disclosure.
Figure 18:
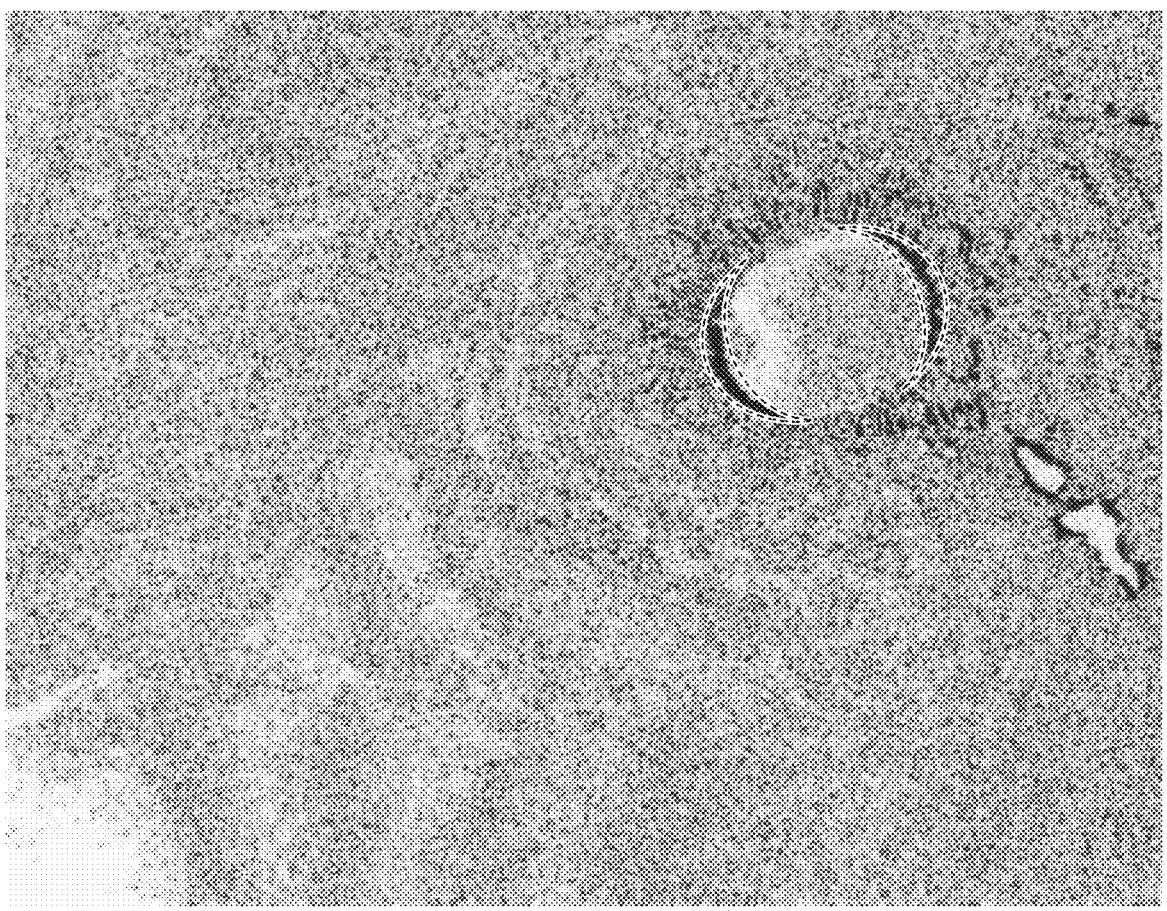
FIG. 18 is an explanatory diagram for explaining an example of observation data observed by the imaging device 702.

Next, an information processing method according to the embodiment of the present disclosure is explained with reference to FIG. 16 to FIG. 18. FIG. 16 and FIG. 17 are flowcharts for explaining an example of the information processing method according to the present embodiment. FIG. 18 is an explanatory diagram for explaining an example of observation data observed by the imaging device 702.

First, as illustrated in FIG. 16, the information processing method according to the present embodiment can include steps from Step S31 to Step S44. Details of the steps according to the present embodiment are explained below.

First, the vehicle control system 100 evaluates a return shift of the driver 900 to the driving posture in the driver's seat 602 from leaving from the seat to returning (Step S31). Next, the vehicle control system 100 determines whether the driver 900 has been seated on the driver's seat 602 and has returned to the driving posture (Step S32). When the driver 900 has been seated on the driver's seat 602 and has returned to the driving posture (Step S32: Yes), the vehicle control system 100 proceeds to Step S33. When the driver has not been seated on the driver's seat 602 or has not returned to the driving posture (Step S32: No), the vehicle control system 100 returns to Step S31. Note that a case in which the driver 900 is not in the driving posture even if the driver 900 is seated on the driver's seat 602 is conceivable as a case in which the driver 900 is dozing off (detected because of unstable shaking of the neck or the like caused by dozing off), distracted, or inappropriately seated facing a direction other than the front on the driver's seat 602. In the present embodiment, for example, the position and posture of the driver 900 may be specified by detecting the face and the like of the driver 900 from the observation data observed by the imaging devices 700 and 702 explained above.

The vehicle control system 100 checks the driving posture of the driver 900 and specifies the positions of the face and the eye region of the driver 900 (Step S33). In the present embodiment, for example, the positions of the face and the eyeballs of the driver 900 may be specified by detecting the face, the eyeballs, and the like of the driver 900 from the observation data observed by the imaging devices 700 and 702 explained above.

The vehicle control system 100 sets a region in the pixel array unit 500, which grasps the face or the eyeball, of the imaging device 702 as an ROI (Region of Interest) according to the position of the face or the eyeball of the driver 900 (Step S34). In the present embodiment, consequently, only data concerning an event detected in the pixel 502 corresponding to the set ROI only has to be output. Therefore, it is possible to suppress an increase in an amount of data to be output. Further, when the imaging device 702 has a function of grasping not only an eyeball behavior of the driver 900 but also the position and the posture of the driver 900, it is possible to accurately observe the eyeball behavior by temporarily optimizing a threshold for the observation of the eyeball behavior.

The vehicle control system 100 adjusts a threshold (an event detection threshold) that can define a frequency of event detection by the imaging device 702 (Step S35). At this time, only a threshold of the pixel 502 corresponding to the ROI set in Step S34 explained above may be adjusted. In the present embodiment, the threshold may be set to a predetermined numerical value according to an eyeball behavior (saccade or microsaccade) desired to be observed and may be further set according to attribute information (color of the iris, age, and sex) of the driver 900 registered in advance. In the present embodiment, the threshold may be set according to the influence of external light predicted according to a time at driving time, weather, and a state around a road during traveling (a terrain, a tunnel, or the like). Further, in the present embodiment, the threshold may be set based on a tendency of observation data of an eyeball behavior of the driver 900 machine-learned in every driving.

Thereafter, for example, when microsaccade appears in the eyeball of the driver 900, the boundary of the pupil moves and the imaging device 702 detects a luminance change due to the movement as an event. At this time, in the RGB camera, since individual differences are sometimes present in the boundary of the pupil, an iris pattern, and the like, bleeding, blurring, and the like occur, and it is difficult to conspicuously grasp microsaccade. However, in the present embodiment, in the imaging device 702 that is the EVS 400, the threshold is set to a threshold suitable for observation of microsaccade, whereby the microsaccade can be accurately grasped according to a point distribution (a point cloud) of the event.

In addition, microsaccade is caused by movement of skeletal muscles that pull the eyeball around the eyeball such as the superior and inferior rectus muscles, the lateral and medial rectus muscles, and the superior and inferior oblique muscles in the recess of the orbit. In particular, movement of the pupil from side to side is mainly caused by the superior and inferior rectus muscles and the lateral and medial rectus muscles. What is important here is to grasp microsaccade, which is search movement, as resurrection of thought activity necessary for brain activity based on visual information, in which the skeletal muscles receive commands directly from the brain and grasp slight wiggling movement of the eye caused by the skeletal muscles. In the present embodiment, by capturing such microsaccade, it is possible to grasp a thought activity in the brain by observing an eyeball behavior that is clearly different from eye movement without a definite purpose at an indifferent time, although content as content of thought cannot be directly interpreted.

Subsequently, the vehicle control system 100 adjusts the irradiation unit (the light source) (Step S36). In the present embodiment, for example, the vehicle control system 100 adjusts intensity, an irradiation time, or an irradiation interval of light from the illumination unit 710. In the present embodiment, consequently, the imaging device 702 can more easily grasp the eyeball behavior of the driver 900.

Subsequently, the vehicle control system 100 determines whether event data having a crescent distribution has been detected from the observation data as the eyeball behavior (Step S37). For example, as the microsaccade, the eyeball rotates at high speed as illustrated in FIG. 18, point data is sporadically generated assuming, as an event, a luminance change caused by movement of the pupil contour boundary across an imaging surface and is detected as a distribution of a crescent shape as a set of points for a fixed period. According to the rotation of the eyeball, a part having the largest amount of movement across the imaging surface is thick central portion of the crescent and, since boundary movement of the pupil is poor in the rotation, almost no event occurs at the tangent. Therefore, a sum of events occurring at fixed time intervals appears as such a region of the crescent distribution. In the case of the microsaccade, individual rotation is mainly random wiggling movement within fixation. When the event data having the crescent distribution has been detected (Step S37: Yes), the vehicle control system 100 proceeds to Step S38. When the event data having the crescent distribution has not been detected (Step S37: No), the vehicle control system 100 returns to steps S35 and S36. An aggregate of points generated by the movement of the eyeball is distributed as a crescent state because the aggregate is a result of a set obtained by the pupil boundary moving on an image plane to be swept for a fixed period and collecting generated event points with work. When the aggregate is schematized with finer temporal resolution, the aggregate is an arc having a line width distribution. However, the aggregate is represented as the crescent in order to clearly explain the principle configuring the present embodiment. An actual color and an actual shape of the pupil, a contour clarity difference of the boundary, and the like have individual differences depending on persons and change depending on various conditions such as an illumination condition, an available light source wavelength, and a hand pass width of a narrowband filter in use. Therefore, depending on illumination and detection conditions, a time-series set of a detected point cloud is sometimes not a crescent having a clear contour. In the present specification, detection events including detection event generated by an eyeball fine behavior in the case in which those clear regions are not relevant are described as the detection of the crescent distribution. That is, in the present embodiment, a shape of a distribution of detected event data may be, for example, a crescent shape or may be another shape and is not particularly limited.

Specifically, for example, when a person sees a target that the person cannot simply understand, the person visually grasps the target while referring to his/her own memory and further collates the target, detailed parts, and the memory to finally complete understanding of content of the target. In such a situation, in many cases, the person performs fixation with the eyeballs in order to grasp details. However, in this fixation, wiggling movement (microsaccade) due to random rotation of the eyeballs appears. As a result, in this microsaccade, when the boundary of the pupil moves in a rotation direction of the eyeball, a crescent distribution across the rotation direction, for example, illustrated in FIG. 18, appears as a change over time of a luminance change grasped by the imaging device 702. FIG. 18 schematically illustrates a crescent light and dark (left) point cloud and a crescent light and dark (right) point cloud developed by the microsaccade. Then, by performing fixation having a random eyeball behavior through the microsaccade while the driver 900 repeats reference and understanding of memory, the imaging device 702 observes a crescent point cloud and a state in which the boundary line of the pupil fluctuates near the boundary line of the crescent. That is, in the case of the microsaccade, for example, a point cloud having a shape different from a shape of a wide point cloud having width as large as the pupil, the point cloud being caused by large saccade movement during normal fixation is observed. Therefore, by observing the crescent point cloud, appearance of thought activity in the brain can be observed.

That is, in the present embodiment, by using the EVS 400 as the imaging device 702, it is possible to distinguish saccade and the microsaccade from each other with the shape of the observed point cloud. Specifically, the saccade, which is movement in a direction of fixation performed on an object present in a greatly different position, is observed as a thick band-like point cloud in a fixed direction along the movement of the saccade. On the other hand, the microsaccade at the time of fixation in a search for information details is observed as a crescent point cloud that rapidly wobbles centering on a fixation direction. Therefore, the saccade and the microsaccade can be distinguished from each other with the shape of the observed point cloud.

Further, in the present embodiment, in Step S35 and Step S36 in the case in which the event data having the crescent distribution is not detected (Step S37: No), the threshold for event detection by the imaging device 702, the intensity, the irradiation time, the irradiation interval, or the like of the light from the illumination unit 710 may be adjusted again based on an analysis result of observation data by the imaging device 702. In Step S35 and Step S36, adjustment of an event determination threshold and adjustment of an illumination light source are performed, the event determination threshold and the illumination light source being generated at a frequency at which occurrence of an event can be grasped as a crescent distribution by the movement of the pupil boundary according to the pupil rotation generated in microsaccade.

The imaging device 702 of the vehicle control system 100 outputs a coordinate point group (a point cloud) of a luminance changing pixel (Step S38). Subsequently, the vehicle control system 100 performs a detailed analysis of a point group configuring the eyeball behavior based on the point cloud output in Step S38 (Step S39). Then, the vehicle control system 100 evaluates, in detail, the eyeball behavior, that is, the eyeball behavior such as saccade (eyeball rotation), fixation, or microsaccade (eyeball minute rotation) (Step S40). In this step, limited data itself selectively output as a crescent event point cloud based on presence or absence of appearance of a random small pitch shake during the fixation by the microsaccade is directly analyzed instead of an analysis and evaluation for direction estimation of the fixation. Therefore, since the analysis is estimation (analysis evaluation) of an intracerebral activity, high-load arithmetic processing such as a continuous processing analysis of a normal multi-frame image performed by searching for an entire image for detecting the pupil is not performed. The saccade and the microsaccade are different in that the former continuously extends as a belt-like point cloud extending from a saccade start point to the target direction.

The vehicle control system 100 determines whether the eyeball behavior of the driver 900 is an eyeball behavior equivalent to saccade (eyeball rotation), fixation, or microsaccade (eyeball minute rotation) appearing during the fixation for a visual check (Step S41). When the eyeball behavior for a visual check has been detected (Step S41: Yes), the vehicle control system 100 proceeds to Step S43. When the eyeball behavior for a visual check has not been detected (Step S41: No), the vehicle control system 100 proceeds to Step S42.

The vehicle control system 100 determines whether an upper limit of a time budget (an allowable limit time at which there is a risk of exceeding a handover limit point still in the automatic driving when the MRM is not activated) allowed for awakening return determination of determination processing defined in advance has been reached (Step S42). When the retry allowable upper limit has been reached (Step S42: Yes), the vehicle control system 100 proceeds to Step S44. When the retry allowable upper limit has not been reached (Step S42: No), the vehicle control system 100 returns to Step S38. Then, the vehicle control system 100 executes determination about whether the driver 900 has an awakening level at which the driver 900 can return to the manual driving and records observation data as a cognitive response of the driver 900 (Step S43). Further, the vehicle control system 100 determines that it cannot be confirmed within the remaining time budget that the driver 900 has the awakening level at which the driver 900 can return to the manual driving. The vehicle 600 performs processing for avoiding entry into the manual driving section such as emergency stop (Step S44).

Step S43 explained above is processed in a flow having sub-steps illustrated in FIG. 17. Step S43 can include steps from Step S51 to Step S55. Details of the sub-steps are explained below.

The vehicle control system 100 determines whether the determination as to whether the driver 900 has the awakening level at which the driver 900 can return to the manual driving has been executed (Step S51). When the determination has been executed (Step S51: Yes), the vehicle control system 100 proceeds to Step S52. When the determination has not been executed (Step S51: No), the vehicle control system 100 executes the Step S43 explained above and returns to Step S51.

The vehicle control system 100 determines whether it has been determined that the driver 900 has the awakening level at which the driver 900 can return to the manual driving (Step S52). When it has been determined that the driver 900 has the awakening level at which the driver 900 can return to the manual driving (Step S52: Yes), the vehicle control system 100 proceeds to Step S53. When it has been determined that the driver 900 does not have the awakening level at which the driver 900 can return to the manual driving (Step S52: No), the vehicle control system 100 proceeds to Step 354.

The vehicle control system 100 switches the automatic driving mode to the manual driving mode (specifically, starts processing in a preparation stage for switching) (Step S53).

The vehicle control system 100 determines whether a predetermined upper limit of the number of times of retry of the determination processing has been reached (Step 354). When the upper limit of the number of retries has been reached (Step 354: Yes), the vehicle control system 100 proceeds to Step 355. When the upper limit has not been reached (Step S54: No), the vehicle control system 100 returns to Step S51. The number of times of retry should not exceed a handover standby allowable limit point.

The vehicle control system 100 determines that awakening level evaluation fails, that is, it cannot be confirmed that the driver 900 has the awakening level at which the driver 900 can return to the manual driving and ends the processing. In this case, return to the manual driving is not permitted and the automobile performs processing for avoiding entry into the manual driving section such as an emergency stop (Step S55). Note that the base of this setting is a treatment for preventing return in a situation in which return from awakening is ambiguous. There is no measure for disabling a control override function of an automatic driving system by a driver equipped in a control system of a vehicle as a measure for an abnormal situation in an emergency by the driver. When early return confirmation cannot be obtained, the purpose of setting a manageable limit point and setting the subsequent disabling as a basis works as a preventive function of attempting unreasonable return by normalizing delayed treatment by the driver and prevents an induced accident or the like due to delayed and panicking return.

10.4 Example

Further, a specific example of executing the determination processing for the awakening level of the driver 900 is explained. For example, the determination processing is executed by presenting a problem explained below to the driver 900.

Figure 19:
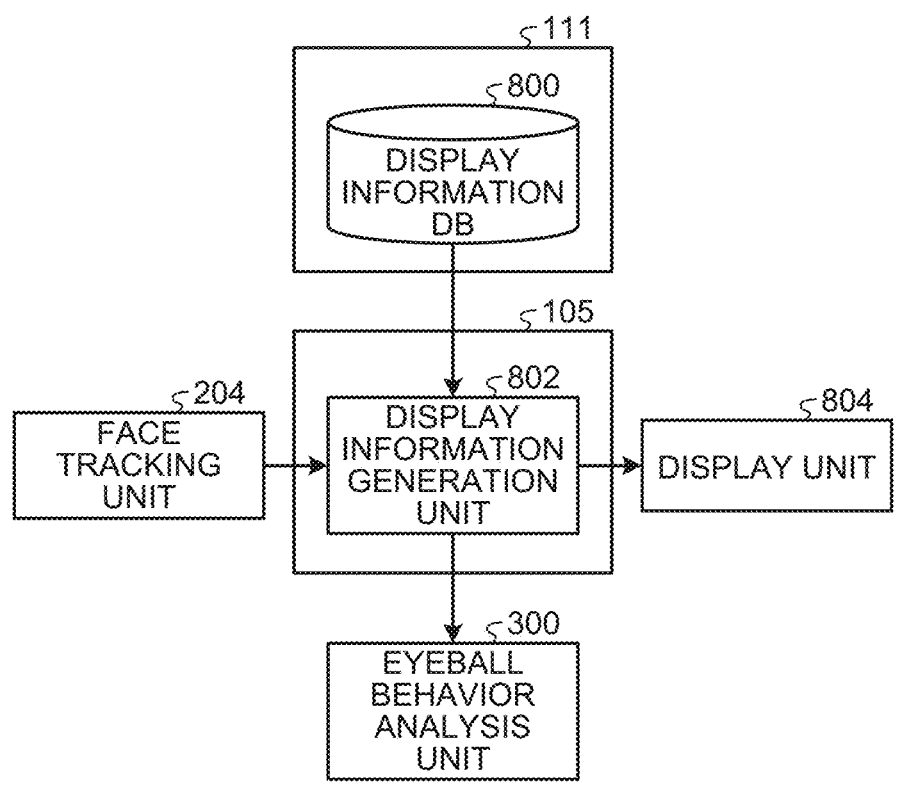
FIG. 19 is an explanatory diagram for explaining a partial configuration of a vehicle control system 100 for executing determination processing for an awakening degree of the driver.

First, a specific configuration for executing the determination processing for the awakening level of the driver 900 is explained with reference to FIG. 19. FIG. 19 is an explanatory diagram for explaining a partial configuration of the vehicle control system 100 for executing the determination processing of the arousal level of the driver 900. Specifically, FIG. 19 illustrates the face tracking unit 204 and the eyeball behavior analysis unit 300 explained above, a DB (Data Base) 800 stored in the storage unit 111, a display information generation unit 802 provided in the output control unit 105, and a display unit 804.

The face tracking unit (a Driver Facial Tracker) 204 detects motion information of the face and the head of the driver 900 and outputs the motion information to the display information generation unit 802.

The display information generation unit 802 generates a problem to be displayed on the display unit 804 after confirming that the driver 900 is seated on the driver's seat 602. Specifically, for example, the display information generation unit 802 generates a problem to answer the number of silhouettes of small animals among a plurality of displayed silhouettes. Data usable to generate various problems is stored in the display information DB 800. Note that an example of a specific problem is explained below. Although the problem presentation to the driver is not always an essential process in normal use, there are some users who, although being awaken, carelessly start takeover without visually checking a surrounding situation sufficiently, which is desirable in handover from the automatic driving the manual driving, while neglecting to check the surrounding situation and keeping a poor visual check. Therefore, the problem presentation is problem generation that is, by urging the driver to perform artificial situation grasping again, effective for activity estimation in the brain via detection of microsaccade appearing in a visual check target required at that time. That is, the example is an example in which, when a line-of-sight checking operation of a vehicle surrounding check, which should be naturally performed, cannot be expected, the generation problem is artificially performed to substitute the line-of-sight confirmation operation.

When the problem generated by the display information generation unit 802 is displayed on the display unit 804, the driver 900 moves the line of sight to the problem in order to acquire an answer to the problem. For example, as explained above, a visual problem that requires determination such as answering the number of silhouettes of small animals among a plurality of silhouettes is displayed on the display unit 804. In order to acquire an answer to this problem, the driver 900 performs an eyeball behavior for supplementing necessary information. For example, the driver 900 performs an eyeball behavior such as saccade (eyeball rotation), fixation, or microsaccade (eyeball minute rotation) of the eyeball. The eyeball behavior analysis unit 300 recognizes the problem generated by the display information generation unit 802 and then analyzes the eyeball behavior of the driver 900 who observes the problem displayed on the display unit 804. Note that, in the present embodiment, it is preferable that the display unit 804 faces the face of the driver 900 and is located downward with respect to a line-of-sight direction at the time when the driver 900 views an object located at infinity in front.

Although a behavior that appears bioreflexibly is present in a part of the detailed behavior analysis of the eyeball, many phenomena that appear reflecting neural transmission and processing in the brain are also simultaneously observed in the behavior. Therefore, activity results such as brain recognition are reflected and visible in a table. It is possible to highly accurately estimate the awakening level of the driver using the fact that the activity in the brain is reflected in the eyeball behavior.

Outside-world information acquired when a person makes situation determination necessary for an action is often obtained from visual information. When a person perceives and recognizes visual information and translates the visual information into action, the person directs the line of sight to the information and performs comparison and reference between the information and his/her own memory (recorded knowledge). It is known that, until a person understand information ahead of a line of sight, the person directs the line of sight to a portion where the information is seen and unconsciously exhibits a specific eyeball behavior necessary for visual information recognition, such as microsaccade, tremor, and drift, which occur during this fixation.

This eyeball behavior shows different behaviors when the person is in a normal awakening state and when the person is in a consciousness/awakening fall state. Specifically, when viewing certain information (problem) and trying to understand content, a person performs large eyeball rotation called saccade, turns the eyeball (accurately, the central visual field) to a predetermined visual part, and performs fixation and an eyeball behavior involving microsaccade, which is a minute eyeball rotation operation of a local region, near the visual part.

As explained above, when a person consciously acquires necessary information from visual information and makes necessary determination, a characteristic eyeball behavior appears in order to obtain information. On the other hand, when a visual information search is insufficient because, for example, consciousness lowers, disturbance occurs in an eyeball behavior necessary for fixation for conclusively acquiring information. Here, an example of a trajectory of an eyeball behavior of the driver 900 at the time when a visual problem of viewing information is presented is explained with reference to FIG. 20. FIG. 20 is an explanatory diagram for explaining an example of a trajectory of the eyeball behavior of the driver 900 at the time when the visual problem of viewing information is presented.

First, FIG. 20 (*a*) illustrates a problem. Specifically, the problem is a problem to count the number of silhouettes of small animals among a plurality of silhouettes.

Incidentally, the order of a line of sight varies depending on a viewer. The order of a line of sight is various, for example, some subject first directs a line of sight to a question sentence "Q" that is a problem, some subject views an answer "Ans", views the question sentence "Q", and views an entire diagram of an array, and some subject roughly views silhouette information of an answer and then views the problem. However, in activity evaluation in the brain, it is important to evaluate whether the driver 900, who is a subject at every moment of the evaluation, expresses a behavior of executing search and fixation necessary for performing information acquisition check necessary for an answer at that instance.

Observation data illustrated in FIGS. 20 (*b*) and (*c*) is explained as an example. FIG. 20(*b*) illustrates an eyeball behavior at the time of dealing with a problem in a state where an awakening level is high. On the other hand, a trajectory example of an eyeball behavior in a state in which an ability to cope with a visual problem falls is illustrated in FIG. 20(*c*). In FIG. 20 (*c*), although the eyes are opened, it is not sufficient to deal with the problem and, therefore, the eyeball behavior is one example in which a tendency of so-called looking about in wary conspicuously appears in a visual information search including saccade of the eyeball. This is affected by a tendency belonging to an individual such as a perspective of a behavior characteristic and a dominant eye and a visual acuity change accompanying a physical condition on that day. Therefore, it is desirable to perform state determination taking into account individual characteristics for awakening determination. It is desirable to perform determination taking into account characteristics of individuals after identifying the individuals.

For example, in order to check whether the consciousness of the driver 900 is continuously maintained during the automatic driving, it is necessary to perform periodic monitoring. In order to perform the monitoring without excessively bothering the driver 900, the system presents, for example, a symbol that requires some sort of thinking judgment to the driver 900 and observes an eyeball behavior. When it is observed, as a result of the observation, that the driver 900 is successfully performing a thinking check operation by a line of sight, it is surmised that the driver 900 preferentially executes a thought activity in the brain to cope with the problem and does not remain indulged in other secondary tasks. The system may perform processing for detecting that the line of sight of the driver 900 is turned to presented information and determining that the recognition is completed in response to further visual recognition of the detection. If the driver performs the manual driving, since a surrounding monitoring duty originally occurs in driving, it is required to start the monitoring duty before properly performing actual handover steering. Therefore, although it is not always required to generate visual information of a target with the display information generation unit 802, by including means for performing display, it is possible to more flexibly grasp a state of the driver than on a monotonous road that does not attract the attention of the driver.

Note that it is preferable that learning data specific to the driver 900 is used for awakening level determination processing based on the eyeball behavior. The learning data is generated in, for example, a learning device (not illustrated) included in the vehicle control system 100 or an external server. For example, the learning device acquires eyeball behavior information analyzed by the eyeball behavior analysis unit 300, acquires awakening degree information of the driver 900 determined by the determination unit 320 based on the eyeball behavior information, and further acquires driving steering information of the driver 900. Then, the learning device learns, based on the acquired information, a correct correspondence relation between the eyeball behavior of the driver 900 and the awakening level of the driver 900 at the time of the eyeball behavior and stores the learned correspondence relation in the storage unit as learning data. The learning device may perform situation application type determination by performing learning associated with input influence factors such as a correlation with a biological signal of the driver 900 by another biological sensor (not illustrated) and a use time period in the daytime and achieve high accuracy of determination.

The determination unit 320 may acquire the eyeball behavior information analyzed by the eyeball behavior analysis unit 300 and execute awakening degree determination with higher accuracy using the eyeball behavior information and the learning data generated by the learning device. Note that, in the present embodiment, when there is no or little learning data, the determination unit 320 may perform the awakening level determination using correspondence data between general eyeball behaviors and awakening levels (average data of people) without using the learning data.

As explained above, the eyeball behavior analysis unit 300 acquires eyeball behaviors such as saccade (eyeball rotation), fixation, and microsaccade (eyeball minute rotation) of the eyeball, which are eyeball behaviors for the driver 900 to solve the problem. The learning device repeatedly acquires behavior characteristics corresponding to the awakening level of the driver 900 and constructs a dictionary for executing cumulative learning and performing awakening level determination from the eyeball behavior. This dictionary is used to estimate an awakening state of the user at the time of observation from eyeball behavior characteristics observed anew.

Figure 21:
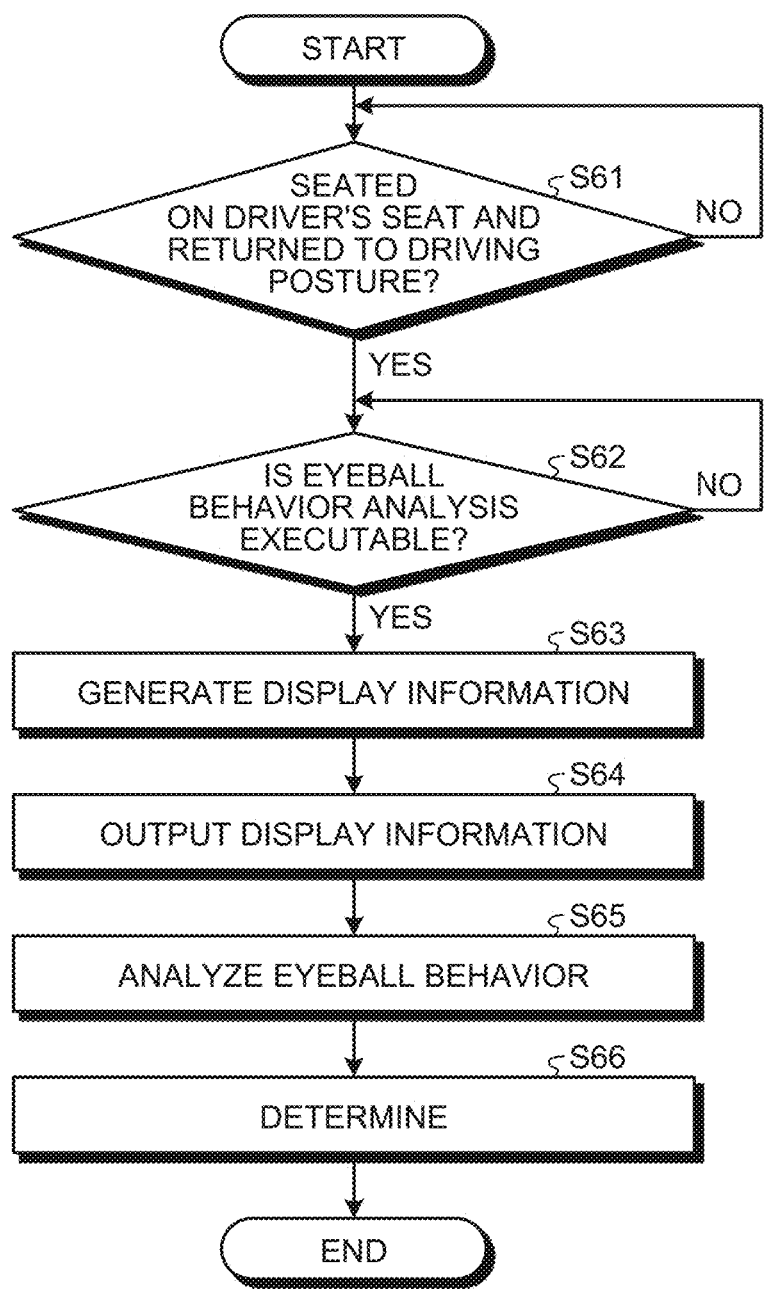
FIG. 21 is a flowchart (part 1) of an information processing method of awakening level determination processing for the driver.
Figure 22:
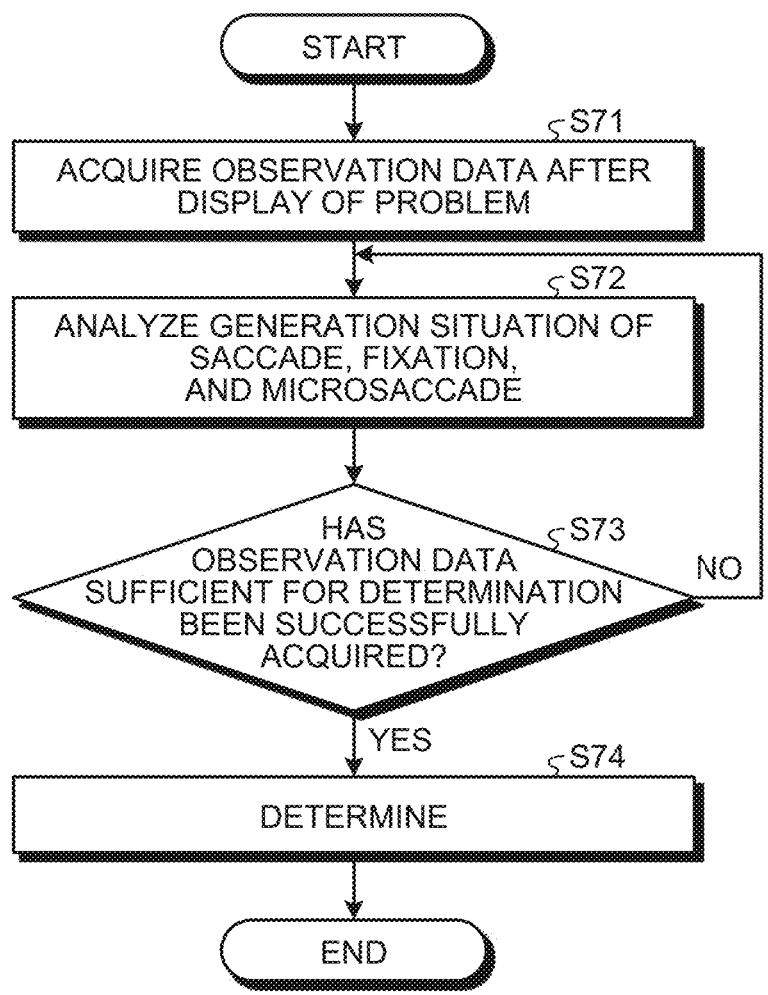
FIG. 22 is a flowchart (part 2) of the information processing method of the awakening level determination processing for the driver.

Next, an information processing method of the awakening level determination processing of the driver 900 is described with reference to FIG. 21 and FIG. 22. FIG. 21 and FIG. 22 are flowcharts of the information processing method of the awakening level determination processing for the driver 900. In the following explanation, processing in steps illustrated in FIG. 21 is sequentially explained.

First, the vehicle control system 100 acquires movement of the face of the driver 900 by the face tracking unit (the Driver Facial Tracker) 204. Based on the acquired movement of the face of the driver 900, the vehicle control system 100 determines whether the driver 900 is seated on the driver's seat 602 or has returned to the driving posture (Step S61). When the driver 900 is seated on the driver's seat 602 and has returned to the driving posture (Step S61: Yes), the vehicle control system 100 proceeds to Step S62. When the driver 900 is not seated on the driver's seat 602 or has not been returned to the driving posture (Step S61: No), the vehicle control system 100 returns to Step S61.

The vehicle control system 100 determines whether the eyeball behavior analysis processing can be executed for the driver 900 (Step S62). For example, when the driver 900 is not present in a certain position of the display unit 804, the driver 900 cannot view a problem even if the problem is displayed on the display unit 804. When the eyeball behavior analysis processing can be executed (Step S62: Yes), the vehicle control system 100 proceeds to Step S63. When the eyeball behavior analysis processing cannot be executed (Step S62: No), the vehicle control system 100 returns to Step S62.

The vehicle control system 100 generates display information, that is, a problem to be displayed to the driver 900 (Step S63). Subsequently, the vehicle control system 100 displays, on the display unit 804, the display information, that is, the problem generated in Step S63 (Step S64). Then, the vehicle control system 100 analyzes an eyeball behavior of the driver 900 induced by the problem displayed in Step S64 (Step S65). Subsequently, the vehicle control system 100 executes the awakening level determination processing based on the eyeball behavior analysis in Step S65 (Step S66).

In Step S64 explained above, when the problem generated by the display information generation unit 802 is displayed on the display unit 804, the driver 900 moves the line of sight to the problem in order to acquire an answer to the problem. In order to acquire an answer to the problem, the driver 900 exhibits an eyeball behavior for supplementing necessary information. For example, the driver 900 performs an eyeball behavior such as saccade (eyeball rotation), fixation, or microsaccade (eyeball minute rotation) of the eyeball. The eyeball behavior analysis unit 300 analyzes the eyeball behaviors of the driver 900. Further, eyeball behavior information analyzed by the eyeball behavior analysis unit 300 is output to the determination unit 320. The determination unit 320 determines an awakening level of the driver 900 based on the eyeball behavior information analyzed by the eyeball behavior analysis unit 300. When it is confirmed that the driver 900 is executing the eyeball behaviors such as eyeball rotation, fixation, and microsaccade (eyeball minute rotation) in order to solve the problem, the determination unit 320 determines that the awakening level of the driver 900 is high. On the other hand, when these eyeball behaviors are not observed or are small, the determination unit 320 determines that the awakening level of the driver 900 is low.

Next, details of the processing in Step S65 explained above is explained with reference to FIG. 22.

First, the eyeball behavior analysis unit 300 acquires observation data of an eyeball behavior of the driver 900 after the problem display (Step S71). For example, the eyeball behavior analysis unit 300 acquires acceleration data of movement of the eyeball of the driver 900 detected by the eyeball tracking unit (a Driver Eye Tracker) 206.

Subsequently, the eyeball behavior analysis unit 300 acquires eyeball behavior information such as saccade (eyeball rotation), fixation, and microsaccade (eyeball minute rotation) of the eyeball from the observation data acquired in Step S71 (Step S72). As explained above, when the problem is displayed on the display unit 804, the driver 900 performs an eyeball behavior for acquiring information necessary for solving the problem. For example, the driver 900 performs an eyeball behavior such as saccade (eyeball rotation), fixation, or microsaccade (eyeball minute rotation) of the eyeball. The eyeball behavior analysis unit 300 extracts information concerning the eyeball behaviors of the driver 900 from the observation data.

Subsequently, the eyeball behavior analysis unit 300 determines whether observation data sufficient for determining an awakening level has been successfully acquired (Step S73). Specifically, the eyeball behavior analysis unit 300 determines whether the eyeball behavior information such as saccade (eyeball rotation), fixation, and microsaccade (eyeball minute rotation) of the eyeball extracted from the observation data of the driver 900 is sufficient data for determining whether the data is data corresponding to problem solution processing. When it is determined that the data is sufficient (Step S73: Yes), the vehicle control system 100 proceeds to Step S74. When it is determined that the data is insufficient (Step S73: No), the vehicle control system 100 returns to Step S72.

The determination unit 320 determines an awakening level of the driver 900 based on an analysis result of the observation data of the eyeball behavior of the driver after the problem presentation (Step S74). Specifically, the determination unit 320 analyzes whether the driver 900 executes eyeball behaviors such as saccade (eyeball rotation), fixation, and microsaccade (eyeball minute rotation) of the eyeball in order to solve the problem. When determining that the eyeball behavior of the driver 900 corresponds to an eyeball behavior equivalent to saccade (eyeball rotation), fixation, or microsaccade (eyeball minute rotation) for solving the problem, the determination unit 320 determines that the awakening level of the driver 900 is high. On the other hand, when these eyeball behaviors are not observed or are small, the determination unit 320 determines that the awakening degree of the driver 900 is low. Note that, in this example, an example in which determination breakage is performed by determination of 0 or 1 is explained. However, it is difficult to discriminate reliable awakening determination of 100% and uncertain determination of 0% in actual operation. Awakening discrimination may be output together with a parameter indicating a fixed degree of certainty and a function may be handed over stepwise according to appropriateness of a handover procedure.

As explained above, the information processing method explained presents a visual problem to the driver 900 before the driver 900 returns to the manual driving and analyzes the eyeball behavior of the driver 900 that appears in solving the problem. In the information processing method explained above, a non-uniform problem is generated and presented, the problem being expected to induce, as the eyeball behavior of the driver 900, a specific eyeball behavior such as saccade (eyeball rotation), fixation, or microsaccade (eyeball minute rotation) for solving the problem. When the driver 900 copes with the problem, an actually appearing eyeball behavior is observed, the observed eyeball behavior is analyzed, and an internal awakening level of the driver 900 at the time of observation is estimated based on learning dictionary characteristics of the driver 900. Further, based on an estimation result, it is determined whether a state of the driver 900 is in a sufficient internal awakening state in the brain worth for starting the manual driving return. Specifically, when it is determined from the analysis of these eyeball behaviors that the driver 900 has sufficiently returned to awakening, it is determined that the driver 900 has a high awakening degree at which the manual driving is possible and the start of the manual driving is permitted. On the other hand, when it is determined that these eyeball behaviors have not sufficiently occurred, it is determined that the driver 900 does not have a high awakening level at which the manual driving is possible and the start of the manual driving is not permitted. In this case, emergency evacuation processing such as stopping before entering the manual driving section is performed.

A process from visual information check for an actual problem to a solution of the problem is sometimes greatly different because of the influence of various factors such as a state of the driver 900 at every moment, a repeated implementation situation of the same problem, an action characteristic for checking a question after viewing answer choices, a fatigue degree, an eyesight and an eyesight fatigue degree at the time, disturbance of external light, and anxiety. Therefore, in order to highly accurately perform the determination, it is preferable to use return prediction dictionary data specific to the driver 900 generated by learning processing for return quality (normal return, delayed return, return give-up, and system emergency handling) and the like at the time of takeover execution that occur every time from long-term repeated use. Further, as repeated explained, it is desirable to execute normal return prediction based on a behavior characteristic analysis result of the eyeball using the return prediction dictionary data specific to the driver 900. According to these kinds of processing, it is possible to start safe manual driving.

Although only the analysis of the eyeball behavior is explained above, it is preferable that the data used for the determination processing as to whether the driver 900 can start safe manual driving and the data input to the learning device include a state and history information obtained from the own vehicle, road environment information, and a driver biometric signal.

Note that the present embodiment is explained as being applied to the case in which it is determined, based on the eyeball behavior of the driver 900 of the mobile device capable of switching the automatic driving and the manual driving, whether the driver 900 has the awakening level at which the driver 900 can return to the manual driving. However, the analysis of the eyeball behavior is to analyze a brain activity of a subject using observation data that can be externally observed. Therefore, various uses are possible other than determining the state of the driver 900 at the time of takeover from the automatic driving to the manual driving. Further, the eyeball behavior analysis method explained above is a method of observing a correlation result with stored information for a problem. Therefore, various uses are possible by observing and determining a reaction to a presented problem. If a problem presented to the subject needs to be collated with memory of the subject, a process for obtaining an answer to the problem reflects a state and mind of the subject. Therefore, for example, the problem can also be applied to true/false determination of a respondent when presenting a report problem such as an alcohol intake report or an overwork labor report.

Further, the problem presentation explained above does not need to be limited to the operation of the vehicle 600. For example, the problem presentation can be extended to and used in a wide variety of events and occupations such as operation of an aircraft, operation of a train, crane operation, an air traffic controller, and a remote automatic driving controller and, besides, true/false evaluation and the like by a psychological analysis at the time of self-reporting. Note that it is known that the superior temporal sulcus of the temporal lobe is active when the subject selects visual information necessary for solving some problem, the interparietal sulcus is active when the subject pays attention, and the frontal eye field is active when the subject moves the eyes. The hippocampus present on the inner side of the temporal lobe acts to recall what is memorized. It is also known that the eyeball behavior changes when suppression of stimulation reflection due to modulation of a so-called mutual balance between a sympathetic nerve and a parasympathetic nerve such as autonomic ataxia occurs. Therefore, the eyeball behavior analysis processing explained above can also be used as verification and monitoring processing for mental health of a subject such as the driver 900. Specifically, for example, it is possible to enable safe operation by using the eyeball behavior analysis processing for grasping a state and managing health of the driver 900 of a commercial vehicle such as a bus or a taxi.

11. Summary

As explained above, according to the embodiment of the present disclosure, when observing an eyeball behavior of the driver 900 using the EVS 400, it is possible to optimize the observation of the eyeball behavior by adjusting a threshold that can define a frequency of event detection of the EVS 400. In the embodiment of the present disclosure, an illumination device that illuminates the driver 900 may be adjusted. Consequently, according to the embodiment of the present disclosure, it is possible to perform event detection at an optimum frequency in order to accurately grasp a change to be observed while suppressing an increase in a data amount for observation of an eyeball behavior such as saccade, microsaccade, and drift, detection of blinks, a change in facial expression, and the like.

Specifically, in the embodiment of the present disclosure, when a saccade behavior, a microsaccade behavior, and the like are observed using the EVS 400, the threshold of the event detection of the EVS 400 is adjusted at timing when the observation of the eyeball behavior is necessary. In this way, it is possible to efficiently and accurately grasp the saccade behavior and the microsaccade behavior while suppressing an increase in a data amount and reducing a load on arithmetic processing and transmission. In the embodiment of the present disclosure, when a saccade behavior of an eyeball is observed using the EVS 400, light having a narrow band wavelength is illuminated on the face of the driver 900 using a filter that selectively transmits the light having the narrow band wavelength at timing when observation of an eyeball behavior is necessary. Consequently, since boundary shade between the iris and the pupil of the eyeball can be made conspicuous, the saccade behavior can be selectively and efficiently accurately observed.

Note that, in the embodiment of the present disclosure, the automobile is explained as an example. However, the present embodiment is not limited to be applied to the automobile and can be applied to mobile bodies such as an automobile, an electric automobile, a hybrid electric automobile, a motorcycle, a personal mobility, an airplane, a ship, a construction machine, and an agricultural machine (a tractor). Since an eyeball behavior is not a conscious behavior of a subject but a reflective motion to visual information and the reflective movement are intentionally corrected, a delayed behavior until the correction appears in the behavior. Further, the embodiment of the present disclosure can also be applied to remote steering operations of various mobile bodies and the like.

12. Hardware Configuration

Figure 23:
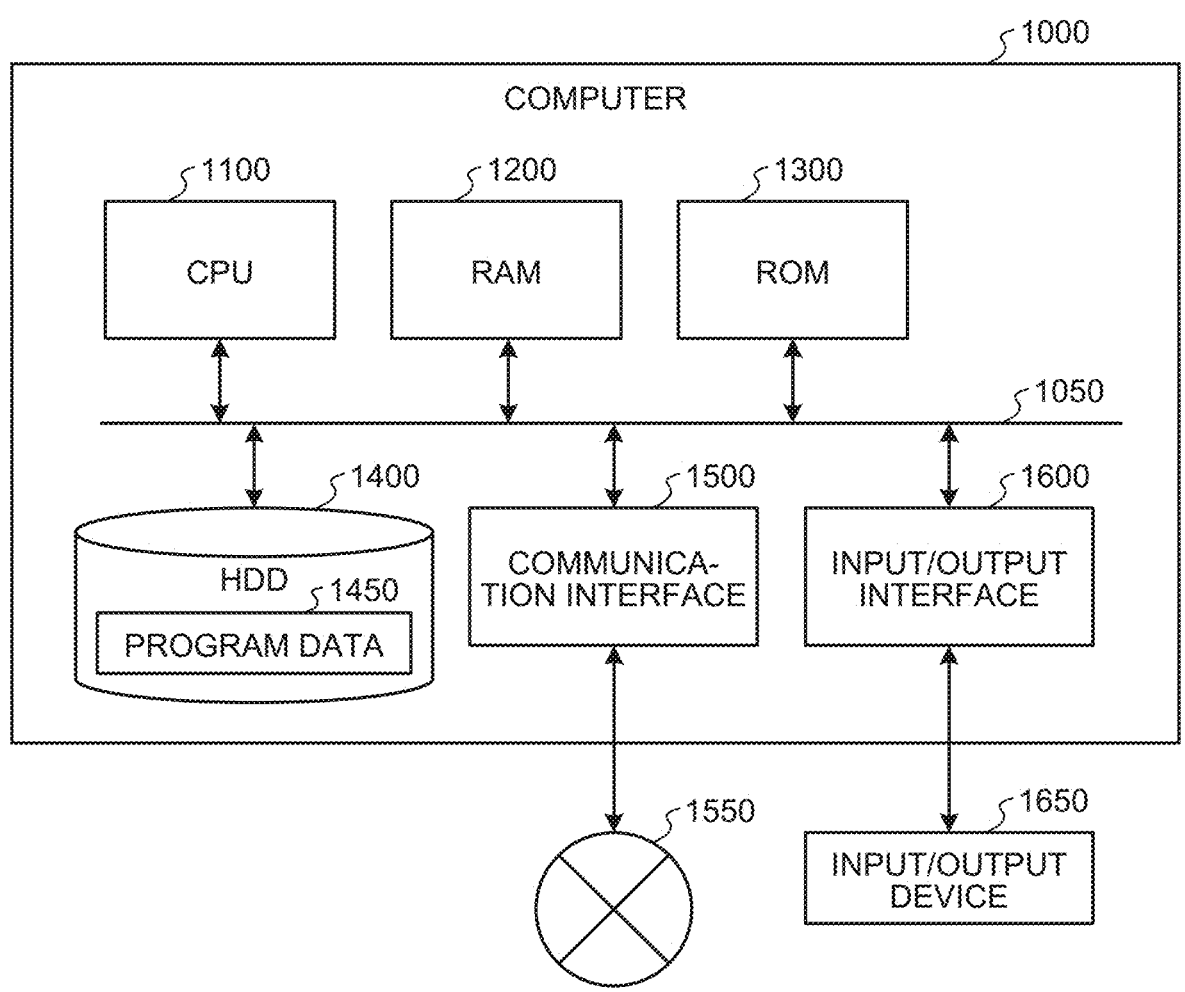
FIG. 23 is a hardware configuration diagram illustrating an example of a computer 1000 that implements at least a part of functions of an automatic driving control unit 112.

The entire or a part of the automatic driving control unit 112 according to the embodiments explained above is realized by, for example, a computer 1000 having a configuration as illustrated in FIG. 23. FIG. 23 is a hardware configuration diagram illustrating an example of the computer 1000 that realizes at least a part of the functions of the automatic driving control unit 112. The computer 1000 includes a CPU 1100, a RAM 1200, a ROM (Read Only Memory) 1300, an HDD (Hard Disk Drive) 1400, a communication interface 1500, and an input/output interface 1600. The units of the computer 1000 are connected by a bus 1050.

The CPU 1100 operates based on programs stored in the ROM 1300 or the HDD 1400 and controls the units. For example, the CPU 1100 develops the programs stored in the ROM 1300 or the HDD 1400 in the RAM 1200 and executes processing corresponding to various programs.

The ROM 1300 stores a boot program such as a BIOS (Basic Input Output System) executed by the CPU 1100 at a start time of the computer 1000, a program depending on hardware of the computer 1000, and the like.

The HDD 1400 is a computer-readable recording medium that non-transiently records a program to be executed by the CPU 1100, data to be used by such a program, and the like. Specifically, the HDD 1400 is a recording medium that records an information processing program according to the present disclosure, which is an example of program data 1450.

The communication interface 1500 is an interface for the computer 1000 to be connected to an external network 1550 (for example, the Internet). For example, the CPU 1100 receives data from other equipment and transmits data generated by the CPU 1100 to the other equipment via the communication interface 1500.

The input/output interface 1600 is an interface for connecting an input/output device 1650 and the computer 1000. For example, the CPU 1100 receives data from an input/output device 1650 such as a keyboard, a mouse, or a microphone via the input/output interface 1600. The CPU 1100 transmits data to an output device such as a display, a speaker, or a printer via the input/output interface 1600. The input/output interface 1600 may function as a media interface that reads a program or the like recorded in a predetermined recording medium (a medium). The medium is, for example, an optical recording medium such as a DVD (Digital Versatile Disc) or a PD (Phase change rewritable Disk), a magneto-optical recording medium such as an MO (Magneto-Optical disk), a tape medium, a magnetic recording medium, or a semiconductor memory.

For example, when the computer 1000 functions as at least a part of the automatic driving control unit 112 according to the embodiment of the present disclosure, the CPU 1100 of the computer 1000 realizes the functions of the sensor control unit 330 and the illumination control unit 332 by executing a program stored in the RAM 1200. An information processing program and the like according to the present disclosure are stored in the HDD 1400. Note that the CPU 1100 reads the program data 1450 from the HDD 1400 and executes the program data. However, as another example, the CPU 1100 may acquire these programs from another device via the external network 1550.

The sensor control unit 330, the illumination control unit 332, and the like according to the present embodiment may be applied to a system including a plurality of devices premised on connection to a network (or communication between devices) such as Cloud computing. That is, the information processing apparatus according to the present embodiment explained above can also be implemented as, for example, an information processing system according to the present embodiment by a plurality of devices. An example of the hardware configuration of at least a part of the automatic driving control unit 112 is explained above. The components explained above may be configured using general-purpose members or may be configured by hardware specialized for the functions of the components. Such a configuration can be changed as appropriate according to a technical level at each time to be implemented.

13. Supplement

Note that the embodiment of the present disclosure explained above can include, for example, an information processing method executed by the information processing apparatus or the information processing system explained above, a program for causing the information processing apparatus to function, and a non-transitory tangible medium in which the program is recorded. The program may be distributed via a communication line (including wireless communication) such as the Internet.

The steps in the information processing method in the embodiment of the present disclosure explained above may not always be processed according to the described order. For example, the steps may be processed with the order changed as appropriate. The steps may be partially processed in parallel or individually instead of being processed in time series. Further, the processing of the steps may not always be processed according to the described method and may be processed by, for example, another functional unit according to another method.

In explaining the embodiment of the present disclosure, details are explained based on the automatic driving levels defined by the SAE. However, the concept of classifying the uses of the automatic driving with the automatic driving levels is the classification segmented by the design viewpoint of the vehicle 600. On the other hand, when viewed from the user's viewpoint, it is not always easy for the driver 900 to drive according to the automatic driving levels of the vehicle 600 after correctly understanding and grasping, according to available automatic driving levels, the permitted automatic driving levels in an operation design region in which operations at the levels are allowed. That is, this may be referred to as machine centered design for using the vehicle 600 according to a function and an instruction of a machine. That is, in a situation in which a situation that the vehicle system can cope with dynamically changes with time because of various external factors and internal factors and the automatic driving levels at the time of traveling are not uniquely determined physically only from a road section or the like, it can be considered that the driver 900 is required to subserviently follow a level allowed by a road situation in which the vehicle control system 100 advances every time. On the other hand, when viewing the relation between the driver 900 and the vehicle control system 100 from an ergonomic viewpoint, in order to achieve a purpose of using the vehicle 600, that is, movement, and to obtain secondary advantages obtained during the movement, the user performs action determination considering a balance between a burden of driving and various risks involved in the driving. Here, the burden refers to steering work of the vehicle 600 for movement and a constant risk that the vehicle 600 suffers in the movement. Originally, an advantage of the automatic driving when viewed from the viewpoint of the driver 900 is to be released from restraint of driving and enable a significant time use not relating to driving and a user not subordinate to the driving. In order to enjoy such an advantage, it is considered necessary to convert an idea supporting the automatic driving control to an idea of Human Centered Design obtained by reversing the relationship of the conventional idea of Machine Centered Design. When the relation between the vehicle control system 100 of the vehicle 600 and the driver 900, who is the user, is reviewed based on the viewpoint of such an idea, it is considered that a use of the automatic driving for allowing actual various automatic driving functions according to awakening and a physical preparation situation that can be handled according to the automatic driving levels that can be used as the "operation design region" as design of the vehicle 600 by the driver 900 is a desirable use form in terms of ergonomics.

A human performs his/her action selection while balancing selectable benefits and losses and risks involved in the benefits and further learns the action. By introducing the control based on the Human Centered Design, the driver 900 performs action learning to be able to appropriately prepare for return according to an upper limit automatic driving steering environment allowed in roads of the driver 900. Further, the driver 900 who has advanced such action learning is allowed to leave the automatic driving level 4 or the higher level, that is, leave driving steering work by advanced automatic driving traveling that can obtain a benefit of performing NDRA or the like. On the other hand, when a state indicating expected appropriate return of the driver 900 cannot be observed or return quality is inferior based on an observation state of the driver 900 with reference to a return response history or learning data of the driver 900 in the past, use in the automatic driving level 4 or the like at which the driver 900 can leave the driving steering work even in the "design operation area" may be prohibited or use in the automatic driving level 3 may be limited to a short time to greatly limit the use of the automatic driving.

That is, automatic driving control for permitting use of the automatic driving based on an adaptive ability of a human rather than permitting an automatic driving level determined as an "operation design region" from performance standards of sensing equipment loaded on the vehicle 600 and determination processing is a user-friendly use form of the vehicle 600. That is, by converting a control idea of the automatic driving system of the vehicle 600 from so-called machine centered design to human centered design, it is possible to provide a user-friendly use form with the automatic driving control. In the explanation of the present disclosure, the application type control using the state observation means of the driver 900 is explained based on the former Machine Centered Design. However, even when the Machine Centered Design is replaced with the Human Centered Design, similarly, a switching action (a takeover action) from the automatic driving to the manual driving of the driver 900 occurs. Therefore, it is possible to implement the application-type control using the state observation means of the driver 900 explained above.

The preferred embodiment of the present disclosure is explained in detail above with reference to the accompanying drawings. However, the technical scope of the present disclosure is not limited to such an example. It is evident that those having the ordinary knowledge in the technical field of the present disclosure can arrive at various alterations or corrections within the category of the technical idea described in claims. It is understood that these alterations and corrections naturally belong to the technical scope of the present disclosure. Although the embodiment is explained based on a single-function sensor of an event vision sensor, the function may be realized by a hybrid sensor having a normal visible light RGB or infrared IR type function for capturing a grayscale image simultaneously with event detection The effectiveness of the present embodiment is not limited to a sensor dedicated to the event vision sensor.

The effects described in the present specification are only explanatory or illustrative and are not limiting. That is, the technique according to the present disclosure can achieve other effects obvious for those skilled in the art from the description of the present specification together with or instead of the effects described above.

Note that the present technique can also take the following configurations.

(1) An information processing apparatus comprising:
an event vision sensor that images an inside of a mobile body; and
a sensor control unit that controls the event vision sensor, wherein
the event vision sensor includes:
a pixel array unit including a plurality of pixels arrayed in a matrix; and
an event detection unit that detects that a luminance change amount due to incident light has exceeded a predetermined threshold in the pixels, and
the sensor control unit changes a value of the predetermined threshold when grasping, with the event vision sensor, an eyeball behavior of a driver seated on a driver's seat of the mobile body.

(2) The information processing apparatus according to (1), wherein the eyeball behavior includes at least one of saccade, fixation, and microsaccade of an eyeball.

(3) The information processing apparatus according to (1) or (2), wherein the sensor control unit changes the predetermined threshold corresponding to the pixels according to a position in the pixel array unit.

(4) The information processing apparatus according to (3), wherein the sensor control unit sets a predetermined region in the pixel array unit according to a position of a face or an eyeball of the driver and changes the predetermined threshold corresponding to the pixels in the predetermined region.

(5) The information processing apparatus according to any one of (1) to (4), further comprising an eyeball behavior analysis unit that analyzes data observed by the event vision sensor.

(6) The information processing apparatus according to (5), wherein the eyeball behavior analysis unit distinguishes a type of the eyeball behavior based on a shape of a point distribution observed by the event vision sensor.

(7) The information processing apparatus according to (6), wherein the eyeball behavior analysis unit analyzes that microsaccade has appeared when detecting the appearance of the point distribution having a crescent shape.

(8) The information processing apparatus according to any one of (5) to (7), wherein the sensor control unit changes the predetermined threshold based on an analysis result of the eyeball behavior analysis unit.

(9) The information processing apparatus according to any one of (5) to (8), further comprising
an irradiation unit that irradiates a face of the driver with light having a predetermined wavelength when the information processing apparatus grasps, with the event vision sensor, an eyeball behavior of the driver.

(10) The information processing apparatus according to (9), wherein the irradiation unit includes a filter that transmits light having a wavelength of 940 nm or more and 960 nm or less.

(11) The information processing apparatus according to (9) or (10), further comprising an irradiation control unit that controls intensity, an irradiation time, or an irradiation interval of light from the irradiation unit.

(12) The information processing apparatus according to (11), wherein the irradiation control unit performs control based on an analysis result of the eyeball behavior analysis unit.

(13) The information processing apparatus according to any one of (5) to (12), further comprising
a display information generation unit that generates a problem and displays the problem on a display unit, wherein
the eyeball behavior analysis unit analyzes the eyeball behavior of the driver who observes the problem displayed on the display unit.

(14) The information processing apparatus according to (13), wherein the display unit is opposed to a face of the driver and located below in a line-of-sight direction at a time when the driver views an object located forward at infinity.

(15) The information processing apparatus according to (14), wherein
the event vision sensor is opposed to the face of the driver and located below in the line-of-sight direction, and
an angle formed by a line segment connecting an eyeball of the driver and the event vision sensor and the line-of-sight direction is 10 degrees or more and less than 30 degrees.

(16) The information processing apparatus according to (15), wherein the event vision sensor has an angle of view for enabling the event vision sensor to grasp at least the face of the driver.

(17) The information processing apparatus according to any one of (5) to (16), further comprising a determination unit that determines a return response level of the driver to manual driving based on an analysis result of the eyeball behavior.

(18) The information processing apparatus according to (17), further comprising a mobile body driving control unit that switches a driving mode of the mobile body based on a determination result of the return response level.

(19) An information processing method executed in an information processing apparatus including:
an event vision sensor that images an inside of a mobile body; and
a sensor control unit that controls the event vision sensor, the event vision sensor including:
a pixel array unit including a plurality of pixels arrayed in a matrix; and
an event detection unit that detects that a luminance change amount due to incident light has exceeded a predetermined threshold in the pixels,
the information processing method comprising
changing a value of the predetermined threshold when grasping, with the event vision sensor, an eyeball behavior of a driver seated on a driver's seat of the mobile body.

(20) An information processing program for causing a computer to execute a control function of an event vision sensor that images an inside of a mobile body,
the event vision sensor including:
a pixel array unit including a plurality of pixels arrayed in a matrix; and
an event detection unit that detects that a luminance change amount due to incident light has exceeded a predetermined threshold in the pixels,
the information processing program causing the computer to execute a function of changing a value of the predetermined threshold when grasping, with the event vision sensor, an eyeball behavior of a driver seated on a driver's seat of the mobile body.

REFERENCE SIGNS LIST

100 VEHICLE CONTROL SYSTEM
101 INPUT UNIT
102 DATA ACQUIRING UNIT
103 COMMUNICATION UNIT
104 IN-VEHICLE EQUIPMENT
105 OUTPUT CONTROL UNIT

106 OUTPUT UNIT
107 DRIVE SYSTEM CONTROL UNIT
108 DRIVE SYSTEM
109 BODY SYSTEM CONTROL UNIT
110 BODY SYSTEM
111 STORAGE UNIT
112 AUTOMATIC DRIVING CONTROL UNIT
113 SENSOR UNIT
121 COMMUNICATION NETWORK
131, 508 DETECTION UNIT
132 SELF-POSITION ESTIMATION UNIT
133 SITUATION ANALYSIS UNIT
134 PLANNING UNIT
135 OPERATION CONTROL UNIT
141 VEHICLE EXTERIOR INFORMATION DETECTION UNIT
142 VEHICLE INTERIOR INFORMATION DETECTION UNIT
143 VEHICLE STATE DETECTION UNIT
151 MAP ANALYSIS UNIT
152 TRAFFIC RULE RECOGNITION UNIT
153 SITUATION RECOGNITION UNIT
154 SITUATION PREDICTION UNIT
161 ROUTE PLANNING UNIT
162 ACTION PLANNING UNIT
163 OPERATION PLANNING UNIT
171 EMERGENCY AVOIDANCE UNIT
172 ACCELERATION AND DECELERATION CONTROL UNIT
173 DIRECTION CONTROL UNIT
200 POSITION/ATTITUDE DETECTION UNIT
202 FACE RECOGNITION UNIT
204 FACE TRACKING UNIT
206 EYEBALL TRACKING UNIT
208 BIOLOGICAL INFORMATION DETECTION UNIT
210 AUTHENTICATION UNIT
300 EYEBALL BEHAVIOR ANALYSIS UNIT
302 EYEBALL BEHAVIOR LEARNING DEVICE
310 DB
320 DETERMINATION UNIT
330 SENSOR CONTROL UNIT
332 ILLUMINATION CONTROL UNIT
400 EVS
411 DRIVE CIRCUIT
412 SIGNAL PROCESSING UNIT
413 ARBITER UNIT
414 COLUMN PROCESSING UNIT
500 PIXEL ARRAY UNIT
502 PIXEL
504 LIGHT RECEIVING UNIT
506 PIXEL SIGNAL GENERATION UNIT
600 VEHICLE
602 DRIVER'S SEAT
700, 702 IMAGING DEVICE
710 ILLUMINATION UNIT
800 DISPLAY INFORMATION DB
802 DISPLAY INFORMATION GENERATION UNIT
804 DISPLAY UNIT
900 DRIVER
902 LINE-OF-SIGHT DIRECTION

The invention claimed is:

1. An information processing apparatus comprising:
a pixel array including a plurality of pixels arrayed in a matrix,
a memory storing a program, and
at least one processor configured to execute the program to perform operations comprising:
imaging an inside of a mobile body;
detecting that a luminance change amount due to incident light has exceeded a predetermined threshold in the pixels; and
changing a value of the predetermined threshold when grasping an eyeball behavior of a driver seated on a driver's seat of the mobile body.

2. The information processing apparatus according to claim 1, wherein the eyeball behavior includes at least one of saccade, fixation, and microsaccade of an eyeball.

3. The information processing apparatus according to claim 1, wherein the operations further comprise:
changing the predetermined threshold corresponding to the pixels according to a position in the pixel array.

4. The information processing apparatus according to claim 3, wherein the operations further comprise:
setting a predetermined region in the pixel array according to a position of a face or an eyeball of the driver and changing the predetermined threshold corresponding to the pixels in the predetermined region.

5. The information processing apparatus according to claim 1, wherein the operations further comprise:
distinguishing a type of the eyeball behavior based on a shape of a point distribution.

6. The information processing apparatus according to claim 5, wherein the operations further comprise:
analyzing that microsaccade has appeared when detecting the appearance of the point distribution having a crescent shape.

7. The information processing apparatus according to claim 1, wherein the operations further comprise:
changing the predetermined threshold based on an analysis result.

8. The information processing apparatus according to claim 1, wherein the operations further comprise:
irradiating a face of the driver with light having a predetermined wavelength when the eyeball behavior of the driver is grasped.

9. The information processing apparatus according to claim 8, wherein the light has a wavelength of 940 nm or more and 960 nm or less.

10. The information processing apparatus according to claim 8, wherein the operations further comprise:
controlling an intensity, an irradiation time, or an irradiation interval of the light for irradiating the face of the driver.

11. The information processing apparatus according to claim 1, wherein the operations further comprise:
generating a problem and displaying the problem on a display; and
analyzing the eyeball behavior of the driver as the driver observes the problem displayed on the display.

12. The information processing apparatus according to claim 11, wherein the display unit is opposed to a face of the driver and is located below in a line-of-sight direction at a time when the driver views an object located forward at infinity.

13. The information processing apparatus according to claim 1, wherein the operations further comprise:
determining a return response level of the driver to manual driving based on an analysis result of the eyeball behavior.

14. The information processing apparatus according to claim 13, wherein the operations further comprise:

switching a driving mode of the mobile body based on a determination result of the return response level.

15. An information processing method comprising:
imaging an inside of a mobile body;
detecting that a luminance change amount due to incident light has exceeded a predetermined threshold in pixels of a pixel array; and
changing a value of the predetermined threshold when grasping an eyeball behavior of a driver seated on a driver's seat of the mobile body.

16. A non-transitory computer readable medium storing a program, the program being executable by a processor to perform operations comprising:
imaging an inside of a mobile body;
detecting that a luminance change amount due to incident light has exceeded a predetermined threshold in pixels of a pixel array; and
changing a value of the predetermined threshold when grasping an eyeball behavior of a driver seated on a driver's seat of the mobile body.

* * * * *